United States Patent
Savoie et al.

(10) Patent No.: US 10,118,976 B2
(45) Date of Patent: Nov. 6, 2018

(54) ANION-COORDINATING POLYMER ELECTROLYTES AND RELATED COMPOSITIONS, METHODS AND SYSTEMS

(71) Applicants: CALIFORNIA INSTITUTE OF TECHNOLOGY, Pasadena, CA (US); CORNELL UNIVERSITY, Ithaca, NY (US)

(72) Inventors: Brett M. Savoie, Pasadena, CA (US); Michael A. Webb, Pasadena, CA (US); Robert H. Grubbs, South Pasadena, CA (US); Thomas F. Miller, III, South Pasadena, CA (US); Geoffrey W. Coates, Lansing, NY (US); Qi Zheng, Ithaca, NY (US)

(73) Assignees: CALIFORNIA INSTITUTE OF TECHNOLOGY, Pasadena, CA (US); CORNELL UNIVERSITY, Ithaca, NY (US)

(*) Notice: Subject to any disclaimer, the term of this patent is extended or adjusted under 35 U.S.C. 154(b) by 142 days.

(21) Appl. No.: 15/398,682

(22) Filed: Jan. 4, 2017

(65) Prior Publication Data
US 2017/0275399 A1    Sep. 28, 2017

Related U.S. Application Data

(60) Provisional application No. 62/274,443, filed on Jan. 4, 2016, provisional application No. 62/410,010, filed on Oct. 19, 2016.

(51) Int. Cl.
| | |
|---|---|
| C08F 30/06 | (2006.01) |
| C08K 3/38 | (2006.01) |
| C08K 3/00 | (2018.01) |
| C08L 43/00 | (2006.01) |
| C08L 79/00 | (2006.01) |
| C08L 81/02 | (2006.01) |
| C08L 85/00 | (2006.01) |
| C08L 85/04 | (2006.01) |
| C08L 87/00 | (2006.01) |
| C08K 3/10 | (2018.01) |
| C08G 65/328 | (2006.01) |
| H01M 10/052 | (2010.01) |
| H01M 10/054 | (2010.01) |
| H01M 10/0565 | (2010.01) |
| C08K 3/08 | (2006.01) |

(52) U.S. Cl.
CPC ............ *C08F 30/06* (2013.01); *C08G 65/328* (2013.01); *C08K 3/10* (2013.01); *C08K 3/38* (2013.01); *C08L 43/00* (2013.01); *C08L 79/00* (2013.01); *C08L 81/02* (2013.01); *C08L 85/00* (2013.01); *C08L 85/04* (2013.01); *C08L 87/00* (2013.01); *H01M 10/052* (2013.01); *H01M 10/054* (2013.01); *H01M 10/0565* (2013.01); *C08K 2003/0812* (2013.01)

(58) Field of Classification Search
CPC ......... C08F 30/06; C08K 3/0075; C08K 3/38; C08K 2003/0812
See application file for complete search history.

(56) References Cited

U.S. PATENT DOCUMENTS

| | | | |
|---|---|---|---|
| 2006/0189776 A1* | 8/2006 | Angell | ............... C08G 65/328 528/4 |
| 2008/0029875 A1 | 2/2008 | Zhuang et al. | |
| 2008/0261101 A1* | 10/2008 | de Figueiredo Gomes | ............... C08J 5/2275 429/493 |
| 2010/0029875 A1* | 2/2010 | Roder | ................. C07F 5/027 526/195 |
| 2011/0223518 A1* | 9/2011 | Hirakimoto | ............ C08J 5/2275 429/482 |

FOREIGN PATENT DOCUMENTS

WO    2011/143368 A1    11/2011

OTHER PUBLICATIONS

Andreev, Y.G. et al. "Crystal structures of poly (ethylene oxide)$_3$: LiBF$_4$ and (Diglyme)$_n$: LiBF$_4$ (n=1, 2)", Chem. Mater., 2005, vol. 17, pp. 767-772.
Arora, A. et al., "Broadly Accessible Self-Consistent Field Theory for Block Polymer Materials Discovery" Macromolecules, 2016, 49 (13), pp. 4675-4690.
Barnes, T.A. et al., "Ab initio characterization of the electrochemical stability and solvation properties of condensed-phase ethylene carbonate and dimethyl carbonate mixtures", J. Phys. Chem. C, 119, pp. 3865-3880 (2015).
Barteau, K.P. et al. "Allyl glycidyl ether-based polymer electrolytes for room temperature lithium batteries", Macromolecules 46, pp. 8988-8994 (2013).
Beutler, T.C., et al. "Avoiding singularities and numerical instabilities in free energy calculations based on molecular simulations", Chem. Phys. Lett. 222, pp. 529-539 (1994).
Boden, N. et al. "Ionic conductivity and diffusivity in polyethylene oxide/electrolyte solutions as models for polymer electrolytes", Solid State Ionics, 45, pp. 261-270 (1991). 11 pgs.
Borodin, O. et al., "Development of many-body polarizable force fields for Li-battery applications: 2. LiTFSI-doped oligoether, polyether, and carbonate-based electrolytes", J. Phys. Chem. B, 110, pp. 6293-6299 (2006).
Borodin, O. et al., "MD Simulations and Experimental Study of Structure, Dynamics, and Thermodynamics of Poly(Ethylene Oxide) and Its Oligomers", J. Phys. Chem. B, 107, pp. 6813-6823 (2003).

(Continued)

*Primary Examiner* — Robert D. Harlan
(74) *Attorney, Agent, or Firm* — Steinfl + Bruno LLP

(57) ABSTRACT

Anion-coordinating polymers comprising one or more anion-coordinating unit of Formula (I), optionally in combination with one or more cation-coordinating unit of Formula (II) and/or a linking unit of Formula (III) and related electrolytes, batteries, methods and system.

20 Claims, 45 Drawing Sheets

(56) References Cited

OTHER PUBLICATIONS

Borodin, O. et al. "Mechanism of ion transport in amorphous poly(ethylene oxide)/LiTFSI from molecular dynamics simulations", Macromolecules, 39, pp. 1620-1629 (2006).

Borodin, O. "Polarizable force field development and molecular dynamics simulations of ionic liquids" J. Phys. Chem. B, 113, pp. 11463-11478 (2009). 17 pgs.

Bouchet, R. et al. "Single-ion BAB triblock copolymers as highly efficient electrolytes for lithium-metal batteries", Nat. Mater. 12, pp. 452-457 (2013).

Briggs, J.M. et al. "Monte Carlo simulations of liquid alkyl ethers with the OPLS potential functions" J. Comput. Chem., 11, No. 8, pp. 958-971 (1990). 16 pgs.

Breneman, C.M. et al., "Determining atom-centered monopoles from molecular electrostatic potentials. The need for high sampling density in formamide conformational analysis" J. Comput. Chem., 11, No. 3, pp. 361-373, (1990). 15 pgs.

Bruce, P.G. et al. "Nanomaterials for rechargeable lithium batteries" Angew. Chem. Int. Ed. 47, pp. 2930-2946 (2008). 17 pgs.

Bruce, P.G. et al. "Polymer electrolytes", J. Chem. Soc. Faraday Trans. 89(17), pp. 3187-3203 (1993).

Buriez, O. et al. "Performance limitations of polymer electrolytes based on ethylene oxide polymers" Journal of Power Sources, 89, pp. 149-155, 2000. 8 pgs.

Chirlain, L.E. et al., "Atomic charges derived from electrostatic potentials: A detailed study", J. Comput. Chem., vol. 8, No. 6, pp. 894-905, 1987. 13 pgs.

Chujo, Y. et al., "Hydroboration Polymerization. 1. Synthesis of Organoboron Polymers by Polyaddition between Diene and Monoalkylborane" Macromolecules, 1991, vol. 24, No. 2, pp. 345-348. 5 pgs.

Croce, F. et al. "Nanocomposite polymer electrolytes for lithium batteries" Nature, vol. 394, pp. 456-458 (1998). 4 pgs.

Edman, L. et al., "Analysis of diffusion in a solid polymer electrolyte in the context of a phase-separated system", Phys. Rev. E., vol. 65, pp. 042803-1 to 042803-4 (2002).

Fenton, D.E. et al., "Complexes of alkali metal ions with poly(ethylene oxide)", Polymer, vol. 14, 589 (1973). 2 pgs.

Gorecki, W. et al., "Physical properties of solid polymer electrolyte PEO(LiTFSI) complexes", J. Phys.: Condens. Matter, 1995, 7, pp. 6823-6832. 11 pgs.

Grimme, S. et al., "A consistent and accurate ab initio parametrization of density functional dispersion correction (DFT-D) for the 94 elements H—Pu", J. Chem. Phys. 132, pp. 154104-1 to 154104-19, 2010. 20 pgs.

Halley, J.W. et al. "Lithium perchlorate ion pairing in a model of amorphous polyethylene oxide" J. Chem. Phys. vol. 111, No. 7, pp. 3302-3308 (1999). 8 pgs.

Hardy, L.C. et al. "Preparation and electrical response of solid polymer electrolytes with only one mobile species" J. Am. Chem. Soc. 107, pp. 3823-3828 (1985). 7 pgs.

Hayamizu, K. et al. "An NMR and ionic conductivity study of ion dynamics in liquid poly(ethylene oxide)-based electrolytes doped with $LiN(SO_2CF_3)_2$" J. Phys. Chem. B 106, pp. 547-554 (2002).

Henderson, W.A. et al. "Single-crystal structures of polymer electrolytes", J. Am. Chem. Soc. 125, pp. 12098-12099 (2003).

Hirshfeld, F.L., "Bonded-atom fragments for describing molecular charge densities" Theoretica Chimica Acta, 44, pp. 129-138, 1977. 12 pgs.

Hyun, J.K., et al., "Molecular dynamics simulations and spectroscopic studies of amorphous tetraglyme $(CH_3O(CH_2CH_2O)_4CH_3)$ and tetraglyme:$LiCF_3SO_3$ structures", J. Phys. Chem. B, 105, pp. 3329-3337 (2001).

Jenkins, H. et al. "Relationships among iconic lattice energies, molecular (formula unit) volumes, and thermochemical radii", Inorg. Chem., 38, pp. 3609-3620 (1999).

Johansson, A. et al., "Diffusion and ionic conductivity in $Li(CF_3SO_3)PEG_{10}$ and $LiN(CF_3SO_2)2PEG_{10}$", Polymer, 1996, vol. 37, No. 8, pp. 1387-1393. 8 pgs.

Jorgensen, W.L. et al., "Development and Testing of the OPLS All-Atom Force Field on Conformational Energetics and Properties of Organic Liquids", J. Am. Chem. Soc. 118, pp. 11225-11236 (1996).

Jorgensen, W.L. et al. "Optimized intermolecular potential functions for liquid hydrocarbons" J. Am. Chem. Soc. 106, pp. 6638-6646 (1984).

Lee, H.S. et al. "Synthesis of anion receptor grafted siloxane polymers and the ionic conductivity studies of polymer-salt complexes" J. Electrochem. Soc. 146 (3), pp. 941-946 (1999).

Lee, H.S. et al. "The synthesis of a new family of boron-based anion receptors and the study of their effect on ion pair dissociation and conductivity of lithium salts of nonaqueous solutions", J. Electrochem. Soc. vol. 145, No. 8, pp. 2813-2818 (1998).

Le Nest, J. et al. "Cationic Transport Features of Ionomeric Polymer Networks" J. Polym. Commun., 1987, vol. 28, 302-305. 7 pgs.

Leveque, M. et al., "Cationic transport numbers in polyether-based networks containing lithium salts", J. Power Sources, 1985, 14, pp. 27-30.

Liang, S. et al. "Synthesis and lithium ion conductivity of polysiloxane single-ion conductors containing novel weak-binding borates" Chem. Mater. 24, pp. 2316-2323 (2012).

Liang, S. et al. "High Ion Content Siloxane Phosphonium Ionomers with Very Low $T_g$," Macromolecules, 2014, 47, pp. 4428-4437. 11 pgs.

Lightfoot, P. et al. "Crystal structures of the polymer electrolytes poly (ethylene oxide) $_4$: MSCN (M=$NH_4$, K)." J. Am. Chem. Soc. 116, pp. 7469-7470 (1994). 3 pgs.

Lin, K. et al. "Does decreasing ion-ion association improve cation mobility in single ion conductors?" Phys. Chem. Chem. Phys. 15, pp. 16143-16151 (2013).

Lin, K. et al. "Superionic behavior in polyethylene-oxide-based single-ion conductors", Phys. Rev. E 88, pp. 052602-1 to 052602-5 (2013).

MacGlashan, G.S. et al. "Structure of the polymer electrolyte poly(ethylene oxide)$_6$: $LiAsF_6$" Nature, 1999, vol. 398, pp. 792-794.

Marenich, A.V. et al. "Charge Model 5: An Extension of Hirshfeld Population of Analysis for the Accurate Description of Molecular Interactions in Gaseous and Condensed Phases" J. Chem. Theory Comput., 8, pp. 527-541, 2012.

Matsumi, N. et al. "Selective Ion Transport in Organoboron Polymer Electrolytes Bearing a Mesitylboron Unit" Macromolecules 35, pp. 5731-5733 (2002).

Matsumi, N. et al. "Ion Conductive Characteristics of Alkylborane Type and Boric Ester Type Polymer Electrolytes Derived from Mesitylborane" Macromolecules, 2003, 36, pp. 2321-2326.

McBreen, J. et al., "New approaches to the design of polymer and liquid electrolytes for lithium batteries", J. Power Sources 89, pp. 163-167 (2000).

Meyer, W. "Polymer Electrolytes for Lithium-Ion Batteries" Adv. Mater., 1998, 10, No. 6, pp. 439-448.

Mikhailov, B.M. et al. "Hydroboration of Boron Triallyl" Bull. Acad. Sci. USSR, 1962, vol. 11, Issue 8, pp. 1387-1388. 4 pgs.

Muhuri, P.K. et al. "Ionic association of some lithium salts in 1, 2-dimethoxyethane. A raman spectroscopic and conductivity study" J. Phys. Chem. B, 101, pp. 3329-3332 (1997).

Müller-Plathe, F. et al. "Computer simulation of a polymer electrolyte: Lithium iodide in amorphous poly(ethylene oxide)" J. Chem. Phys. 103 (11), pp. 4745-4756 (1995). 13 pgs.

Müller-Plathe, F. "Permeation of polymers—a computational approach", Acta Polymer 45, pp. 259-293 (1994). 37 pgs.

Mulliken, R.S. "Electronic Population Analysis on LCAO-MO Molecular Wave Functions" J. Chem. Phys., vol. 23, No. 10, pp. 1833-1840, 1955. 9 pgs.

Pesko, D.M. et al. "Effect of monomer structure on ionic conductivity in a systematic set of polyester electrolytes" Solid State Ionics 289, pp. 118-124 (2016).

Plimpton, S. "Fast parallel algorithms for short-range molecular dynamics" J. Comput. Phys. 117, 1-19. 42 pages (1995).

Qin, Y. et al. "Well-Defined Boron-Containing Polymeric Lewis Acids" J. Am. Chem. Soc., 2002, 124, pp. 12672-12673.

(56) References Cited

OTHER PUBLICATIONS

Qin, Y. et al. "A New Route to Organoboron Polymers via Highly Selective Polymer Modification Reactions" Macromolecules, 2004, 37, pp. 7123-7131.
Rappe, A.K. et al. "UFF, A full periodic table force field for molecular mechanics and molecular dynamics simulations", J. Am. Chem. Soc. 114, pp. 10024-10035 (1992).
Ratner, M.A. et al. "Ion transport in solvent-free polymers", Chem. Rev. 88, pp. 109-124 (1988). 17 pgs.
Reddy, V.P. et al. "Boron-based anion receptors in lithium-ion and metal-air batteries", J. Power Sources 247, pp. 813-820 (2014).
Reed, A.E. et al. "Natural Population Analysis" J. Chem. Phys. 83, 2, pp. 735-746, 1985. 13 pgs.
Shriver, D.F. et al. "Structure and ion transport in polymer-salt complexes" Solid State Ionics. 5, 83-88 (1981).
Singh, U.C. et al. "An Approach to Computing Electrostatic Charges for Molecules" J. Comp. Chem., vol. 5, No. 2, pp. 129-145, 1984. 19 pgs.
Sylla, S. et al. "Electrochemical study of linear and crosslinked poe-based polymer electrolytes" Electrochim. Acta vol. 37, No. 9, pp. 1699-1701 (1992).
Tarascon, J.M. et al. "Issues and challenges facing rechargeable lithium batteries" Nature 414, 359-367 (2001).
Timachova, K. et al. "Effect of molecular weight and salt concentration on ion transport and the transference number in polymer electrolytes" Macromolecules 48, 7882-7888 (2015).
Tudryn, G.J. et al. "Molecular Mobility and Cation Conduction in Polyether-Ester-Sulfonate Copolymer Ionomers" Macromolecules, 2012, 45, 3962-3973.
Watanabe, M. et al. "Carrier transport and generation processes in polymer electrolytes based on poly(ethylene oxide) networks", Macromolecules 20, pp. 569-573 (1987).
Webb, M.A. et al. "Chemically specific dynamic bond percolation model for ion transport in polymer electrolytes", Macromolecules 48, 7346-7358 (2015).
Webb, M.A. et al. "Systematic computational and experimental investigation of lithium-ion transport mechanisms in polyester-based polymer electrolytes" ACS Cent. Sci. (2015) 1, pp. 198-205.
Weigend, F. et al, "Balanced basis sets of split valence, triple zeta valence and quadruple zeta valence quality for H to Rn: Design and assessment of accuracy" Physical Chemistry Chemical Physics 7, pp. 3297-3305, 2005.
Wick, C.D. et al., "Connectivity-altering monte carlo simulations of the end group effects on volumetric properties for poly(ethylene oxide)", Macromolecules 37, pp. 7026-7033 (2004).
Wilson, D.J. et al. "Synthesis of Block Copolymers Based on Oxyethylene Chains and Their Use as Polymer Electrolytes" British Polymer Journal, 1990, vol. 22, No. 2, pp. 129-135. 8 pgs.
Wong, D. et al. "Nonflammable perfluoropolyether-based electrolytes for lithium batteries" J. Prod. Natl. Acad. Sci. U.S.A., 2014, vol. 111, No. 9, pp. 3327-3331.
Wright, P.V. "Developments in polymer electrolytes for lithium batteries" MRS Bull. pp. 597-602 (2002).
Yakelis, N.A. et al. "Safe Preparation and Purification of Sodium Tetrakis[(3,5-tifluoromethyl)phenyl]borate ($NaBArF_{24}$): Reliable and Sensitive Analysis of Water in Solutions of Fluorinated Tetraarylborates" Organometallics, 2005, 24, pp. 3579-3581.
Zamyatina, V.A. et al., "Polymeric Boron Compounds" Russian Chem. Rev., 1964, vol. 33, No. 10, pp. 524-532. 12 pgs.
Zhang, L. et al. "Highly conductive trimethylsilyl oligo(ethylene oxide) electrolytes for energy storage applications", J. Mater. Chem. 18, pp. 3713-3717 (2008) 6 pgs.
Zhang, S.S. et al. "A novel electrolyte solvent for rechargeable lithium and lithium-ion batteries", J. Electrochem. Soc., vol. 143, No. 12, pp. 4047-4053 (1996).
Zheng, J. et al., "Minimally augmented Karlsruhe basis sets", Theor. Chem. Acc., 128, pp. 295-305, 2011.
International Search Report and Written Opinion for PCT/US2017/012224 filed Jan. 4, 2017 on behalf of California Institute of Technology et al. dated Apr. 18, 2017. 14 pages.
Burns, A.B. et al. "Strategies for the Synthesis of Well-Defined Star Polymers by Anionic Polymerization with Chlorosilane Coupling and Preservation of the Star Architecture during Catalytic Hydrogenation", Macromolecules, 2016. 49 (6), 2063-2070.
Caruso, T. et al. "Characterization of PEO-Lithium Triflate Polymer Electrolytes: Conductivity, DSC and Raman Investigations", Ionics (2002) vol. 8 pp. 36-43.
Fan, L. et al. "Enhanced ionic conductivities in composite polymer electrolytes by using succinonitrile as a plasticizer", Solid State Ionics (2008) vol. 179 pp. 1772-1775.
Lascaud, S. et al. "Phase Diagrams and Conductivity Behavior of Poly(ethylene oxisw)—Molten Salt Rubbery Electrolytes", Macromolecules (1994) vol. 27 pp. 7469-7477.
Marzantowicz, M. et al. "Crystalline phases, morphology and conductivity of PEO:LiTFSI electrolytes in the eutectic region", Journal of Power Sources (2006) vol. 159 pp. 420-430.
Shin, J. et al. "Ionic liquids to the rescue? Overcoming the ionic conductivity limitations of polymer electrolytes", Electrochemistry Communications (2003) vol. 5 pp. 1016-1020.
Walker Jr., C.W. et al. "Improvement of Ionic Conductivity in Plasticized PEO-Based Solid Polymer Electrolytes", J. Electrochem. Soc. (1993) vol. 140 No. 12 pp. 3409-3412.

* cited by examiner

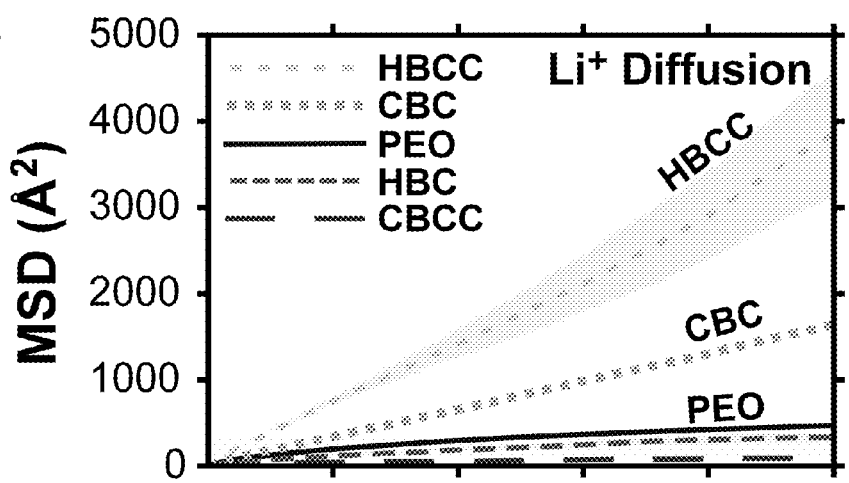
FIG. 3A
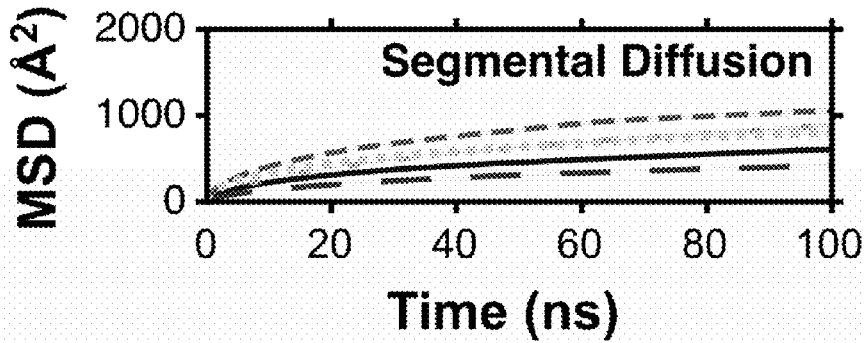
FIG. 3B
FIG. 3C

ANION-COORDINATING POLYMER ELECTROLYTES AND RELATED COMPOSITIONS, METHODS AND SYSTEMS

CROSS REFERENCE TO RELATED APPLICATIONS

The present application claims priority to U.S. Provisional Application No. 62/274,443 entitled "Electrolytes with Efficient and Selective Ion Conductivity Based on Asymmetric Charge Distributions" filed on Jan. 4, 2016 and U.S. Provisional Application No. 62/410,010 entitled "Electrolytes with Efficient and Selective Ion Conductivity Based on Asymmetric Charge Distributions" filed on Oct. 19, 2016, the content of each of which is incorporated by reference in its entirety.

STATEMENT OF GOVERNMENT GRANT

This invention was made with government support under Grant Nos. CHE1335486, CHE1334410 awarded by the National Science Foundation. The government has certain rights in the invention.

TECHNICAL FIELD

The present disclosure relates to polymer electrolytes and related compositions, methods and systems.

BACKGROUND

Solid polymer electrolytes ("SPE") have the potential to increase both the energy density and stability of lithium-based batteries. Low $Li^+$ conductivity however remains a barrier to technological viability.

Despite the chemical diversity of polymers developed for solid electrolytes, challenges still remain for developing solid polymer electrolytes for efficient conduction of cations in applications related to battery, fuel cell and display applications.

SUMMARY

Provided herein are anion-coordinating polymers, electrolytes and related compositions, methods and systems, which allow in several embodiments an increase in cation diffusivity, conductivity and transference number and a decrease in anion diffusivity, relative to cation-coordinating polymers.

According to a first aspect, an anion-coordinating polymer is described. The anion-coordinating polymer comprises a plurality of anion-coordinating units of Formula (I)

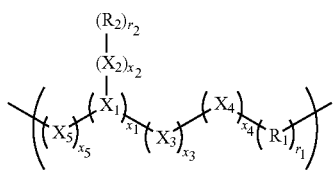

Formula (I)

wherein
$X_1$, is B, Al or Ga,
$X_2$, $X_3$ $X_4$ and $X_5$ are atoms other than H each optionally bound to one to three hydrogen atoms,
$R_1$ and $R_2$ are independently a C1 to C5 linear alkyl group optionally substituted with one or more C1 to C4 alkyl groups, the one or more C1 to C4 groups being optionally substituted with a BF2 group,
$x_1=1$, and $x_2$, $X_3$, $X_4$, and $x_5$ are independently 0 or 1, so that $x_1+x_2+X_3+x_4+x_5=1$ to 4, and
$r_1$ and r2 are independently 0 or 1
and wherein
$X_1$, forms together with any optionally bound H atoms, a united atom having a positive partial charge with a magnitude $|\delta 1|=0.25$ to $1.15\pm 0.1$, and
each of $X_2$, $X_3$ $X_4$ and $X_5$ is an atom independently forming, together with any optionally bound H atoms, a united atom having a negative partial charge, with negative partial charges of $X_2$, $X_3$ $X_4$ and $X_5$ united atoms having a magnitude $|\delta 2|$ equal to or less than $|d1|$;
optionally in combination with one or more cation coordinating units of Formula (II)

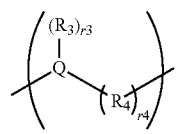

Formula (II)

wherein
Q is a group of one to 5 atoms other than H each optionally bound to one to three hydrogen atoms, in which
at least one atom other than C forms together with any optionally bound H atoms, a united atom having has a negative partial charges with a magnitude $|\delta 5|$
and each of the remaining atoms form together with any optionally bound H atoms a united atom, with the remaining united atoms having a positive partial charges with a magnitude $|\delta 6|\leq|\delta 5|$
$R_3$ and $R_4$ are independently a C1 to C5 linear alkyl group optionally substituted with one or more C1 to C4 alkyl groups, and
r3 and r4 are independently 0 or 1,
wherein the anion-coordinating units of Formula (I) are independently selected to provide in the anion-coordinating polymer a total number of anion-coordinating units u and the cation-coordinating units of Formula (II) are independently selected to provide in the anion-coordinating polymer a total number of cation-coordinating units v, and wherein u≥v.

According to a second aspect, an electrolyte is described. The electrolyte comprises one or more anion-coordinating polymers herein described together with a salt soluble in the one or more anion-coordinating polymers.

According to a third aspect, a battery is described. The battery comprises an electrolyte comprising one or more anion-coordinating polymers herein described together with one or more salt soluble in the one or more anion-coordinating polymer, the ionically electrically connected to an anode and a cathode of the battery.

According to a fourth aspect, a method and system to provide an anion-coordinating polymer herein described. The method comprises; providing a plurality of monomers each monomer comprising one or more anion coordinating units of Formula (I), one or more cation-coordinating units of Formula (II), and/or one or more linking units of formula (III),

wherein L is a moiety of formula (IIIa) to (IIIh)

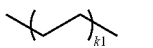 Formula (IIIa)

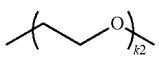 Formula (IIIb)

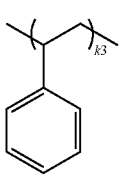 Formula (IIIc)

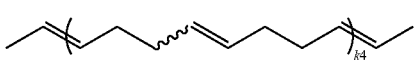 Formula (IIId)

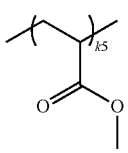 Formula (IIIe)

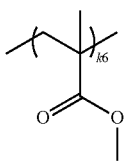 Formula (IIIf)

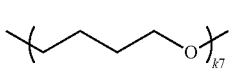 Formula (IIIg)

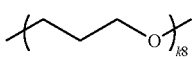 Formula (IIIh)

wherein $k_1$ to $k_8$ are independently selected from 1 to 100.

The method further comprises polymerizing the provided monomers for a time and under condition to obtain one or more anion-coordinating polymers having a total number of cation-coordinating units v and a total number of anion-coordinating units u, with u≥v.

The system comprises monomers comprising anion-coordinating units of Formula (I) and/or cation-coordinating units of Formula (II) and/or linking units of Formula (III), for simultaneous combined or sequential use in the method to provide an anion-coordinating polymer herein described.

According to a fifth aspect, a method and a system are described to provide an electrolyte herein described. The method comprises mixing at least one anion-coordinating polymer herein described with at least one salt soluble in the at least one anion-coordinating polymer to provide the electrolyte herein described.

The system comprises at least one anion-coordinating polymer herein described with at least one salt soluble in the at least one anion-coordinating polymer for simultaneous combined or sequential use in the method to provide an electrolyte herein described.

According to a sixth aspect, a composition is described comprising at least one anion-coordinating polymer herein described together with an acceptable vehicle.

The anion-coordinating polymers, electrolytes and related compositions, methods and systems herein described allow in some embodiments to achieve an increase in cationic diffusivity and a significant decrease in anion diffusivity, relative to cationic coordinating polymers.

The anion-coordinating polymers, electrolytes and related compositions, methods and systems herein described allow in some embodiments to increase cationic transference number relative to cationic coordinating polymers.

The anion-coordinating polymers, electrolytes and related compositions, methods and systems herein described allow in some embodiments to increase cationic conductivity relative to cationic coordinating polymers.

The anion-coordinating polymers, electrolytes and related compositions, methods and systems herein described allow in some embodiments to decrease anion conductivity relative to cationic coordinating polymers.

The anion-coordinating polymers, electrolytes and related compositions, methods and systems herein described allow in some embodiments to increase cationic diffusivity and transference number relative to cationic coordinating polymers.

The anion-coordinating polymers, electrolytes and related compositions, methods and systems herein described, can be used in several embodiments in connection with applications wherein use of an electrolyte with a high cationic conductivity is desirable, including but not limited to manufacturing of electrolytes and batteries, such as $Li^+$, $Na^+$, and $Mg^{2+}$, batteries, where cationic intermediates are the conductive species suitable to be used in applications such as electrochromic displays and electrolytic capacitors and additional applications which are identifiable by a skilled person.

The details of one or more embodiments of the present disclosure are set forth in the description below. Other features, objects, and advantages will be apparent from the description and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 1A shows schematic depiction of solid polymer electrolyte operation in cation-coordinating polymers and anion-coordinating polymers with exemplary structures. Cations are preferentially complexed in the conventional cation-coordinating environment, whereas anion complexation is promoted in anion-coordinating environments. FIG. 1B shows mean-squared displacement of $Li^+$ and several anions in PEO in the dilute-ion regime, based on MD trajectories at 400 K. The asymmetric transport of anions and cations in PEO is reflected in the higher diffusivities of all anions relative to $Li^+$. Average values are plotted as solid lines and standard errors are plotted as shaded regions. FIG. 1C shows exemplary chemical structures of the simulated anion-coordinating polymers. FIG. 1D shows chemical structures of the simulated ions.

FIG. 2A shows representative coordination structures of each ion in each polymer. The CHELPG derived partial charges used in the MD simulations are shown in the left column. FIG. 2B shows histograms of the number of polymer-ion contacts averaged across the simulations. The data is derived from MD trajectories at 400 K in the dilute-ion regime.

FIGS. 3A-C show in some embodiments contrasting $Li^+$ transport behavior in cation-coordinating and anion-coordinating polymers. FIG. 3A shows comparison of the mean-squared displacement (MSD) of $Li^+$ in all polymers. FIG. 3B shows contact durations for $Li^+$ and the predominant binding atoms in each polymer (see FIG. 2A, O for PEO; $CH_3$ for CBC; $CH_2$ for CBCC; and H for HBC and HBCC). FIG. 3C shows MSD of the polymer monomer units. The data is derived from MD trajectories at 400 K in the dilute-ion regime. Average values are plotted as lines and standard errors are plotted as shaded regions.

FIG. 4A shows comparison of the mean-squared displacement (MSD) of $Cl^-$ in all polymers. FIG. 4B shows contact durations for $Cl^-$ and its predominant binding atom in each polymer (see FIG. 2A, C for PEO and FIG. 2B for all anion-coordinating polymers). FIG. 4C shows MSD of the polymer monomer units. The data is derived from MD trajectories at 400 K in the dilute-ion regime. Average values are plotted as lines and standard errors are plotted as shaded regions.

FIG. 5A shows transference numbers for all salts in the dilute-ion regime. Dotted lines are a guide to the eye. FIG. 5B shows solvation free energies for each ion in each polymer and the lattice energies of the corresponding Li-salts (dotted lines). FIG. 5C shows fractional contribution of each anion to the total salt solvation free energy for each polymer. The free energies are calculated via thermodynamic integration at 400 K in the dilute-ion regime. The anion solvation free energies have an additional contribution from the quantum chemical relaxation of the solvation structures calculated via free-energy perturbation.

DETAILED DESCRIPTION

Figure 1A:
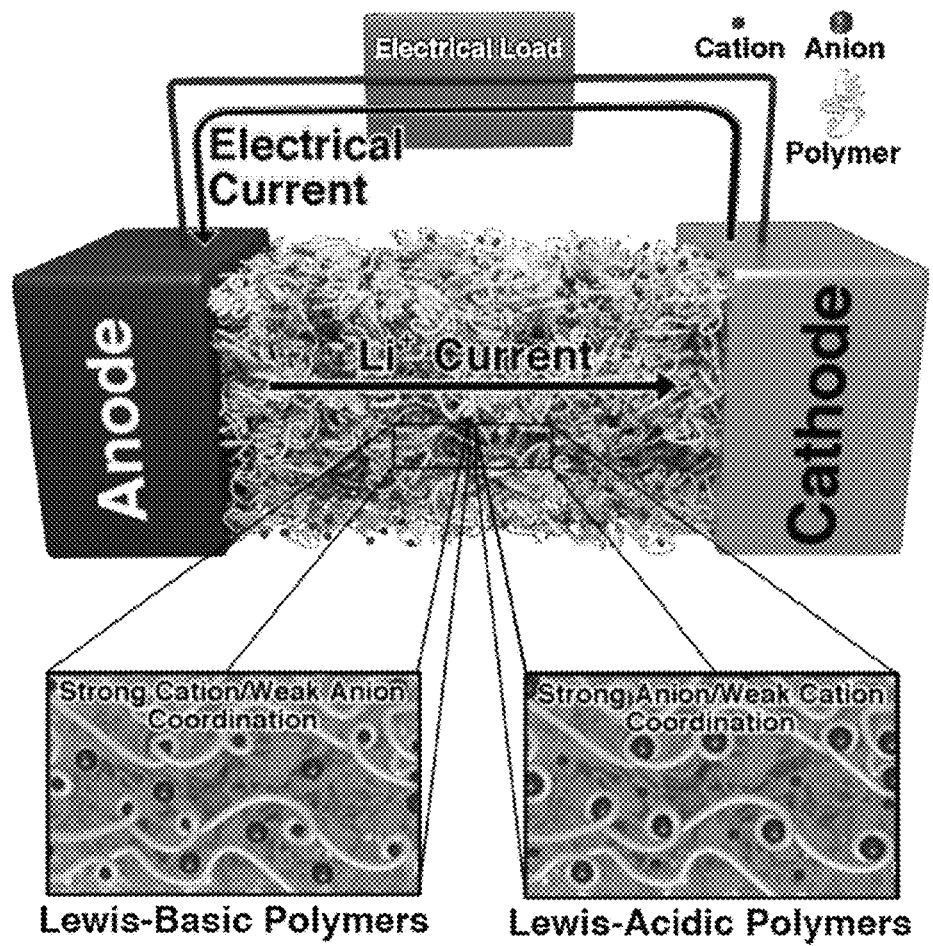
FIGS. 1A-D show schematic depiction of solid polymer electrolyte operation in cation-coordinating polymers and anion-coordinating polymers.

Provided herein are anion-coordinating polymer, electrolytes and related compositions, methods and systems which allow in several embodiments an increase in cation diffusivity, conductivity and/or transference number and a decrease in anion diffusivity and/or anion conductivity, relative to cation-coordinating polymers.

The term "anion-coordinating" refers to a chemical moiety that is configured to have a partial positive charge. The term "cation-coordinating" refers to a chemical moiety that is configured to having a partial negative charge. Exemplary anion coordinating chemical moieties are Lewis acids which are chemical moieties configured to receive at least one lone pair electrons. Exemplary cation-coordinating chemical moieties are Lewis bases which are chemical moieties configured to donate at least one lone pair electrons. An anion-coordinating chemical moieties, such as a Lewis acid, can interact with a cation coordinating chemical moieties, such as a Lewis base, to produce a coordinate bond, a type of bond in which one reactant gives its electron pair to another reactant. The product resulting from a reaction of the Lewis acid and a Lewis base is also indicated as a Lewis adduct.

A plurality of anion-coordinating moieties and/or cation-coordinating moieties (herein also anion-coordinating units or cation-coordinating units) can be comprised in a single molecule as will be understood by a skilled person. In particular, anion-coordinating moieties and cation-coordinating moieties can be comprised in a single molecule in different ratios and combinations. The preponderance of anion-coordinating moieties or cation-coordinating moieties in a resulting molecule, will determine whether the resulting molecule is a anion-coordinating molecule, a cation-coordinating molecule.

Possible anion-coordinating molecules, comprise polymers which are molecules comprising repeating structural units connected one with another to form chain of various lengths with or without branches. An oligomer as used herein is defined as a polymer containing a total of 25 or fewer monomeric moieties. In particular, polymers can be anion-coordinating, cation-coordinating or neutral depending on the presence of anion coordinating and/or cation-coordinating moieties. Anion-coordinating polymers can be Lewis acidic polymers as will be understood by a skilled person.

In embodiments of the present disclosure, an anion-coordinating polymer comprises a plurality of anion-coordinating units optionally in combination with one or more cation coordinating units and/or other units such as linkers, in a combination such that the anion-coordinating units are predominant with respect to any cation-coordinating units if any cation coordinating unit present. In particular, one or more anion-coordinating units can be present alone or in combination with one or more cation-coordinating units within a monomer or within different monomers as will be understood by a skilled person.

In anion-coordinating polymers herein described, the anion-coordinating polymers comprises a plurality of anion-coordinating units of Formula (I)

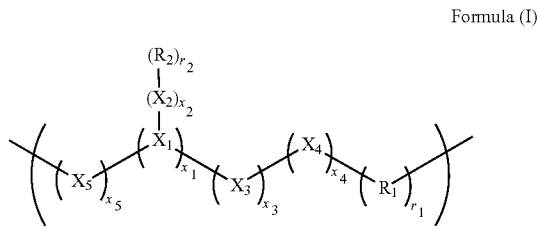

Formula (I)

wherein
$X_1$ is B, Al or Ga,
$X_2$, $X_3$, $X_4$ and $X_5$ are atoms other than H each optionally bound to one to three hydrogen atoms,
$R_1$ and $R_2$ are independently a C1 to C5 linear alkyl group optionally substituted with one or more C1 to C4 alkyl groups, the one or more C1 to C4 groups being optionally substituted with a BF2 group,
$x_1=1$, and $x_2$, $x_3$, $x_4$, and $x_5$ are independently 0 or 1, so that $x_1+x_2+x_3+x_4+x_5=1$ to 4, and
$r_1$ and $r_2$ are independently 0 or 1.

Additionally, in an anion-coordinating unit of Formula (I) $X_1$, is B, Al or Ga forming, together with any optionally bound H atoms, a united atom having a positive partial charge with a magnitude $|\delta_1|=0.25$ to $1.15\pm0.1$, and each of $X_2$, $X_3$ $X_4$ and $X_5$ is an atom independently forming, together with any optionally bound H atoms, a united atom having a negative partial charge, with negative partial charges of $X_2$, $X_3$ $X_4$ and $X_5$ united atoms having a magnitude $|\delta_2|$ equal to or less than $|\delta_1|$.

The term "united atom" as used herein indicates an atom other than hydrogen optionally bound to one to three hydrogens where the atom other than hydrogen combined with all hydrogen atoms bound to, has a partial charge.

In particular, in a united atom, the partial charge of the united atom is equal to the sum of the partial charges of the atom other than hydrogen and the partial charges of the bonded hydrogens. Some united atoms are atoms other than carbon (herein also indicated as heavy atoms) and the partial charges of the united atom is a positive partial charge. Some united atoms are carbon atoms and the partial charge of the united atom is a negative partial charge. For example, a united atom X1 of Formula I can be B and the positive partial charge of the united atom is defined as the sum of the partial charge of the B atom and the partial charges of all the hydrogens bound to the B atom. Also a united atom X2 of Formula I can be C and the negative partial charge of the united atom is defined as the sum of the partial charge of the C atom and the partial charges of all the hydrogens bound to the C atom.

The term "partial charge $\delta$" of an atom or a group of atoms indicates a fractional electronic charge value measured in elementary charge units created due to a redistribution of the valence electron density in chemical bonds. The partial charge can be derived directly from experimental quantities, e.g., dipole moments, electrostatic potentials, or free energy differences. Alternatively, the partial charge can be calculated from quantum chemical calculations.

In embodiments, herein described partial charges $\delta$ are calculated on the interior unit of a homotrimer of units in the all-trans configuration that is in the gas phase. In embodiments in which one unit is comprised in one monomer the partial charges $\delta$ are calculated on the interior monomer of a homotrimer of monomers in the all-trans configuration that is in the gas phase.

In some embodiments, the partial charge can be derived from a least-squares fit to the electrostatic potential calculated in a large number of points around the molecule of interest. Examples of such potential-based methods are charges from electrostatic potential ("CHELP") and charges from electrostatic potentials using a grid-based method ("CHELPG"). In the CHELP method, points are selected symmetrically on spherical shells around each atom (L. E. Chirlain and M. M. Francl, *J. Comput. Chem.*, 6, 894, 1987) while in the CHELPG method, points are selected on a regularly spaced cubic grid with increased point density (C. M. Breneman and K. B. Wiberg, *J. Comput. Chem.*, 11, 361, 1990).

In some embodiments, the partial charge $\delta$ can be a partial charge of a single atom or a group of atoms defined as a "united atom". The term "united atom" comprises a single heavy atom other than carbon combined with all hydrogen atoms bound to the heavy atom. The partial charge of the united atom is equal to the sum of the partial charges of the heavy atom and the partial charges of the bonded hydrogens. For example, the partial charge of a united atom comprised in X of Formula (I) can be +0.59 and the partial charge of the united atom is defined as the sum of the partial charges of +0.86 for B and −0.27 for H, for the united atom BH as X in HBC as an embodiment of Formula (I).

In some embodiments, the partial charge $\delta$ of an atom or a united atom is a CHELPG charge, i.e. charges from electrostatic potentials using a grid-based method. The CHELPG charge of the atom or the united atom has a value of greater than or equal to 0.25, preferably in a range between 0.25 and 1.5.

The partial charge can be calculated with quantum chemistry software such as Gaussian, GAMESS, and others identifiable to a person of ordinary skill in the art. Methods for calculating the partial charges are well documented in related literature and will be known to a person of ordinary skill in the art (R. S. Mulliken, *J. Chem. Phys.*, 23, 10, 1833-1840, 1955; F. L. Hirshfeld, *Theor. Chem. Acc.*, 44, 129-38, 1977; U. C. Singh and P. A. Kollman, *J. Comp. Chem.*, 5, 129-45, 1984; A. E. Reed, R. B. Weinstock, and F. Weinhold, *J. Chem. Phys.*, 83, 2, 735-746, 1985; A. V. Marenich, S. V. Jerome, C. J. Cramer and D. G. Truhlar, *J. Chem. Theory Comput.*, 8, 527, 2012; L. E. Chirlain and M. M. Francl, *J. Comput. Chem.*, 6, 894, 1987; C. M. Breneman and K. B. Wiberg, *J. Comput. Chem.*, 11, 361, 1990). For example, in some instances, the electrostatic potential and CHELPG charges can be calculated with the quantum chemistry software Gaussian 94 using the hybrid density functional method B3LYP (see Example 1). In some other cases, the calculations can be performed with the ab initio Hartree-Fock (HF) method and with Moller-Plesset second-order perturbation theory (MP2).

The term "quantum chemical" or "quantum mechanics" calculations refer to calculation methods based on a number of classes of quantum chemical models that describe molecules in terms of interactions among nucleic and electrons and molecular geometry in terms of minimum energy arrangements of nuclei. Various levels of approximations have been developed to make a compromise between accuracy and computational cost. Exemplary approximation methods include Hartree-Fock approximation, Moller-Plesset model (MP), the second-order Moller-Plesset model (MP2), density functional theory (DFT), semi-empirical models that introduce empirical parameters to simplify the calculations, and other approximation models as will be recognized by a person skilled in the art of computational chemistry.

Density functional theory ("DFT") is an electron-density-based approximation method in which instead of solving the full Schrödinger equation for the many-electron wavefunction, two-particle probability density, i.e. the probability of finding an electron at position $r_1$ and an electron at position $r_2$, is employed for the purpose of calculating the ground state energy. Detailed description of density functional theory can be found in related literatures such as S. Grimme, J. Antony, S. Ehrlich, and H. Krieg, *J. Chem. Phys.*, 132, 154104, 2010; F. Weigend and R. Ahlrichs, *Phys. Chem. Chem. Phys.*, 7, 3297-3305, 2005; J. Zheng, X. Xu, and D. Truhlar, *Theor. Chem. Acc.*, 128, 295-305, 2011; and C. M. Breneman and K. B. Wiberg, *J. Comp. Chem.*, 11, 361-373, 1990. herein incorporated by reference in its entirety.

Various approximations have been employed to replace the exact exchange energy resulting from the quantum nature of electrons with an exchange-correlation functional. Hybrid functionals are a class of approximation to the exchange-correlation function in density functional theory. The hybrid functionals incorporate a portion of exact exchange from Hartree-Fock theory with a portion of exchange and correlation from other sources. The exact exchange energy functional is expressed in terms of Kohn-Sham orbitals rather than density. One of the exchange-correlation functionals used in DFT is B3LYP (Becke, three-parameter, Lee-Yang-Parr) (see Example 1). Another commonly known exchange-correlation functional is PBE functional that mixes PBE (Perdew-Burke-Ernzerhof) exchange and correlation energy with Hartree-Fock exchange energy (see Example 1). Many other hybrid functionals or non-hybrid functionals such as gradient-corrected methods including PBE can also be used in the current disclosure and are identifiable to a person skilled in the art. Detailed information about how to select approximate functional in the DFT methods can be found in related literatures as well as simulation package use manual such as the one available on the website www.gaussian.com/g_tech/g_ur/k_dft.htm at the filing date of the present disclosure.

In particular, the CHELPG charge of an atom or a united atom can be firstly calculated based on the B3LYP-D3/def2-TZVP electron densities of the geometries optimized from molecular dynamics and then optimized by averaging the results of CHELPG calculations based on the B3LYP-D3/def2-TZVP electron densities for one hundred molecular configurations sampled from condensed phase MD trajectories (see Example 1).

In some embodiments, in the anion-coordinating unit of Formula (I), when $X_1$ is B, $X_2$ can be F and r2 is 0.

In some embodiments, at least one of $X_2$, $X_3$ and $X_5$ can be O with x2, x3 and x5 being= to 1. Accordingly in some embodiments, the anion-coordinating monomer of formula (I) can have formula

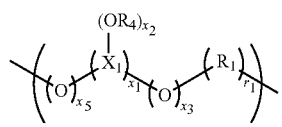

Formula (Ia)

wherein $X_1$ is B, Al, or Ga,
$x_2$, $x_3$, and $x_5$ are independently 0 or 1, and
$R_1$ is a C1 to C5 linear alkyl group optionally substituted with one or more C1 to C4 alkyl groups,
$R_4$ is H or a C1 to C4 alkyl group.

In those embodiments, δ1 ranges from +0.5 to +1.0, with δ2 equal and opposite, depending on values of x1-x5 and r1, and the identity of $X_1$, $R_1$ and $R_4$ as will be understood by a skilled person.

In one exemplary embodiment of an anion-coordinating unit of Formula (Ia), X1=B, R4=H, $R_1$=CH$_2$; $r_1$=2, $x_1$=$x_2$=$x_3$=$x_5$=1, δ1=1.07 and δ2=−1.07.

In some of those embodiments R1 can be a CH(CH3)-CH2 group. In some embodiments, R1 or R4 be branch points for possible graft/comb/brush polymers.

In some embodiments, X3 is a Oxygen with x3= to 1. Accordingly in some embodiments, the anion-coordinating monomer of formula (I) can have formula (Ib)

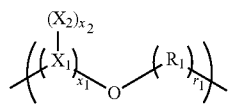

Formula (Ib)

wherein X1 is B, Al, or Ga,
$X_2$ is a C1 to C4 alkyl group, and
$x_2$, is independently 0 or 1.

In those embodiments δ1~0.8+/−0.2, and δ2 has a value balancing δ1 as will be understood by a skilled person.

In some of those embodiments R1 can be a CH(CH3)-CH2 group. In some embodiments, R1 or R4 be branch points for possible graft/comb/brush polymers.

In some embodiments, in the anion-coordinating units of Formula (I), $X_1$ is B bound to a H, $X_3$ is C bound to two hydrogens, $x_3$ is 1, $x_2$, $X_4$, $X_5$ and $r_1$ are 0 and the resulting anion-coordinating monomer is an HBC anion-coordinating units of formula (Ia)

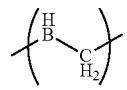

Formula (Ic)

wherein the positive partial charge of $X_1$ has a magnitude |δ1| of 0.59 and the negative partial charge of $X_3$ has a magnitude |δ2| of 0.59.

In some embodiments, $X_1$ can be B bound to a H, $X_2$ and $X_3$ are is C bound to two hydrogens, $x_3$ and $x_4$ are 1, $x_2$, $x_5$ and $r_1$ are 0 and the resulting anion-coordinating units is an HBCC anion-coordinating units of formula (Id)

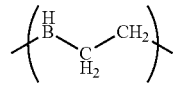

Formula (Id)

wherein the positive partial charge of $X_1$ has a magnitude |δ1| of 0.37 and the negative partial charge of X3, and X4 has a magnitude |δ2| of 0.19.

In some embodiments, in the monomer of Formula (I), $X_1$ is B, $X_2$ is C bound to three hydrogens, $x_2$ is 1, $x_3$, $x_4$, $X_5$ and $r_1$ are 0 and the resulting anion-coordinating monomer is a CBC monomer of formula (Ie)

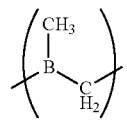

Formula (Ie)

wherein the positive partial charge of $X_1$ has a magnitude |δ1| of 1.0 and the negative partial charge of $X_2$, and $X_3$ has a magnitude |δ2| of 1.02.

In some embodiments, $X_1$ is B, $X_2$ is CH3, $X_3$ and $X_4$ are C bound to two H, $x_2$, $x_3$ and $x_4$ are 1, $x_5$ and $r_1$ are 0 and the resulting anion-coordinating monomer is an CBCC monomer of formula (If)

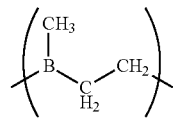

Formula (If)

wherein the positive partial charge of $X_1$ has a magnitude |δ1| of 0.62 and the negative partial charge of $X_2$, $X_3$ and X4 has a magnitude |δ2| of 0.46.

In some embodiments, the monomer of Formula (I) can have $X_1$, $X_2$, $X_3$ and $X_4$ and $R_1$ selected to provide monomers of formulas (Ig) to (Iv)

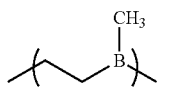
(Ig)

(Ih)

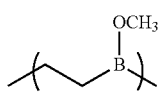
(Ii)

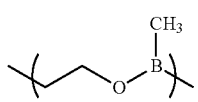
(Ij)

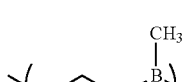
(Ik)

(Il)

(Im)

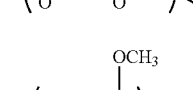
(In)

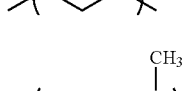
(Io)

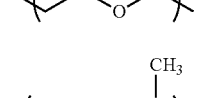
(Ip)

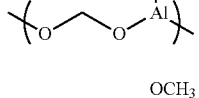
(Iq)

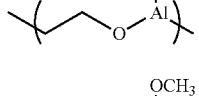
(Ir)

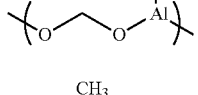
(Is)

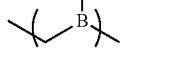
(It)

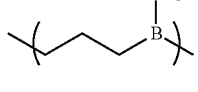

-continued

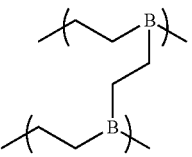
(Iu)

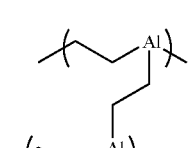
(Iv)

In embodiments herein described, the total number of anion-coordinating units u≥v with v being the total number of cation-coordinating units in the anion-coordinating polymer. In some embodiments the total number of anion-coordinating units of formula (I) is equal to or u≥¾ (u+v). In some embodiments the total number of anion-coordinating units of formula (I) is equal to or u≥⅘ (u+v).

In some embodiments, the total number of anion-coordinating units u is comprised in monomers forming ¾ of the total number of the monomers of the polymer. In some embodiments the total number of anion-coordinating units u is comprised in monomers forming ⅘ of the total number of the monomers of the polymer. In some embodiments, the total number of anion-coordinating units u is comprised in monomers forming the total number of monomers of the anion-coordinating polymer herein described.

In some embodiments, the anion coordinating polymer herein described can comprise one or more cation coordinating units of Formula (II)

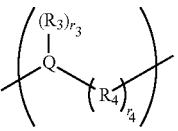
Formula (II)

wherein

Q is a group of one to 5 atoms other than H each optionally bound to one to three hydrogen atoms, in which at least one atom other than C forms together with any optionally bound H atoms, a united atom having has a negative partial charges with a magnitude |δ5| and each of the remaining atoms form together with any optionally bound H atoms a united atom, with the remaining united atoms having a positive partial charges with a magnitude |δ6|≤|δ5|

$R_3$ and $R_4$ are independently a C1 to C5 linear alkyl group optionally substituted with one or more C1 to C4 alkyl groups, and r3 and r4 are independently 0 or 1.

In particular, in embodiments, where cation coordinating units of Formula (II) are comprised in the anion coordinating polymer herein described, the cation-coordinating units of Formula (II) are independently selected to provide in the anion-coordinating polymer a total number of cation-coordinating units v, and wherein u≥v.

In some embodiments, the anion-coordinating polymer herein described can comprise one or more cation-coordinating monomers of Formula (IIa)

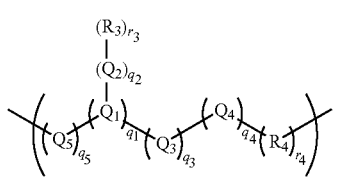

Formula (IIa)

wherein
- $Q_1$, $Q_2$, $Q_3$, $Q_4$ and $Q_5$ are atoms other than H, each optionally bound to one to three hydrogen atoms,
- $R_3$ and $R_4$ are independently selected from a C1 to C5 linear alkyl group optionally substituted with one or more C1 to C4 alkyl groups,
- $q_1=1$, and $q_2$ $q_3$, $q_4$, and $q_5$ are independently 0 or 1, so that $q_1+q_2+q_3+q_4+q_5=1$ to 4, and
- $r_3$ is 0 or 1 and wherein
- $Q_1$, is an atom forming, together with any optionally bound H atoms, a united atom having a negative partial charge with a magnitude $|\delta 5|=0.25$ to $1.15\pm0.1$, and
- each of $Q_2$, $Q_3$ $Q_4$ and $Q_5$ is an atom independently forming, together with any optionally bound H atoms, a united atom having a positive partial charge, with positive partial charges of $Q_2$, $Q_3$ $Q_4$ and $Q_5$ united atoms having a magnitude $|\delta 6|$ equal to or less than $|\delta 5|$.

In some embodiments, $Q_1$ can be an atom selected from B, Al, or Ga. In some of those embodiments at least one of X2, X3 and X5 can be O with x2, x3 and x5 being= to 1. Accordingly in some embodiments, the anion-coordinating monomer of Formula (I) can have formula

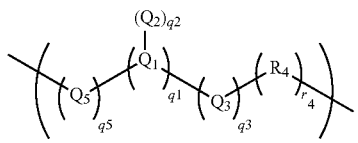

Formula (IIb)

wherein $Q_1$ is N, S or O,
$Q_2$, $Q_3$ and $Q_5$ are independently a $C_1$ to $C_4$ alkyl group
$q_2$, $q_3$, and $q_5$ are independently 0 or 1, and wherein when $Q_1$ is O $q_2$ is 0 and
R3 is a C1 to C5 linear alkyl group optionally substituted with one or more C1 to C4 alkyl groups,
wherein when Q1 is N q2 is 1 and when Q1 is S or O, q2 is 0.

In those embodiments, δ5 ranges from about −0.25 to −0.6, with δ6 (the sum of the remaining charges) being equal in magnitude and opposite in sign.

In one exemplary embodiment of Q1 is O, and q1=1, Q2, Q5, and Q3=0 and R3=CH2 and r3=0, the δ5=−0.46 and δ6=+0.46.

In some of those embodiments R3 can be a CH(CH3)-CH2 group. In some embodiments, R1 or R4 be branch points for possible graft/comb/brush polymers.

In some embodiments, X1 can be an atom selected from B, Al, or Ga and X3 is a Oxygen with x3= to 1.

Accordingly in some embodiments, the cation-coordinating monomer of formula (III) can have formula (IIc)

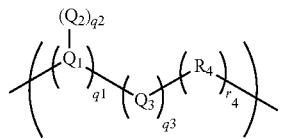

Formula (IIc)

wherein $Q_1$ is N, S or O,
$Q_2$, and $Q_3$ are independently a $C_1$ to $C_4$ alkyl group,
$q_2$, and $q_3$ are independently 0 or 1, wherein when $Q_1$ is O $q_2$ is 0 and
R3 is a C1 to C5 linear alkyl group optionally substituted with one or more C1 to C4 alkyl groups,
wherein when Q1 is N q2 is 1 and when Q1 is S or O, q2 is 0.

In those embodiments, δ5 will range from about −0.25 to −0.6, with δ6 (the sum of the remaining charges) being equal in magnitude and opposite in sign.

In some of those embodiments R1 can be a CH(CH3)-CH2 group.

In some embodiments, the anion-coordinating polymer herein described can comprise one or more linking units of formula (III),

III wherein L is a moiety of formula (IIIa) to (IIIh)

Formula (IIIa)

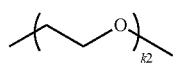

Formula (IIIb)

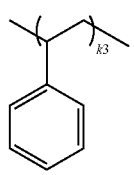

Formula (IIIc)

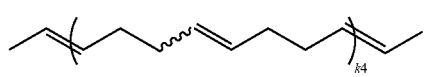

Formula (IIId)

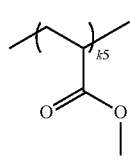

Formula (IIIe)

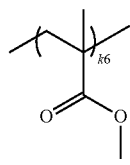

Formula (IIIf)

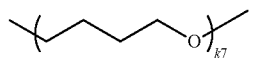

Formula (IIIg)

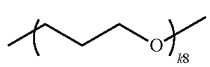

Formula (IIIh)

wherein $k_1$ to $k8$ are independently selected from 1 to 100.

In some embodiments, an anion-coordinating polymer herein described can comprise one or more anion-coordinating units of Formula (I), one or more cation-coordinating units of formula (II) and/or linker of Formula (III) within monomers arranged in linear or branched structures. In embodiments, where the monomers comprise oxygen bonded to boron atoms, the monomers are configured to have the oxygens linked to the boron atoms separated one from the other by at least 10 additional atoms to avoid decomposition via ring formation.

In some embodiments, the anion-coordinating polymers herein described are comprised of alternating anion-coordinating units of Formulas (I), and in particular, alternating units independently selected from Formula (Ia) to Formula (Iv) (either in a set pattern or in a stochastic pattern with a given fraction of each type of unit).

In some embodiments, the anion-coordinating polymers herein described are comprised of alternating anion-coordinating units of Formulas (I), and in particular, alternating units independently selected from Formula (Ia) to Formula (Iv) and cation coordinating units of Formula (II), such as ethylene oxide, either in a set pattern or in a stochastic pattern with a given fraction of each kind of monomer are also included in this disclosure.

In some embodiments, the anion-coordinating polymers herein described are comprised of alternating anion-coordinating units of Formula (I), and in particular, alternating units independently selected from Formula (Ia) to Formula (Iv) and optionally cation coordinating units of Formula (II), but with added or subtracted methylene spacer groups between moieties, with additional cross-links between polymer strands, or including comb- or brush-polymer architectures [Buriez, O.; Han, Y.; Hou, J.; Kerr, J.; Qiao, J.; Sloop, S.; Tian, M.; Wang, S. Journal of Power Sources 2000, 89, 149-155] Changing the density of anion-coordinating sites can impact the conduction and salt solubility. Crosslinks between chains can increase the structural and electrochemical stability of these polymers while retaining the same spacing between anion-coordinating units. Comb and brush polymer architectures can also be used for reducing crystallinity and the glass transition temperature. [Gray, F. M. Polymer Electrolytes; Connor, J. A., ed.; RSC Materials Monographs; The Royal Society of Chemistry, 1997]

In some embodiments, the anion-coordinating polymers herein described are comprised of Di-block, tri-block, or multi-block polymer comprising various combinations of anion-coordinating units of Formula (I), and in particular, alternating units independently selected from Formula (Ia) to Formula (Iv) and optionally cation coordinating units of Formula (II).

In some embodiments, monomers comprising one or more anion-coordinating units of Formula (I) can be combined to provide one or more polymers unspecified, statistical random alternative block and/or graft copoloymers, optionally in combination with cation-coordinating units of formula (II) and linker of Formula (III) to form one or more of a linear polymer, a graft polymer molecule star-shaped polymer, a comb polymer a brush polymer a polymer network and a dendrimer polymer.

The term "graft polymer" as used herein indicates a branched polymer molecule in which one or more of the side chains are different, structurally or configurationally, of the main chain.

In particular in an exemplary embodiment, any two distinct monomeric units comprising units for Formula (I), (II) and/or (III) can be se used as the backbone, and other monomers comprising other units of Formula (I) (II) and/or (III) replicated as an oligomeric side chain to obtain a graft polymer wherein the combination of two distinct monomeric units is such that the total number of anion-coordinating units is equal to or higher of the total number of cationic coordinating units if present. The oligomeric side chain can have a number of monomeric units that is less than that of the main (backbone chain), and the entire polymer will include a total number of anion-coordinating units u is equal to or higher than v with v be the total number of cation coordinating units in the polymers. In some embodiments, side chains can be dispersed homogeneously or randomly. In one exemplary embodiment, a backbone can be provided with monomers comprising anion-coordinating units of Formula (Ii), with the leftmost CH2 being replaced by a branch point CHXp, where Xp is an oligomer of formed by monomers comprising or consisting of another anion coordinating units.

Various methods available for preparation of graft polymers can be used to prepare anion-coordinating graft polymers herein described. In particular anionic polymerization from relevant monomer with reactive subgroups (e.g. presented for click chemistry reactions) or also grafting onto methodologies as will be understood by a skilled person.

The term "star-shaped polymer" as used herein indicates a branched polymer molecule in which a single branch point gives rise to multiple linear chains or arms. If the arms are identical the star polymer molecule is said to be regular. If adjacent arms are composed of different repeating subunits, the star polymer molecule is said to be variegated In some embodiments any combination of monomers comprising units of Formula (I)(II) and/or (III) (replicated into oligomeric form) can be used to construct a anion-coordinating star polymer as long as the combination results in a total number of anion-coordinating unit of formula (I) equal to or higher than the total number of cation-coordinating unit in the anion-coordinating polymer.

In some embodiments, wherein the oligomers can react with silane core, chlorosilane derivative cores can be used in conjunction with monomers of any one of formulas (I), (II) and/or (III) according to procedures described in (http://pubs.acs.org/doi/pdf/10.1021/acs.macromol.5b02764) at the filing date of the present disclosure as will be understood by a skilled person. Additional cores can be used as will be understood by a skilled person. Anion-coordinating star polymers can also be formed from anionic polymerization using reactive cores and available prepared polymers with reactive ends in an end first approach. A core first approach can also be used to provide anion-coordinating star polymers as will be understood by a skilled person.

The term "comb polymer" as used herein indicates of a main chain with two or more three-way branch points and linear side chains. If the arms are identical the comb polymer molecule is said to be regular.

In some embodiments any combination of monomers comprising units of Formula (I), (II) and/or (III) (replicated into oligomeric form) can be used to construct a anion-coordinating comb polymer as long as the combination results in a total number of anion-coordinating unit of formula (I) equal to or higher than the total number of cation-coordinating units if any is present in the anion-coordinating polymer.

Various methods available for preparation of comb polymers can be used to prepare anion-coordinating comb polymers herein described. In particular anionic polymerization from relevant monomer with reactive subgroups (e.g. presented for click chemistry reactions) or also grafting onto methodologies as will be understood by a skilled person.

Additional types of anion coordinating polymers herein described comprise brush polymers, polymer network and a dendrimer. A "brush polymer" as used herein indicates a main chain with linear, unbranched side chains and where one or more of the branch points has four-way functionality or larger. A "polymer network" as used herein indicates a network in which all polymer chains are interconnected to form a single macroscopic entity by many crosslinks. A "dendrimer" as used herein indicates a repetitively branched compound.

In some embodiments, one or more anion-coordinating polymers can be a statistical polymer which is a copolymer in which the distribution of A and B obeys a statistical law. In some of those embodiments an anion-coordinating polymer herein described can have formula Poly($A$-stat-$B$)  Formula (IV)

wherein A and B can be independently one or more of monomers comprising an anion-coordinating units of formula (I) a cation-coordinating monomer of Formula (II) and/or a linker unit of Formula (III). Any two distinct monomers comprising units of Formulas (I), (II) and/or (III) can be used as long as the total number of anion-coordinating units in the anion-coordinating polymer of Formula (IV) is equal to or higher than the total number of the cation-coordinating units if any is present in the polymer.

In some embodiments, the statistical copolymer is a stochastic pattern copolymer comprising the distribution of m anion-coordinating units, o and o units of cation-coordinating monomer as described herein can have a formula (IV) such that the crystallinity is suppressed.

In some embodiments, a polymer which is a statistical copolymer in which the distribution of m anion-coordinating units, o and o units of cation-coordinating monomer as described herein can have a formula (V):

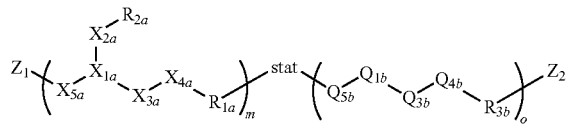

Formula (V)

wherein
X1a is independently B, Al, or Ga;
Q1b is independently selected from O, or S;
$X_{2a}$, $X_{3a}$, and $X_{5a}$ are O or CH2;
$X_{4a}$, $Q_{3b}$, $Q_{4b}$, $Q_{5b}$ are CH2,
R1a, R2a and R3b are independently C1-C5 linear alkylene group, C1-C5 linear alkenylene group, optionally substituted with one or more C1 to C4 linear or branched alkyl groups, or C1 to C4 linear or branched alkenyl groups;
Z1 and Z2 are H, C1 to C4 linear or branched alkyl groups, C1 to C4 linear or branched alkenyl groups, C1 to C4 linear or branched alkoxy groups, or C1 to C4 alkenoxy groups;
m and o are independently 5 to 500,000.

Anion-coordinating polymers of Formula (IV) and (V) can be made with radical polymerization and additional methods identifiable by a skilled person.

In some embodiments, one or more anion-coordinating polymers can be a random polymer which is a copolymer in which distribution of A and B truly random and does not obey statistical law. In some of those embodiments an anion-coordinating polymer herein described can have formula Poly($A$-ran-$B$)  Formula (VI)

wherein A and B can be independently one or more of monomers comprising an anion-coordinating units of formula (I) a cation-coordinating monomer of Formula (II) and/or a linker unit of Formula (III). Any two distinct monomers comprising units of Formulas (I)(II) and/or (III) can be used as long as the total number of anion-coordinating units in the anion-coordinating polymer of formula (VI) is equal to or higher than the total number of the cation-coordinating units if any is present in the polymer.

In some embodiments, a polymer which is a random copolymer in which the distribution of m units of anion-coordinating units, and o units of cation-coordinating units as described herein can have a formula (VII):

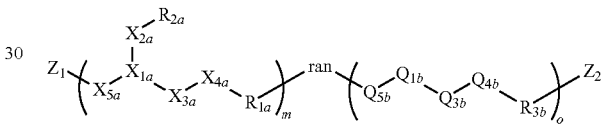

Formula (VII)

wherein
X1a is independently B, Al, or Ga;
Q1b is independently selected from O, or S;
$X_{2a}$, $X_{3a}$, and $X_{5a}$ are independently O or CH2;
X4a, Q3b, Q4b, Q5b are CH2,
R1a, R2a and R3b are independently C1-C5 linear alkylene group, C1-C5 linear alkenylene group, optionally substituted with one or more C1 to C4 linear or branched alkyl groups, or C1 to C4 linear or branched alkenyl groups;
Z1 and Z2 are H, C1 to C4 linear or branched alkyl groups, C1 to C4 linear or branched alkenyl groups, C1 to C4 linear or branched alkoxy groups, or C1 to C4 alkenoxy groups;
m and o are independently 5 to 500,000.

In some embodiments, one or more anion-coordinating polymers can be alternating polymer which is a polymer having two repeating unit A and B which are arranged alternately along the polymer chain. In some of those embodiments, an anion-coordinating polymer herein described can have formula Poly($A$-alt-$B$)  Formula (VIII)

wherein A and B can be independently one or more of monomers comprising an anion-coordinating units of formula (I) a cation-coordinating monomer of Formula (II) and/or a linker unit of Formula (III). Any two distinct monomers comprising units of Formulas (I)(II) and/or (III) can be used as long as the total number of anion-coordinating units in the anion-coordinating polymer of formula (VIII) is equal to or higher than the total number of the cation-coordinating units if any is present in the polymer.

In some embodiments, a polymer which is a alternating copolymer in which the distribution of m units of anion-coordinating units, and o units cation-coordinating units as described herein can have a formula (IX):

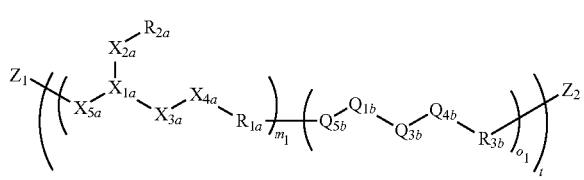

Formula (IX)

wherein
X1a is independently B, Al, or Ga;
Q1b is independently selected from O, or S;
$X_{2a}$, $X_{3a}$, and $X_{5a}$ are O or CH2;
$X_{4a}$, $Q_{3b}$, $Q_{4b}$, $Q_{5b}$ are CH2,
R1a, R2a and R3b are independently C1-C5 linear alkylene group, C1-C5 linear alkenylene group, optionally substituted with one or more C1 to C4 linear or branched alkyl groups, or C1 to C4 linear or branched alkenyl groups;
Z1 and Z2 are H, C1 to C4 linear or branched alkyl groups, C1 to C4 linear or branched alkenyl groups, C1 to C4 linear or branched alkoxy groups, or C1 to C4 alkenoxy groups;
m1 and o1 are independently 1 to 4; and
t is 5 to 500,000.

In some embodiments, one or more anion-coordinating polymers can be block polymer is a copolymer in which two monomers exists as a sequence in the polymer. In some of those embodiments, an anion-coordinating polymer herein described can have formula PolyA-block-polyB   Formula (X)

wherein A and B can be independently one or more of monomers comprising an anion-coordinating units of formula (I) a cation-coordinating monomer of Formula (II) and/or a linker unit of Formula (III). Any two distinct monomers comprising units of Formulas (I)(II) and/or (III) can be used as long as the total number of anion-coordinating units in the anion-coordinating polymer of formula (X) is equal to or higher than the total number of the cation-coordinating units if any is present in the polymer.

In particular, in some embodiments, one polymer can be used as a conducting phase (e.g. a homopolymer of a monomer comprising an anion-coordinating unit of Formula (Ig) in conjunction with another structurally rigid polymer (e.g. a homopolymer wherein the monomer comprises the linker unit of Formula (IIIc)).

In some embodiments, a polymer which is a block copolymer in which the distribution of m units of anion-coordinating units, and o units of cation-coordinating units as described herein can have a formula (XI):

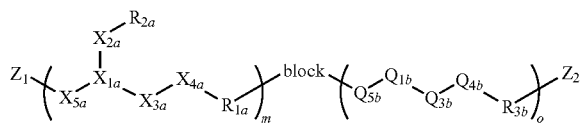

Formula (XI)

wherein
X1a is independently B, Al, or Ga;
Q1b is independently selected from O, or S;
$X_{2a}$, $X_{3a}$, and $X_{5a}$ are O or CH2;
$X_{4a}$, $Q_{3b}$, $Q_{4b}$, $Q_{5b}$ are CH2,
R1a, R2a and R3b are independently C1-C5 linear alkylene group, C1-C5 linear alkenylene group, optionally substituted with one or more C1 to C4 linear or branched alkyl groups, or C1 to C4 linear or branched alkenyl groups;
Z1 and Z2 are H, C1 to C4 linear or branched alkyl groups, C1 to C4 linear or branched
alkenyl groups, C1 to C4 linear or branched alkoxy groups, or C1 to C4 alkenoxy groups;
m and o are independently 5 to 500,000.

In some embodiments, one or more anion-coordinating polymers can be a graft polymer of formula Graft PolyA-graft-polyB   Formula (XII)

wherein A and B can be independently one or more of monomers comprising an anion-coordinating units of formula (I) a cation-coordinating monomer of Formula (II) and/or a linker unit of Formula (III). Any two distinct monomers comprising units of Formulas (I) (II) and/or (III) can be used as long as the total number of anion-coordinating units in the anion-coordinating polymer of formula (XII) is equal to or higher than the total number of the cation-coordinating units if any is present in the polymer.

In some embodiments, a brush copolymer of graft copolymer can have a formula (XIII).

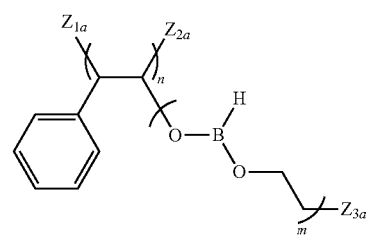

Formula (XIII)

wherein
Z1a Z2a and Z3a are independently H, C1 to C4 linear or branched alkyl groups, C1 to C4 linear or branched alkenyl groups, C1 to C4 linear or branched alkoxy groups, or C1 to C4 alkenoxy groups;
m and n are independently 5 to 500,000.

In some embodiments, one or more anion-coordinating polymers can be a cross-linked polymer of formula (XIV)

Formula (XIV)

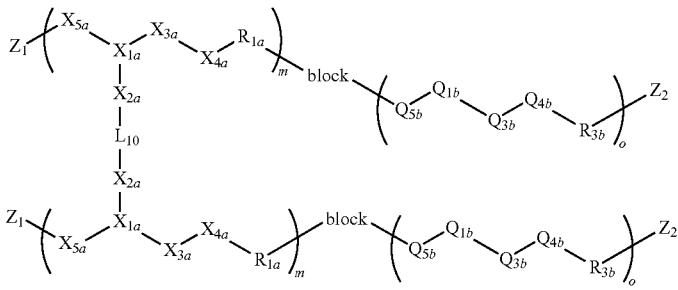

wherein
  X1a is independently B, Al, or Ga;
  Q1b is independently selected from O, or S;
  $X_{2a}$, $X_{3a}$, and $X_{5a}$ are O or CH2;
  $X_{4a}$, $Q_{3b}$, $Q_{4b}$, $Q_{5b}$ are CH2,
R1a, and R3b are independently C1-C5 linear alkylene group, C1-C5 linear alkenylene group, optionally substituted with one or more C1 to C4 linear or branched alkyl groups, or C1 to C4 linear or branched alkenyl groups;
  Z1 and Z2 are H, C1 to C4 linear or branched alkyl groups, C1 to C4 linear or branched alkenyl groups, C1 to C4 linear or branched alkoxy groups, or C1 to C4 alkenoxy groups;
  m and o are independently 5 to 500,000; and
  L10 is an independently one of Formula (IIIa), Formula (IIIb), Formula (IIIc), Formula (IIId), Formula (IIIe), Formula (IIIf), Formula (IIIg), and Formula (IIIh)

Formula (IIIa)

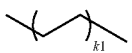

Formula (IIIb)

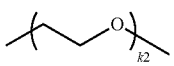

Formula (IIIc)

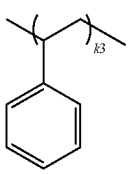

Formula (IIId)

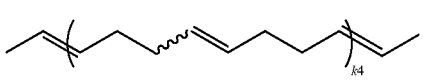

Formula (IIIe)

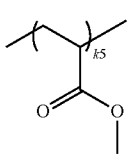

-continued

Formula (IIIf)

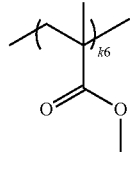

Formula (IIIg)

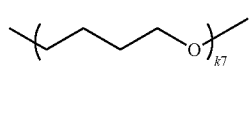

Formula (IIIh)

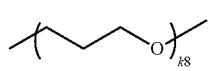

wherein k1 to k8 are independently 1-100.

In some embodiments, a cross-linked copolymer having a combination of at least one boron anion-coordinating unit, at least one aluminum anion-coordinating unit, at least one proton anion-coordinating unit, and at least one cation-coordinating unit can have a formula (XV).

Formula (XV)

In some embodiments, anion-coordinating polymers herein described can comprise one or more of monomers comprising an anion-coordinating units of formula (I) a cation-coordinating monomer of Formula (II) and/or a linker unit of Formula (III) forming a dendritic structure.

For example in some embodiments, the anion coordinating polymers herein described can have formula Formula (XVI)

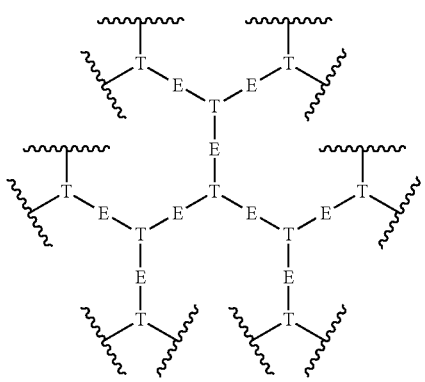

wherein T is independently B, Al or Ga, and wherein E is independently a moiety of Formula (IIIa) to (IIIh)

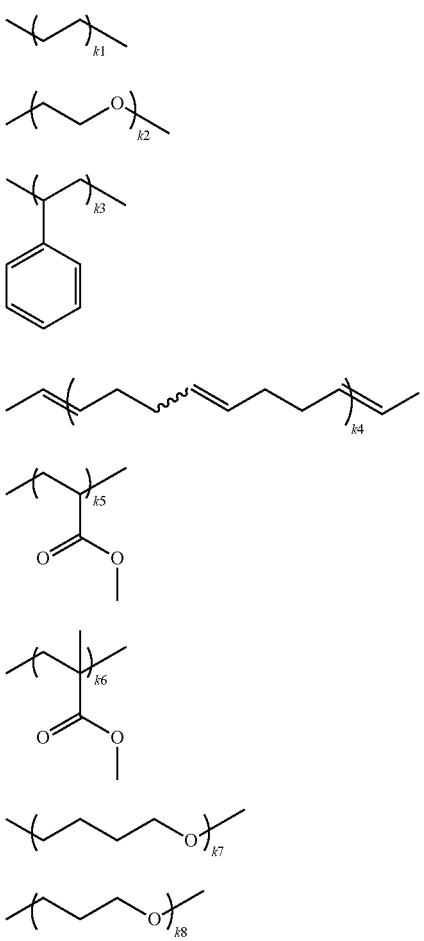

Formula (IIIa)
Formula (IIIb)
Formula (IIIc)
Formula (IIId)
Formula (IIIe)
Formula (IIIf)
Formula (IIIg)
Formula (IIIh)

with k1 to k8 are independently 1-100.

In some embodiments, the T and E moieties of the anion-coordinating polymer of Formula (XV) can be reiterated from 5 to 10,000 iterations and/or the termina of the dendritic polymer can be independently terminated with a Z1 group selected from H, C1 to C4 linear or branched alkyl groups, C1 to C4 linear or branched alkenyl groups, C1 to C4 linear or branched alkoxy groups, or C1 to C4 alkenoxy groups;

In some embodiments, an anion-coordinating polymer herein described can comprise monomers with any one of Formulas (Ie), (IIc), (IIIb) and (IIIc) in various combinations such as that the anion-coordinating units are present at a number u equal to or higher than half of the the total cation coordinating units of the polymer.

In particular in some embodiments, the monomers of a polymer herein described can comprise or consist of anion-coordinating units of Formula (Ie). In some embodiments, an anion-coordinating polymer herein described can be an homopolymer of monomeric units of Formula (Ie).

In some embodiments, the monomers of a polymer herein described can comprise or consist of anion-coordinating units of Formula (Ic). In some embodiments, an anion-coordinating polymer herein described can be an homopolymer of monomeric units of Formula (Ic).

In some embodiments, the monomers of a polymer herein described can comprise or consist of anion-coordinating units of Formula (Id). In some embodiments, an anion-coordinating polymer herein described can be an homopolymer of monomeric units of Formula (Id).

In some embodiments, the monomers of a polymer herein described can comprise or consist of anion-coordinating units of Formula (If). In some embodiments, an anion-coordinating polymer herein described can be an homopolymer of monomeric units of Formula (If).

In particular in anion-coordinating polymers herein described anion-coordinating units exhibit partial positive charge localized on the unit, which serves a physical measure of the relative affinity of the various units for cations and anions. In the polymers herein described, anion-coordinating chemical units are groups of one to three bonded atoms that exhibit a partial charge of >0.25 electrons, which is balanced by smaller negative charges in other parts of the repeat unit.

Examples of anion-coordinating polymers in the sense of the current disclosure include homopolymers or heteropolymers where the majority of the monomers is formed by one or more CBCC monomeric unit of Formula (Ie), CBC monomeric unit of Formula (If), HBCC monomeric unit of Formula (Id), HBC monomeric unit of Formula (Ic) and/or monomers of Formulas (If) to (Iv) alone or in combination with cation-coordinating unit as will be recognized by a person of ordinary skill in the art.

Anion-coordinating polymers herein described can be used in combination with salts to provide an electrolyte comprising one or more anion-coordinating polymer herein described together with a salt soluble in the anion-coordinating polymer.

The term "electrolyte" as used herein refers to a chemical substance that produces an electrically conducting solution of salts when dissolved in a medium. The dissolved salts separates into cations and anions, which disperse uniformly through the medium. Electrically, such a solution is neutral.

In electrolytes herein described salts is dissolved in a polymeric medium comprising one or more anion-coordinating polymers herein described.

Salts that can be used in combination with anion-coordinating polymers herein described comprise any ionic compound comprising a cation and anion that can dissolve in the polymeric medium herein described.

In particular in electrolytes herein described a preponderance of anion-coordinating moieties in a anion-coordinating polymer herein described increases anion binding to the polymer, thus increasing solubility of and cation transference number, and reducing cation binding to the polymer, thus increasing cation diffusivity In particular, in some embodiments of electrolytes herein described, a cation is weakly coordinated by the anion-coordinating portion of the polymer, and this interaction dominates transport when the anion-coordinating component of the polymers formed by the total number of anion-coordinating units, u is the major stoichiometric component with u equal to or greater than the total number of cation coordinating unit v.

In some embodiments of electrolytes herein described, one or more of the anion-coordinating polymers comprises a anion-coordinating component and a cation-coordinating component in a stoichiometry ratio 1:1

In some embodiments, the electrolytes herein described comprise salt and anion coordinating polymer with a ratio between salt and anion-coordinating units of the anion-coordinating polymer salt: anion-coordinating units concentrations between 1:100 and 1:5.

In some embodiments, the salt concentrations in an electrolyte herein described can be 1:5 and can be optimized by routine experimentation performed after synthesizing a polymer based on the chemistry of the anion-coordinating unit (e.g. in accordance with standard hard-soft acid-base theory) as will be understood by a skilled person. It is preferred that the ratio of salt to anion-coordinating monomer units formula (I) not exceed the ratio of u:v.

In some embodiments, electrolytes herein described comprise alkali and alkaline metal salts various anions such as halides, sulfates, sulfonates, borates nitrates, phosphates, organic anions.

In some embodiments, electrolytes herein described comprise Li-salts, with anions including all halides, $PF_6$, $AsF_6$, Triflate, TFSI, and Borate class anions. In particular, in embodiments where the anion-coordinating polymer comprises anion coordinating units of Formula I wherein X1 is B, halides salts are preferred, Anion-coordinating polymer electrolytes herein described show in several embodiments an increased cation diffusivity, and decreased anion diffusivity.

The wording "ion diffusivity" as used herein refers to a proportionality constant between the molar flux due to molecular diffusion and the gradient in the concentration of the species (or the driving force for diffusion). Diffusivity is encountered in Fick's law and numerous other equations of physical chemistry. The diffusivity is generally prescribed for a given solute-solvent pair. The higher the diffusivity (of one solute with respect to another), the faster they diffuse in a solution.

Diffusivity can measured experimentally for example using pulsed-field gradient NMR or other techniques identifiable by a skilled person Diffusivity can also be calculated mathematically. For example, diffusivities can be calculated from the long-timescale simulation trajectories using the Einstein equation:

$$D_i = \lim_{t \to \infty} \frac{d\langle |r_i(t) - r_i(0)|^2 \rangle}{6dt}, \quad (2)$$

wherein $D_i$ is the diffusion coefficient for ion, i, and the term in brackets (MSD(t)=<|r(t)−r(0)|^2>) is the MSD evaluated at time t. Due to the sub-diffusive behavior exhibited by many of the studied systems, apparent diffusivities are reported by approximating the derivative in Eq. (2) by finite difference using the MSD at t=150 and t=0 ns (see Example 5).

In some embodiments, herein described the polymer electrolytes herein described achieve up to a ten-fold increase in cationic diffusivity and a significant decrease in anion diffusivity, relative to a cation-coordinating polymer (see Example 7, 9 and 12)

A common feature of the preferred electrolytes is the preferential coordination of anions. Some of the anion-coordinating polymers do coordinate both cations and anions, and thus only marginally improve the cation transference number. Additional polymers with similar selective anion coordination are expected to manifest enhanced cation diffusivity and transference number.

Anion-coordinating polymer electrolytes herein described show in several embodiments an increased cation conductivity.

The term "ion conductivity" as used herein indicates the movement of an ion from one site to another through a medium where the ion is dissolved in a given electric field.

Figure 8:
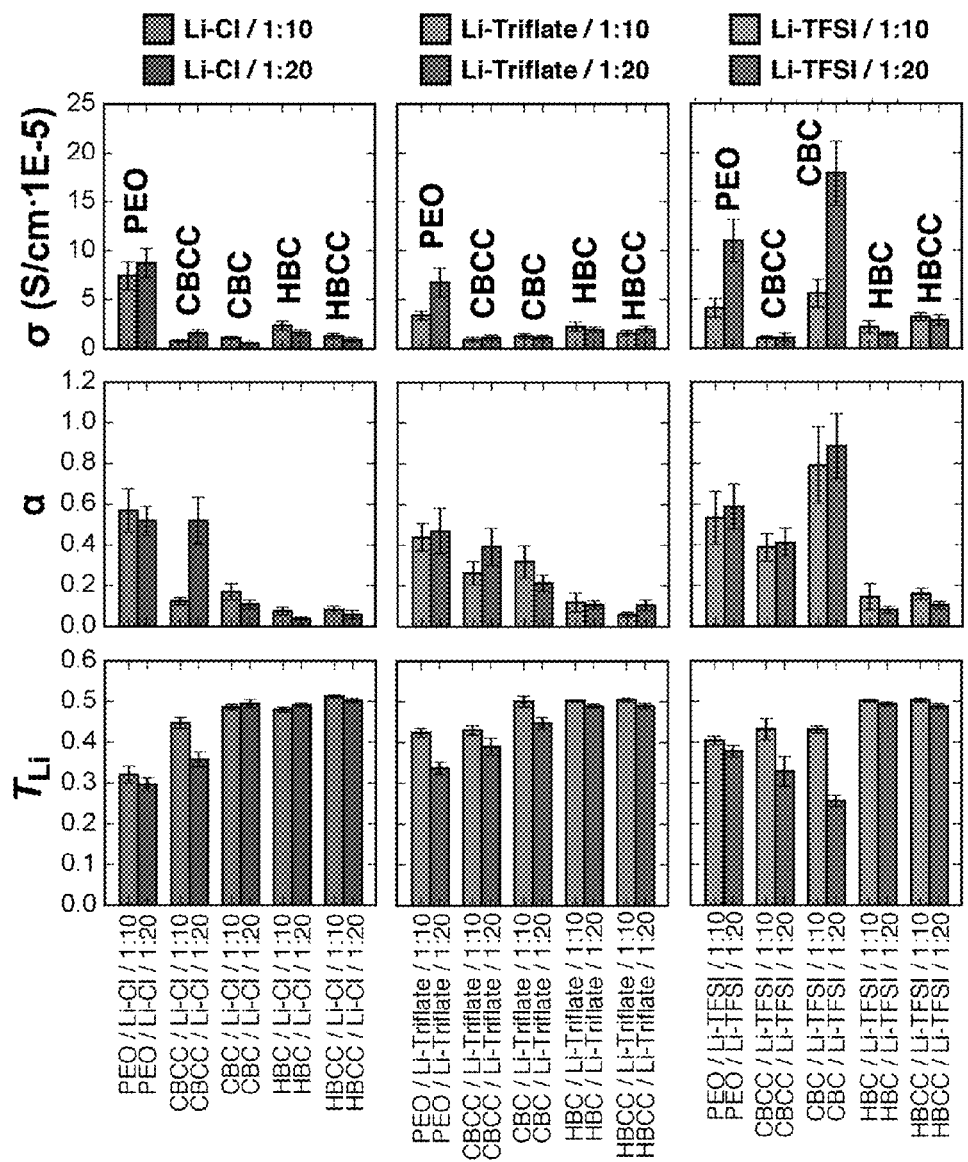
FIG. 8 show, in some embodiments, the results from finite salt concentration simulations at 400 K. Net conductivity ($\sigma$), (middle) degree of uncorrelated ion motion ($\alpha$), and (bottom) $Li+$ transference number ($T_{Li}$) for each polymer electrolyte in this study. From left to right the panels contain results for different model Li-salts: (left) LiCl, (middle) LiTriflate, (right) LiTFSI.

In particular in some embodiments, herein described the anion-coordinating polymer electrolytes herein described provide an increased conductivity compared with cation-coordinating polymer electrolytes (see Example 12, FIG. 8, CBC in Li-TFSI−)

In particular, as illustrated in the examples arrangement of the atoms in an anion coordinating units is such that the distribution of partial charges promotes stronger complexation of the anion and weaker complexation of the cation. anion transport is generally suppressed in anion-coordinating polymers, and cation transport is generally increased. In several embodiment, electrolytes comprising anion-coordinating polymers herein described are expected in a suppression of anion transport relative to cation-coordinating polymers with similar glass-transition temperatures.

In some embodiments, the electrolytes herein described can exhibit an increased transference number for the cation compared to cation-coordinating polymer as will be understood by a skilled person.

The term "transference number" with reference to an ion indicates the fraction of the total current that is carried by that ion during ion conduction. Different ions carry different fractions of the current because different ions move at different speeds under the same potential gradient. In general, a cation and an anion differ in the amount of current they can carry during electrolysis.

Ion transference number, $T_i$, can be calculated from the diffusivities using $$T_i = \frac{D_i}{D_i + D_j} \quad (3)$$

wherein $D_i$ is the diffusion coefficient for ion, i, and $D_j$ is the diffusion coefficient for ion, j, ion j being the pairing ion of ion i. For instance, ion i can be $Li^+$ and ion j can be $Cl^-$.

In particular in some embodiments, herein described the anion-coordinating polymer electrolytes herein described provide an increased transference for the cation compared with cation-coordinating polymer electrolytes (see Example 10, FIG. 5, HBCC in particular with LiCl but also other salts.

In particular, exemplified anion-coordinating polymers demonstrate in most cases a decrease in anion diffusivity, and, in some cases, an increase in cation diffusivity relative to PEO, a representative cation-coordinating polymer.

Accordingly, in some embodiments, electrolytes with anion-coordinating polymers herein described are expected to have a cation transference number increased with respect to cation-coordinating polymers, and to promote more efficient transport without need of additional extrinsic components (such as the addition of plasticizers) that can however be also comprised in electrolytes composition herein described.

In some embodiments, increasing the total number of anion-coordinating units will likely increase the capacity for binding anions in the polymer and promote that complexation as will be understood by a skilled person. Accordingly, in some embodiments, more of the solvation of the salts will be driven by anion complexation.

In some embodiments, the polymer electrolytes herein described comprise anion-coordinating polymers of comprising monomers of Formulas (V) to (XVI) and a suitable salts.

In embodiments herein described, the polymer electrolytes comprising anion-coordinating polymers are compatible with an array of Li-salts, with anions including all halides, $PF_6$, $AsF_6$, Triflate, TFSI, and Borate class anions. For example, chloride exhibits the strongest polymer interaction and highest solvation energy in the polyborane based anion-coordinating polymers (Example 8).

In some embodiments herein described, the polymer electrolyte comprising anion-coordinating polymers can further comprise plasticizing additives having polymer topologies such as brush, cross-linked, block copolymerization with stiff polystyrene repeat units. These additives can be used to tune electrolyte viscosity and structural properties without changing the fundamental ion transport mechanism.

In some embodiments, electrolytes herein described can exhibit lower viscosities at high salt-concentrations in view of the coordination of ions with the anion-coordinating unit of the polymer.

In some embodiments herein described, polymer electrolytes comprising anion-coordinating polymers can achieve up to ten-fold increase in cation diffusivity and a decrease in anion diffusivity, relative to cation-coordinating polymers such as polyethylene oxide ("PEO"). In particular, low cation diffusivity and high anion diffusivity that characterize PEO-based SPEs can be reversed to favor cation conduction in anion-coordinating polymers.

For example, in anion-coordinating polymers such as CBC and HBCC, $Li^+$ diffusivity is increased four- to ten-fold, respectively, relative to PEO. Anion-coordinating polymers such as CBC, HBCC, CBCC, and HBC exhibit improved $T_{Li}$ in comparison to cation coordinating polymer PEO. In those anion coordinating polymers anion diffusion is also suppressed as will be understood by a skilled person.

In some embodiments, the anion-coordinating polymers herein described can be comprised in a single-ion conductors as solvating matrix in single-ion conductors (e.g., by attaching anions periodically to the backbone.) in particular, embedded in a solvating matrix of the materials herein described In some embodiments, the anion-coordinating polymers herein described oligomers and molecular versions of the anion-coordinating polymers herein described can also be used to promote cation conduction in liquid and gel electrolytes.

In the present disclosure, a battery is described, comprising an electrolyte of the present disclosure comprising one or more anion-coordinating polymers herein described In particular in some embodiments herein described, a battery can comprise an anode, a cathode, and an electrolyte. The anode is the negative or reducing electrode that releases electrons to the external circuit and oxidizes during and electrochemical reaction. Metals such as Zinc and Lithium can be used as anode materials; graphitic anodes are commonly used. The cathode is the positive or oxidizing electrode that acquires electrons from the external circuit and is reduced during the electrochemical reaction. Metallic oxides and transition-metal oxides can be used as cathode materials. The electrolyte is the medium that provides the ion transport mechanism between the cathode and anode of a cell. Electrolytes are often in liquid form, such as water or other solvents, with dissolved salts, acids, or alkalis that are required for ionic conduction.

The battery herein described can achieve high conductivity, long shelf life, low flammability, structural integrity, as will be understood by a skilled person.

Anion-coordinating polymers herein described and related electrolytes can be provided with a methods and systems identifiable by a skilled person upon reading of the present disclosure. In particular in some embodiments the method comprises; providing a plurality of monomers each monomer comprising one or more anion coordinating units of Formula (I), one or more cation-coordinating units of Formula (II), and/or one or more linking units of formula (III). The method further comprises polymerizing the provided monomers for a time and under condition to obtain one or more anion-coordinating polymers having a total number of cation-coordinating units v and a total number of anion-coordinating units u, with u≥v.

An electrolyte comprising one or more anion-coordinating polymer herein described can be provided by mixing at least one anion-coordinating polymer herein described with at least one salt soluble in the at least one anion-coordinating polymer to provide the electrolyte.

In some embodiments, anion-coordinating polymers herein described are first dried in an argon glovebox. The polymers and a salt can then both be dissolved by mixing and heating with an additional solvent. The solvent can then be evaporated (preferably in a glovebox) to leave the polymer electrolyte. The solvent identity may depend on the polymer/salt combination. In some cases, the synthesis is performed in the presence of salt to obtain the polymer electrolyte as will be understood by a skilled person.

In some embodiments herein described (known practices of tuning the viscosity and mechanical properties of polymers are expected to be compatible with the polymers comprising monomers anion-coordinating units of Formula (I) and/or cation-coordinating units of Formula (II) and/or linking units of Formula (III), including polymer cross-linking, polymers with comb-topologies, using additives (plasticizers and nanoparticles), and synthesizing block-copolymers with mechanically rigid units).

In some embodiments at least one anion-coordinating polymer herein described can be comprised in a composition together with an acceptable vehicle.

In some embodiments, monomers, anion-coordinating polymers and salts can be part of systems to provide an anion-coordinating polymer and/or an electrolyte herein described. In some embodiments, the systems can be provided in the form of combination or kit of parts.

Additional materials and related methods and systems, comprising for example kit of parts or related material herein described, comprising suitable reagents, vehicles or compositions, are identifiable by a skilled person upon reading of the present disclosure.

In particular, further details concerning the anion-coordinating polymers, electrolytes and generally manufacturing and packaging of the compositions and/or the kit, can be identified by the person skilled in the art upon reading of the present disclosure.

Further features concerning the anion-coordinating polymer electrolytes, and related compositions, systems and methods of the present disclosure will become more apparent hereinafter from the following detailed disclosure of examples by way of illustration only with reference to an experimental section.

EXAMPLES

The anion-coordinating polymer electrolytes and related compositions, systems and methods herein disclosed are further illustrated in the following examples, which are provided by way of illustration and are not intended to be limiting.

In particular, the following examples illustrate cationic and anionic diffusivities conductivities and transference for the exemplary cation $Li^+$ and the exemplary anion $Cl^-$ triflate, and $TFSI^-$ in anion-coordinating and cation-coordinating environments provided by representative cation-coordinating polymer PEO and representative anion-coordinating polymers HBC, HBCC, CBC and CBCC.

In particular in the following examples the properties of cation-coordinating polymer PEO and representative anion-coordinating polymers HBC, HBCC, CBC and CBCC in connection with conductivity diffusivity and transference of $Li^+$ versus $Cl^-$ and other anions have been tested and illustrated with computational methods and protocols.

A person skilled in the art will appreciate the applicability and the necessary modifications to adapt the features described in detail in the present section, to additional anion-coordinating environments and related methods and systems according to embodiments of the present disclosure.

Example 1: Parametrization Details for Molecular Dynamics to Simulate Ion Behavior in Lewis Acidic and Lewis Basic Environment In order to investigate ion behavior of exemplary anion-coordinating polymers herein described in comparison with cation-coordinating polymers, the following parametrization protocols were used Force Field Details The optimized potentials for liquid simulations (OPLS) functional forms were employed for the stretching, bending, pair-wise, and torsional potentials used in all simulations. The total force field energy, $E_{FF}$, is expressed as, $$E_{FF} = \sum_{bonds} k_r(r-r_0)^2 + \sum_{angles} k_\theta(\theta - \theta_0)^2 + \qquad (4)$$

$$\sum_{dihedrals} \sum_{i=1}^{4} \frac{1}{2} V_i(1 + (-1)^{i+1}\cos(i\phi)) +$$

$$\sum_{i>j} \left\{ \frac{q_i q_j e^2}{4\pi \epsilon_0 r_{ij}} + 4\epsilon_{ij}\left[\left(\frac{\sigma_{ij}}{r_{ij}}\right)^{12} - \left(\frac{\sigma_{ij}}{r_{ij}}\right)^6\right]\right\}$$

where $k_r$ and $r_0$ are the bond-specific force constant and equilibrium displacement, respectively;
$k_\theta$ and $\theta_0$ are the angle-specific force constant and equilibrium angle, respectively; the $V_i$ terms are dihedral-specific Fourier coefficients, $r_{ij}$ are the interatomic separations, $q_i$ are the partial atomic charges, e is the elementary charge, and $\epsilon_{ij}$ and $\sigma_{ij}$ are the Lennard-Jones parameters for each pairwise interaction. The summation for the Lennard-Jones and Coulomb potentials runs over all intermolecular atomic pairs and all intramolecular atomic pairs separated by more than three bonds. Carbon and its attached hydrogens (UA-H) were modeled as united atoms; hydrogens bonded with boron were modeled as explicit atoms. For charge parametrization, the charge of each carbon was calculated by including the nuclear charges of any attached hydrogens.

Fitting Procedure for Intramolecular Modes

All quantum chemistry calculations were performed at the B3LYP-D3/def2-TZVP level of the theory, [Grimme, S., Antony, J., Ehrlich, S. & Krieg, H. A consistent and accurate ab initio parametrization of density functional dispersion correction (dft-d) for the 94 elements h-pu. *J. Chem. Phys.* 132, 154104 (2010).] [Weigend, F. & Ahlrichs, R. Balanced basis sets of split valence, triple zeta valence and quadruple zeta valence quality for h to rn: design and assessment of accuracy. *Physical Chemistry Chemical Physics* 7, 3297-3305 (2005)] unless otherwise noted. For calculations involving anions, the minimally augmented diffuse basis set ma-def2-TZVP was used. [Zheng, J., Xu, X. & Truhlar, D. Minimally augmented karlsruhe basis sets. *Theor. Chem. Acc.* 128, 295-305 (2011).] For each polymer, a model compound comprised of a tetrameric unit of the polymer capped by methyl groups was employed for parametrization. The model compounds were initialized in an all-trans geometry and geometry optimized followed by a frequency calculation to confirm minimization; a similar procedure was used for polyatomic anions without constraints on the initial dihedral angles. At each optimized geometry, the calculated electron densities were used for CHELPG calculations [Breneman, C. M. & Wiberg, K. B. Determining atom-centered monopoles from molecular electrostatic potentials. the need for high sampling density in formamide conformational analysis. *J. Comp. Chem.* 11, 361-373 (1990).] to obtain nuclear charges, with averaging performed over like atom types. The CHELPG charges obtained from the optimized geometry were used as an initial guess for initially parametrizing the dihedral potentials and performing the condensed phase MD simulations (see below). The optimized geometries were then used to perform constrained mode scans of each unique bond, stretch, and dihedral. Bond mode scans consisted of compression and extension ±0.1 Å about the optimized bond length in steps of 0.02 Å; angle mode scans consisted of compression and expansion by 5° about the optimized angle in steps of 1°; dihedral mode scans consisted of rotation by ±180° about the optimized angle in steps of 10°. For dihedral scans, a fragment was built from the optimized model compound by substituting non-terminal atoms separated by more than two bonds from the 2-3-atoms of the dihedral with hydrogen atoms and removing all further separated atoms. Geometry optimizations of each scan configuration were performed with the mode being parameterized constrained to a fixed value while optimizing all remaining degrees of freedom. Force constants for each stretch and bend were obtained by performing numerical least-squares fitting (Levenberg-Marquardt) to the resultant potential energy curves. The procedure used for fitting dihedrals is identical to the standard method used within OPLS force-field development; namely, fitting the dihedral Fourier coefficients to the difference between the quantum chemistry potential for the dihedral rotation and the force-field potential obtained by performing an optimized dihedral scan and summing all force-field contributions except for the dihedral being fit. [Jorgensen, W., Maxwell, D. & Tirado-Rives, J. Development and testing of the opls all-atom force field on conformational energetics and properties of organic liquids. *J. Am. Chem. Soc.* 118, 11225-11236 (1995).] Note, the latter optimized dihedral scan is performed using the force-field potential. This procedure avoids double counting bond, angle, electrostatic, and Lennard-Jones contributions to the dihedral rotation. Unlike the OPLS procedure, no effort was made to remove contributions from the $V_4$ dihedral coefficient. At this point in the procedure, Lennard-Jones parameters for the intramolecular interactions are not yet determined, so universal force-field (UFF) parameters were used as an approximation when initially fitting the dihedrals. [Rappe, A. K., Casewit, C. J., Colwell, K. S., Goddard, W. A. & Skiff, W. M. Uff, a full periodic table force field for molecular mechanics and molecular dynamics simulations. *J. Am. Chem. Soc.* 114, 10024-10035 (1992).] The dihedrals were fit sequentially in a randomized order, until all Fourier coefficients for all modes converged to within 0.01 kcal/mol. During subsequent steps in the force-field generation, when Lennard-Jones parameters and the partial charges are refined, the dihedral potentials are refit with these updated parameters using the same procedure.

Figure 10:
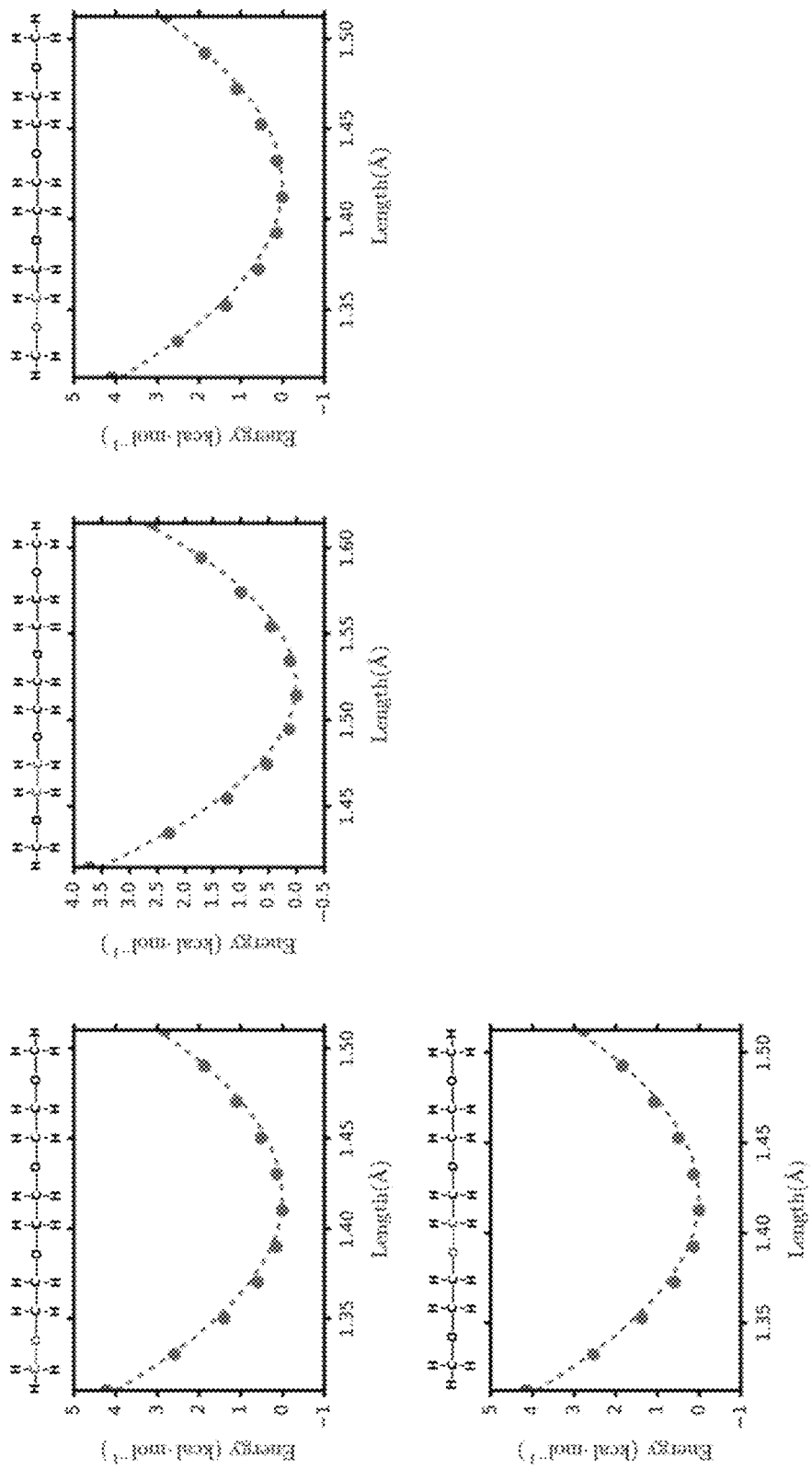
FIG. 10 shows the plots of PEO bond potentials (solid dots) calculated at the B3LYP-D3/def2-TZVP level of theory, shown with harmonic fits (dashed lines). The energy minima have been set to zero.
Figure 11:
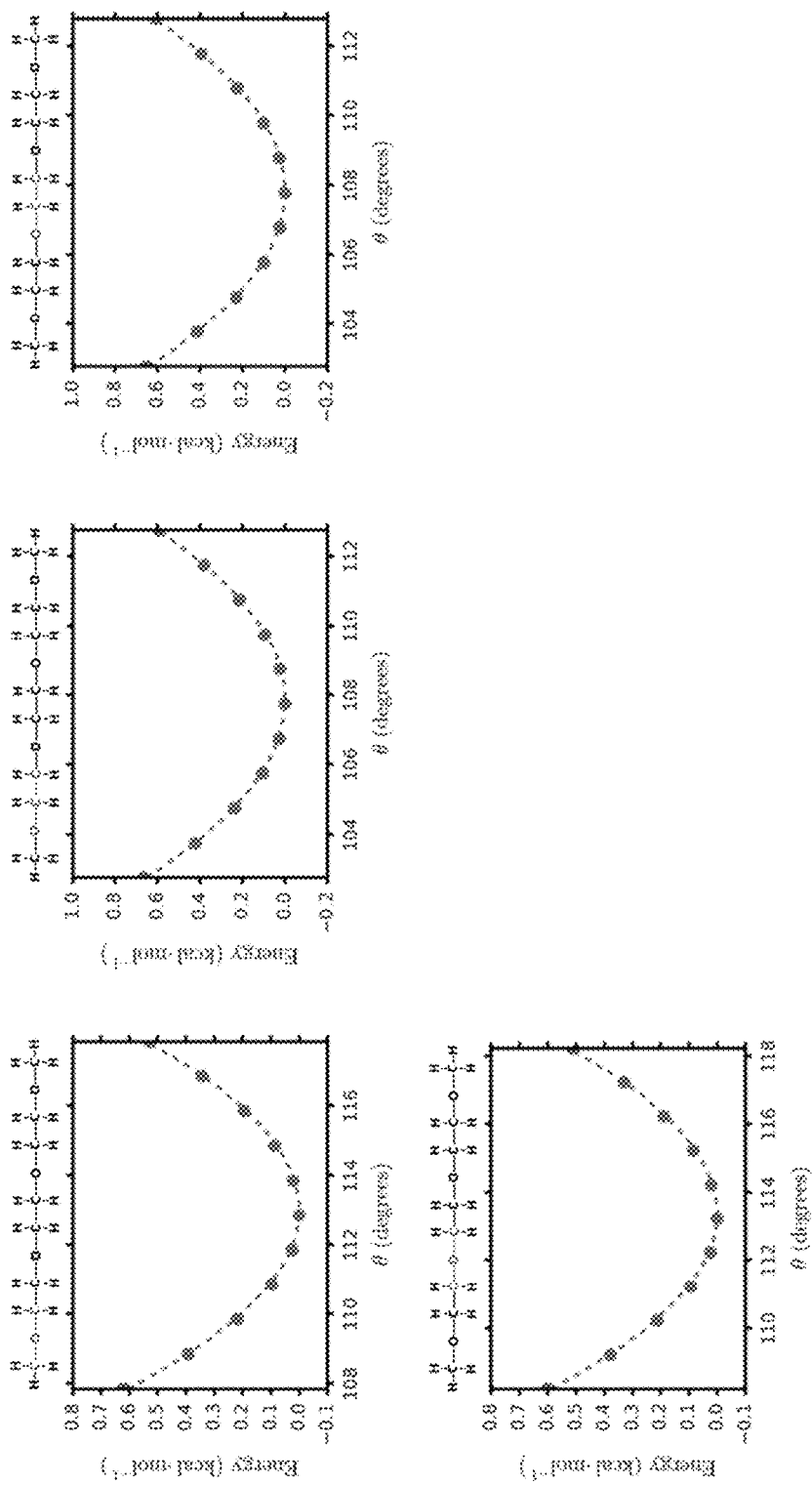
FIG. 11 shows the plots of PEO angle potentials (solid dots) calculated at the B3LYP-D3/def2-TZVP level of theory, shown with harmonic fits (dashed lines). The energy minima have been set to zero.
Figure 12:
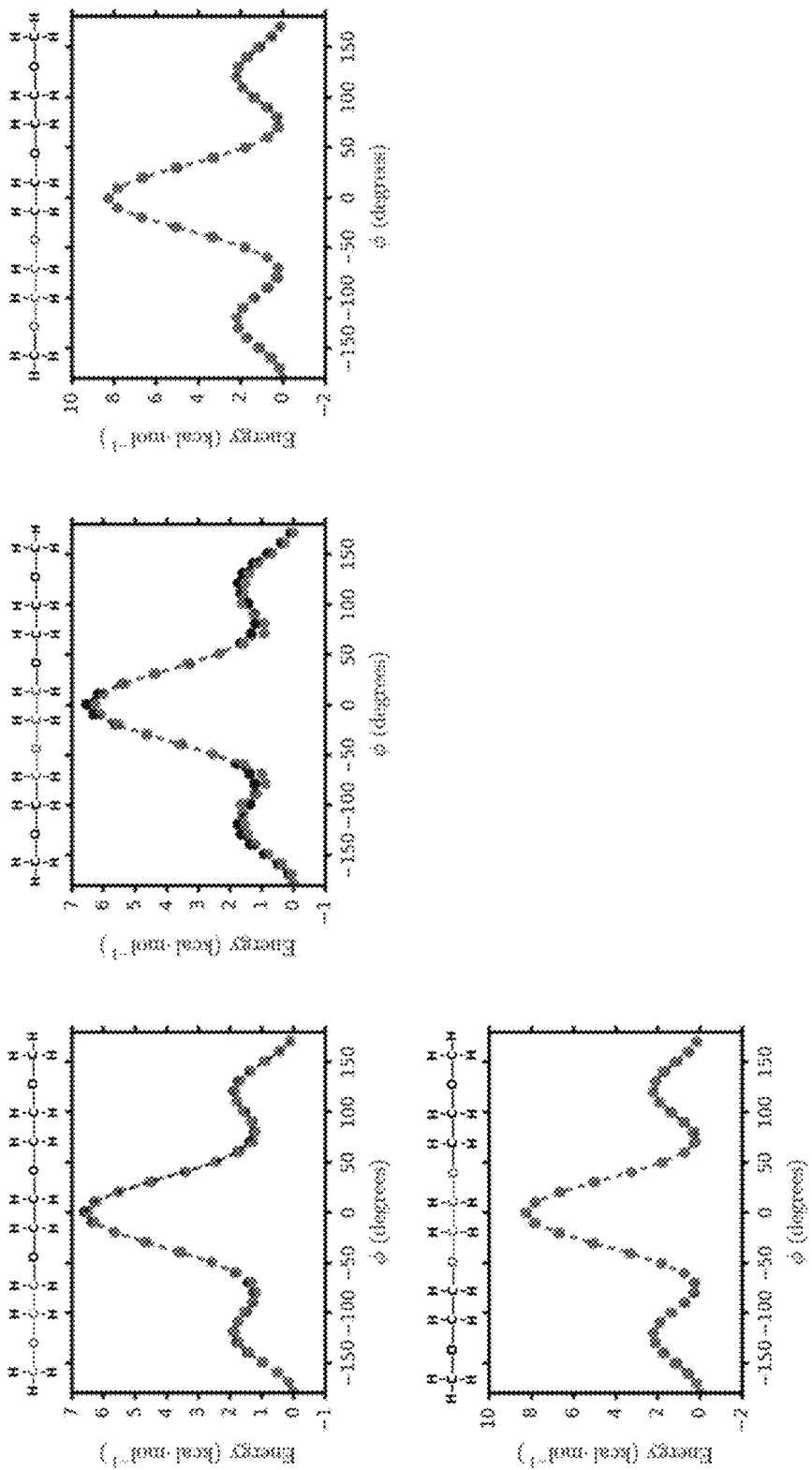
FIG. 12 shows the plots of PEO dihedral potentials (black dots) calculated at the B3LYP-D3/def2-TZVP level of theory, shown with fits to the OPLS potential (gray dots). The configuration closest to −180° has been set to zero in each plot.
Figure 13:
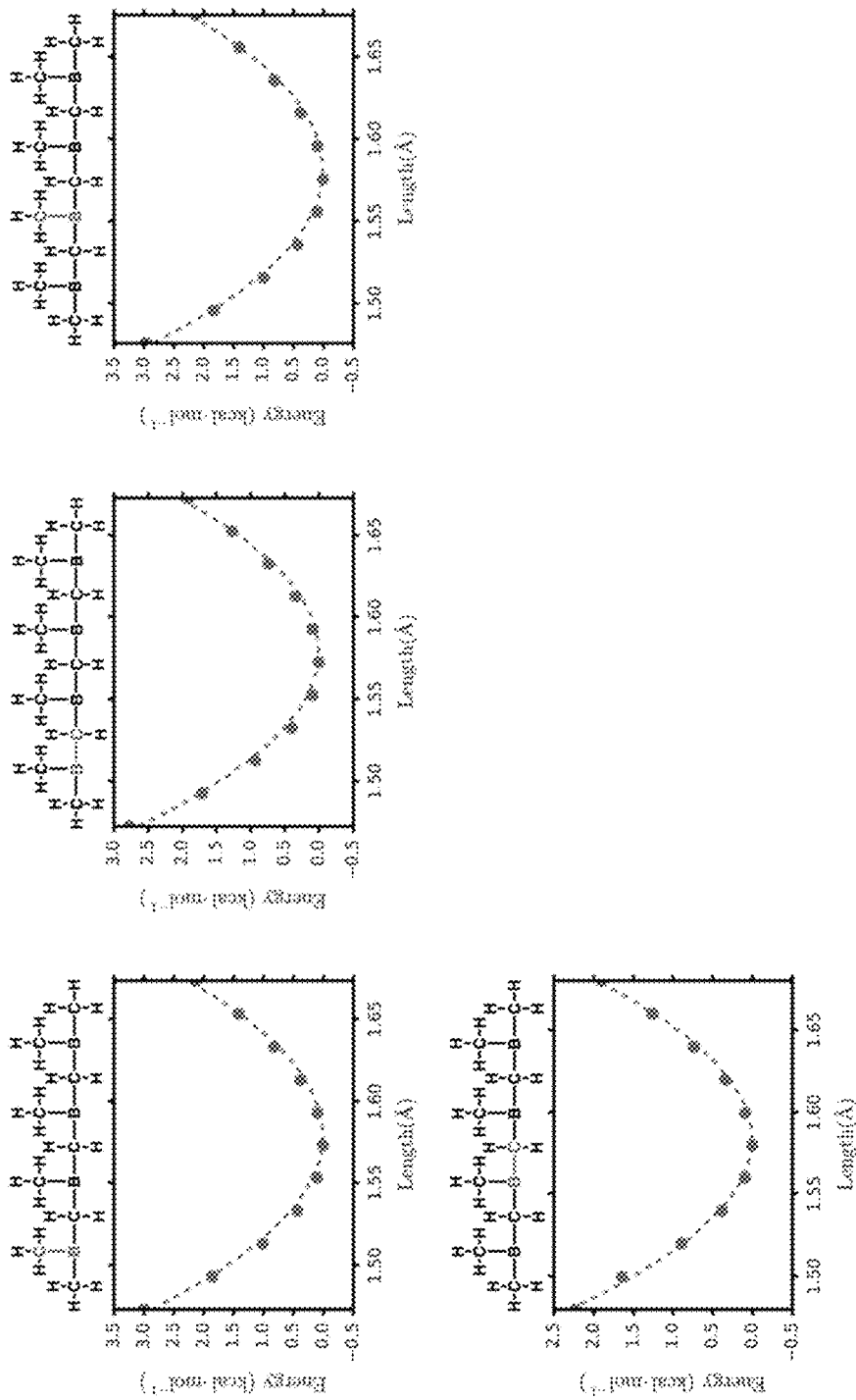
FIG. 13 shows the plots of CBC bond potentials (solid dots) calculated at the B3LYP-D3/def2-TZVP level of theory, shown with harmonic fits (dashed lines). The energy minima have been set to zero.
Figure 14:
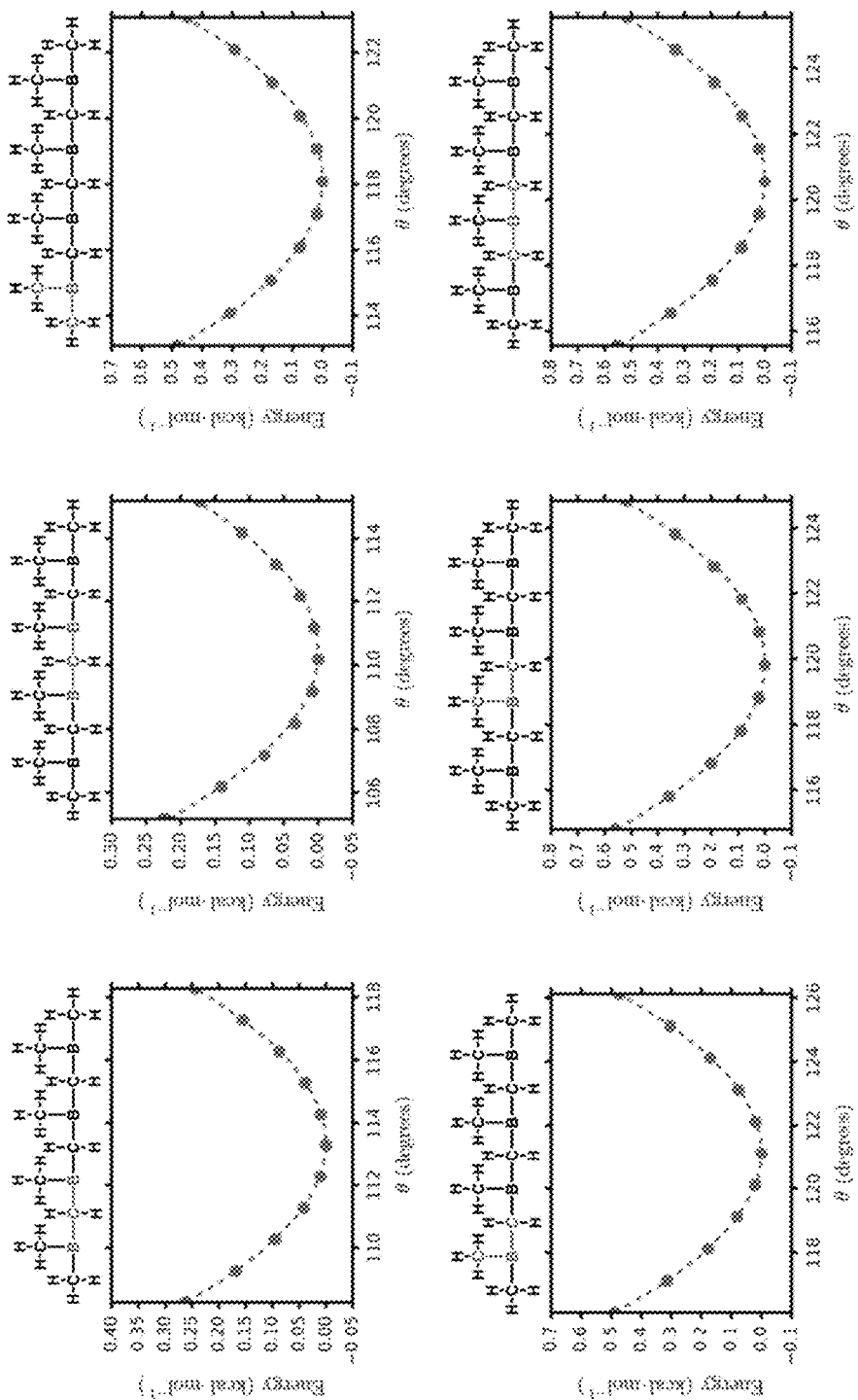
FIG. 14 shows the plots of CBC angle potentials (solid dots) calculated at the B3LYP-D3/def2-TZVP level of theory, shown with harmonic fits (dashed lines). The energy minima have been set to zero.
Figure 15:
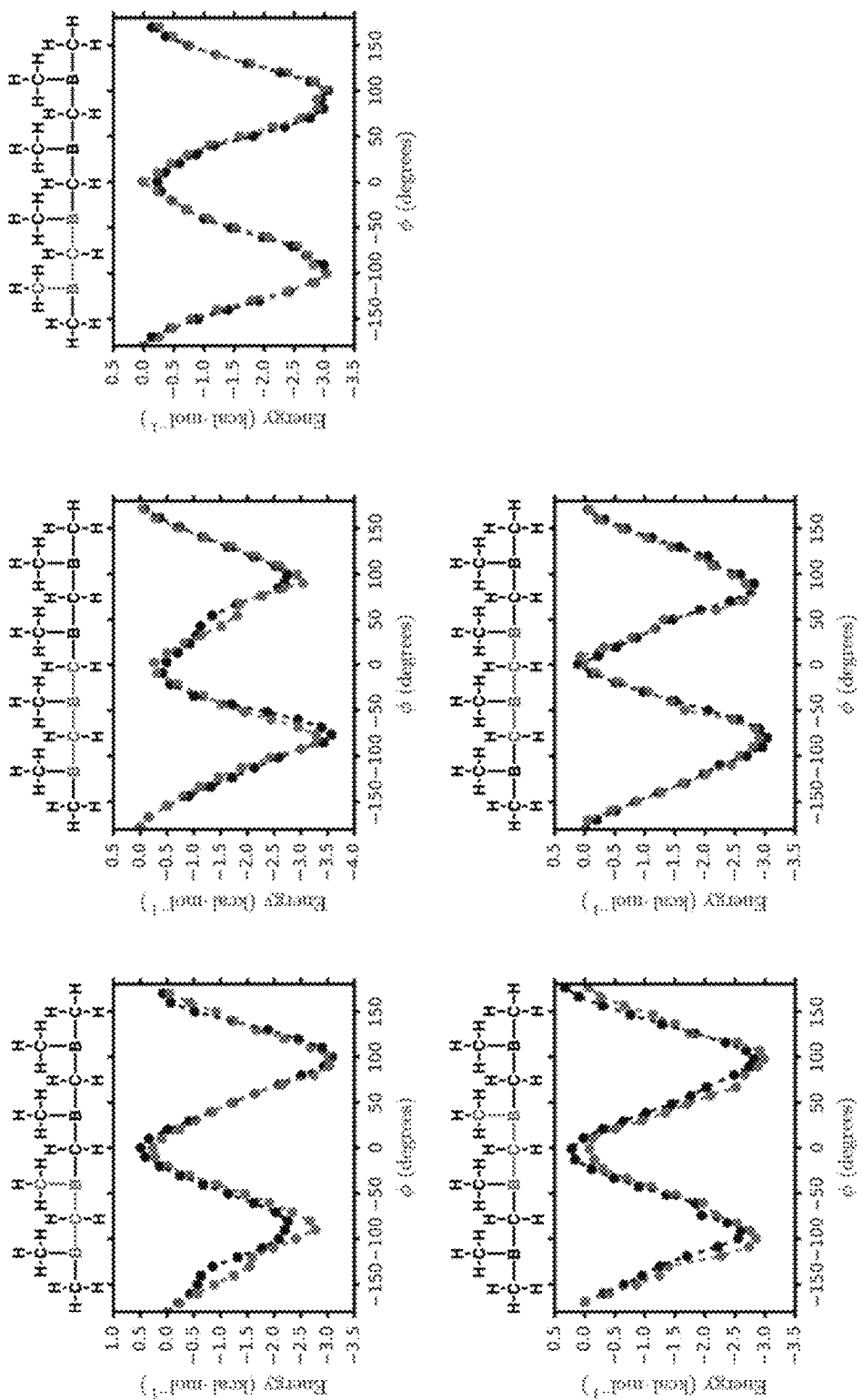
FIG. 15 shows the plots of CBC dihedral potentials (black dots) calculated at the B3LYP-D3/def2-TZVP level of theory, shown with fits to the OPLS potential (gray dots). The configuration closest to −180° has been set to zero in each plot.
Figure 16:
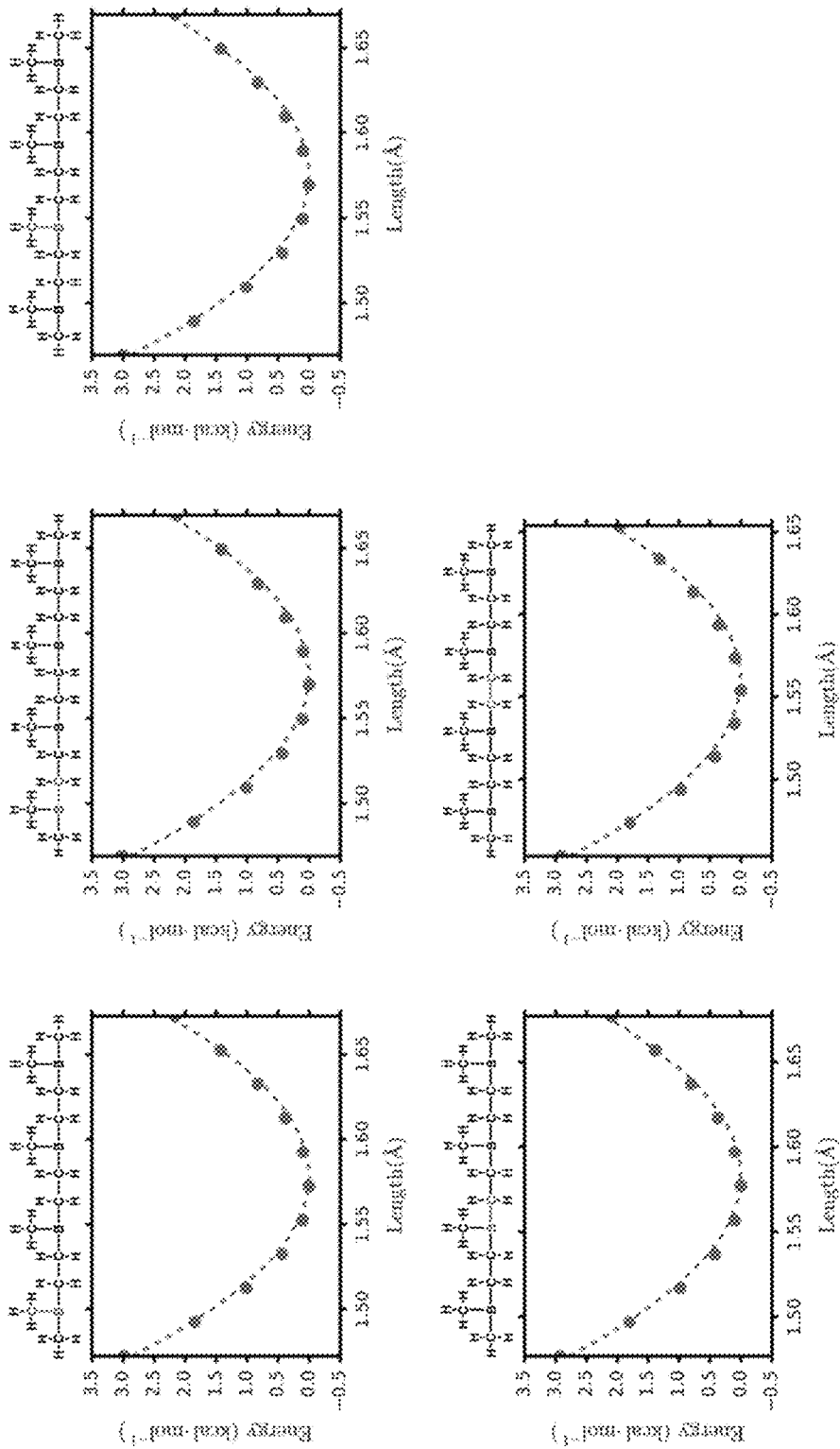
FIG. 16 shows the plots of CBCC bond potentials (solid dots) calculated at the B3LYP-D3/def2-TZVP level of theory, shown with harmonic fits (dashed lines). The energy minima have been set to zero.
Figure 17:
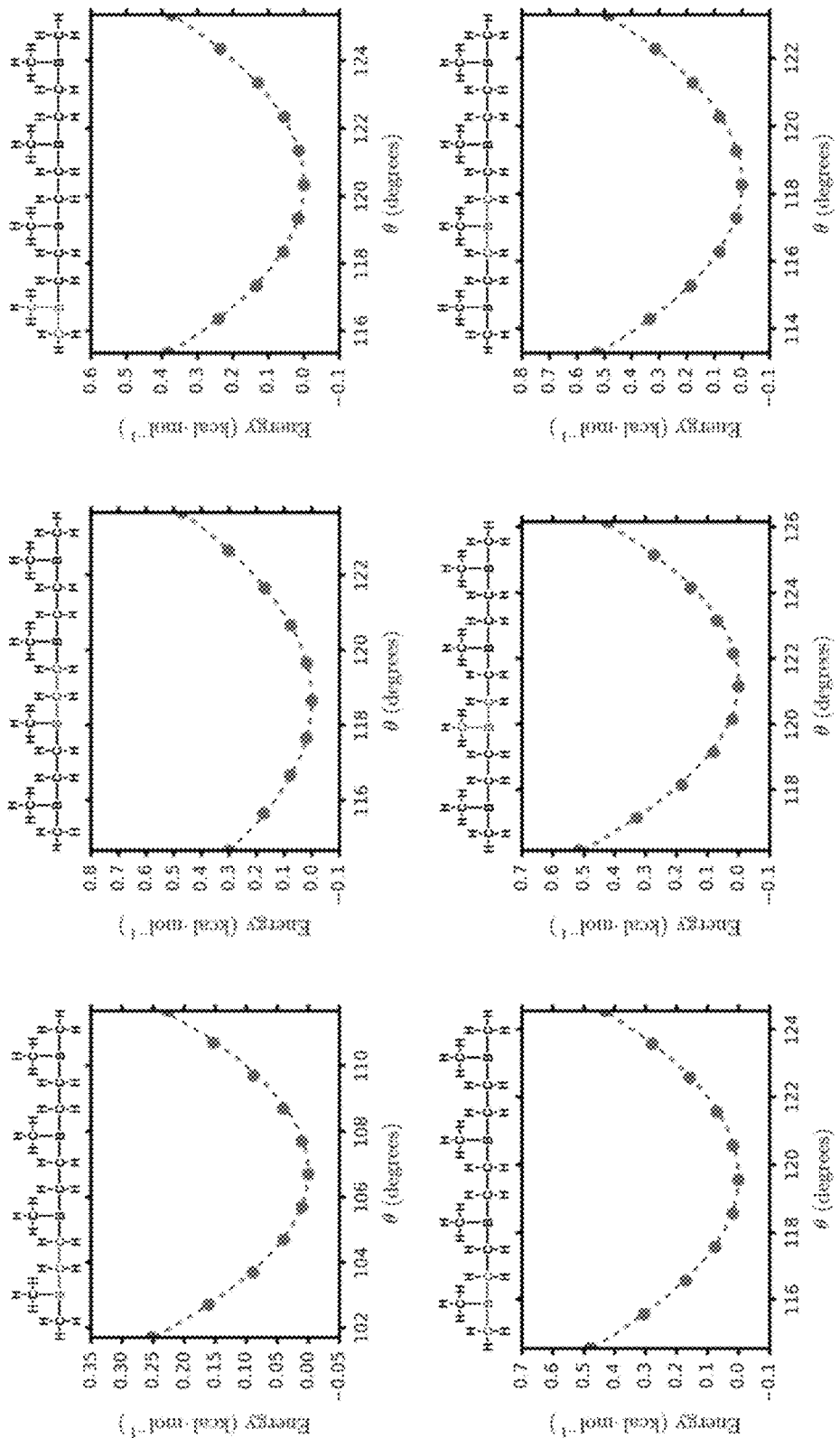
FIG. 17 shows the plots of CBCC angle potentials (solid dots) calculated at the B3LYP-D3/def2-TZVP level of theory, shown with harmonic fits (dashed lines). The energy minima have been set to zero.
Figure 18:
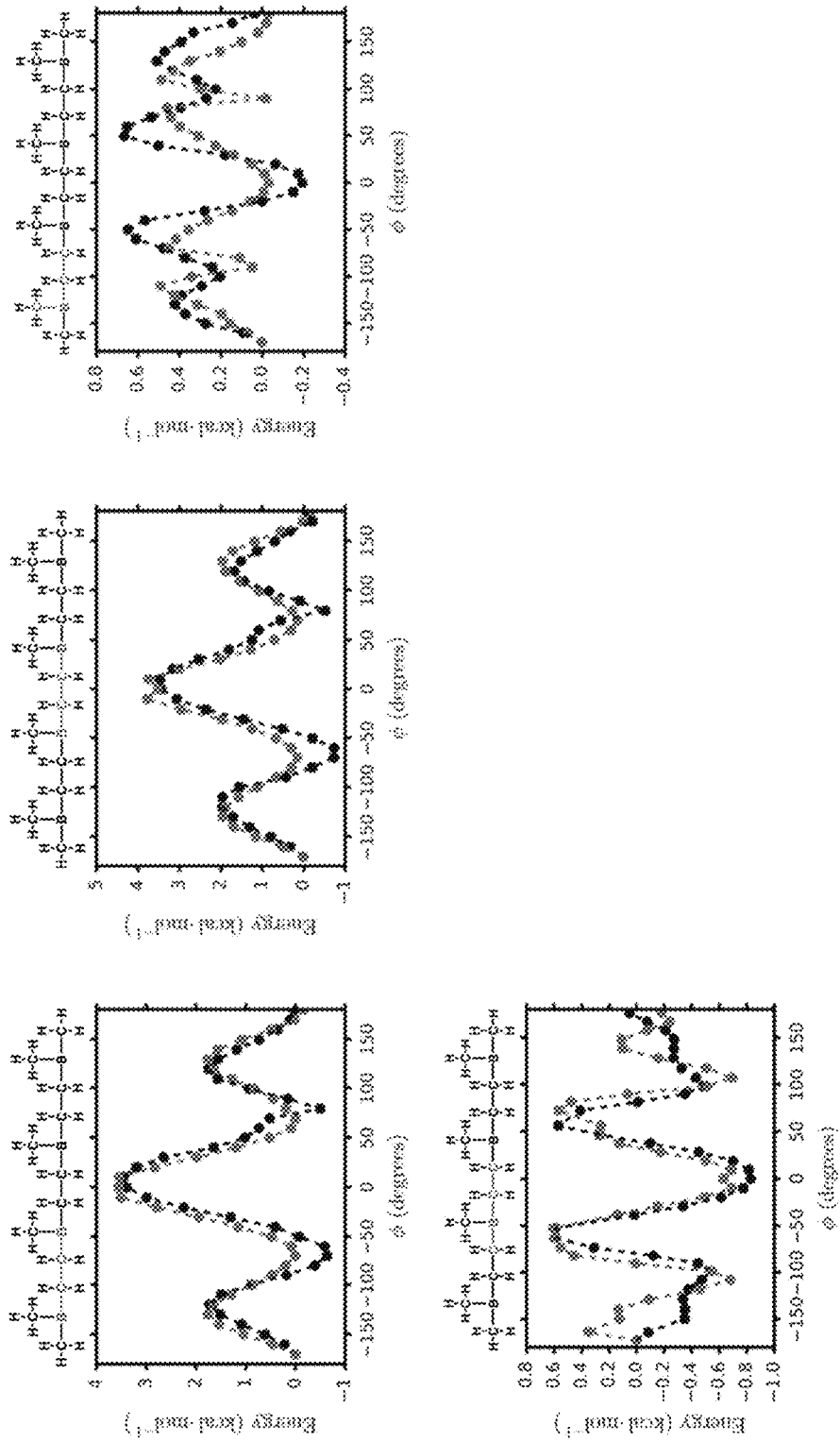
FIG. 18 shows the plots of CBCC dihedral potentials (black dots) calculated at the B3LYP-D3/def2-TZVP level of theory, shown with fits to the OPLS potential (gray dots). The configuration closest to −180° has been set to zero in each plot.
Figure 19:
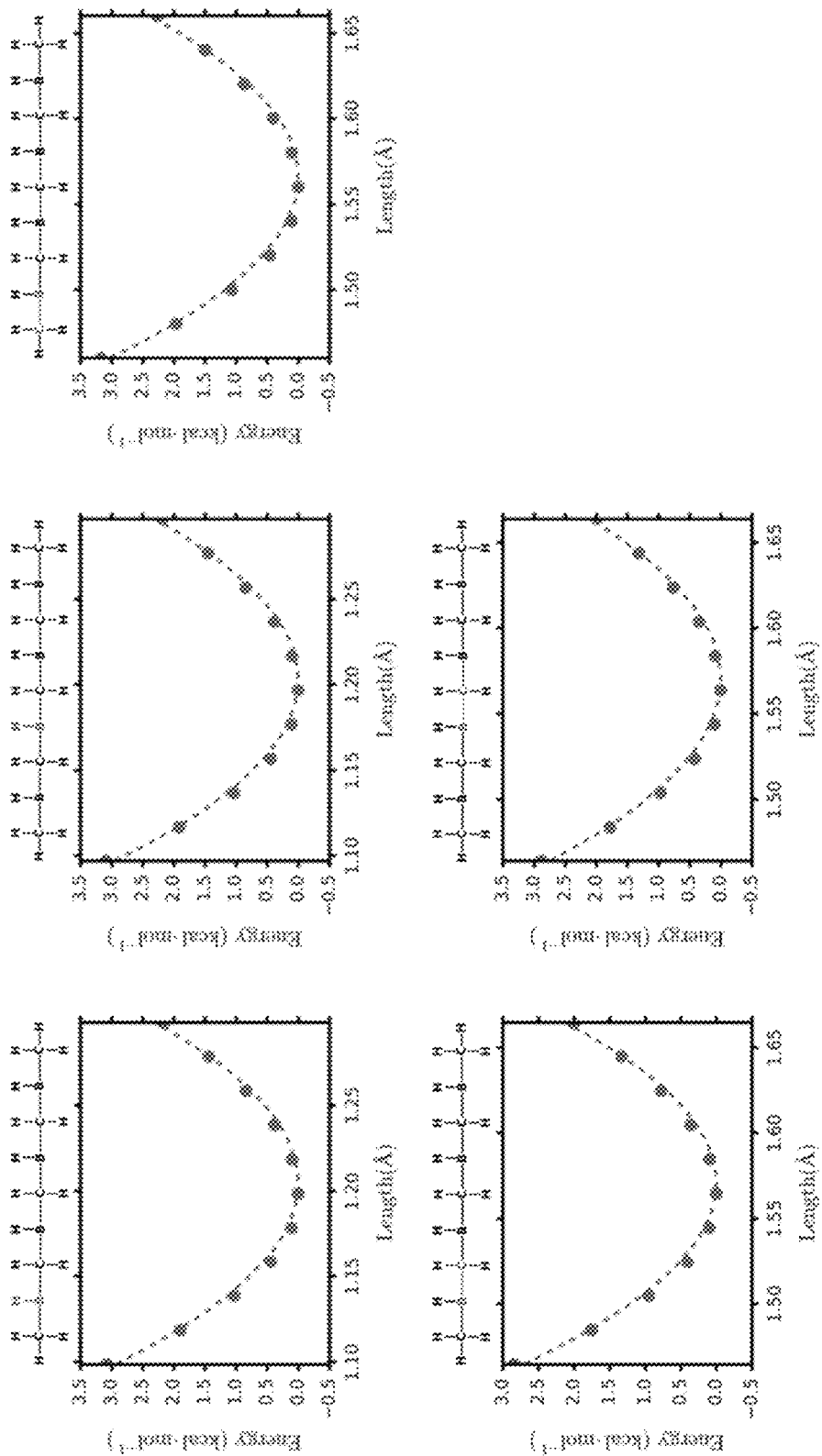
FIG. 19 shows the plots of HBC bond potentials (solid dots) calculated at the B3LYP-D3/def2-TZVP level of theory, shown with harmonic fits (dashed lines). The energy minima have been set to zero.
Figure 20:
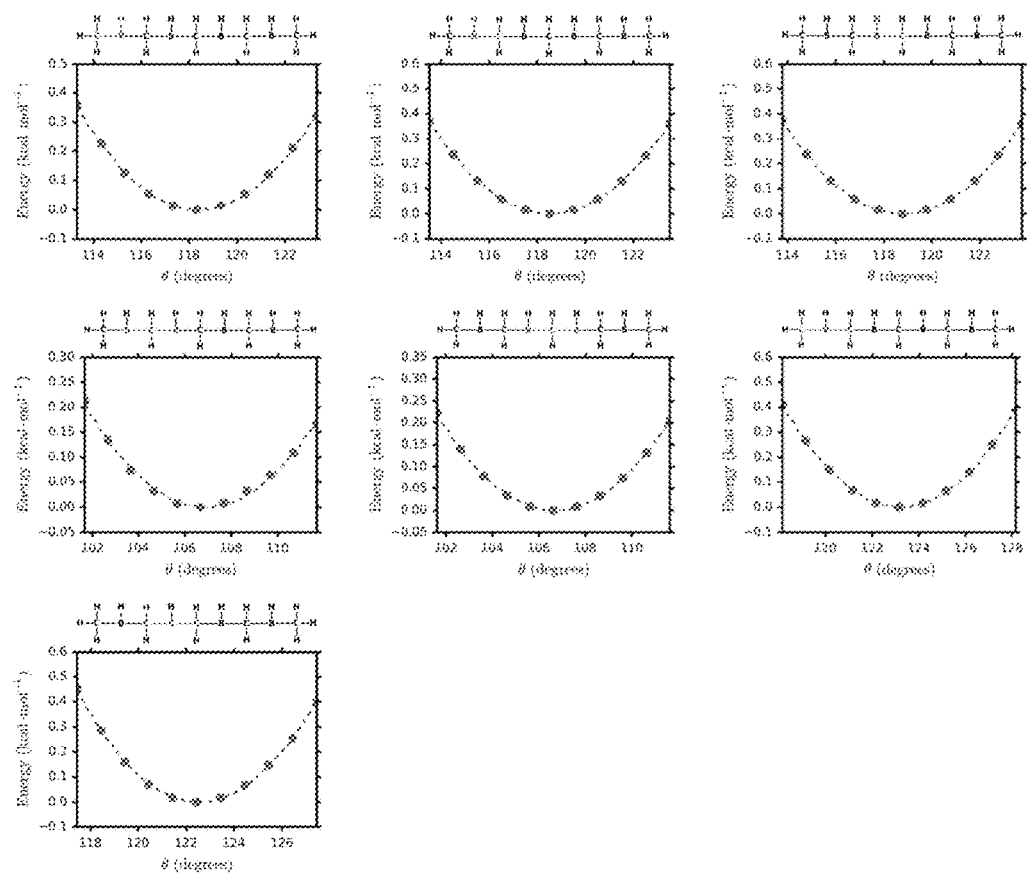
FIG. 20 shows the plots of HBC angle potentials (solid dots) calculated at the B3LYP-D3/def2-TZVP level of theory, shown with harmonic fits (dashed lines). The energy minima have been set to zero.
Figure 21:
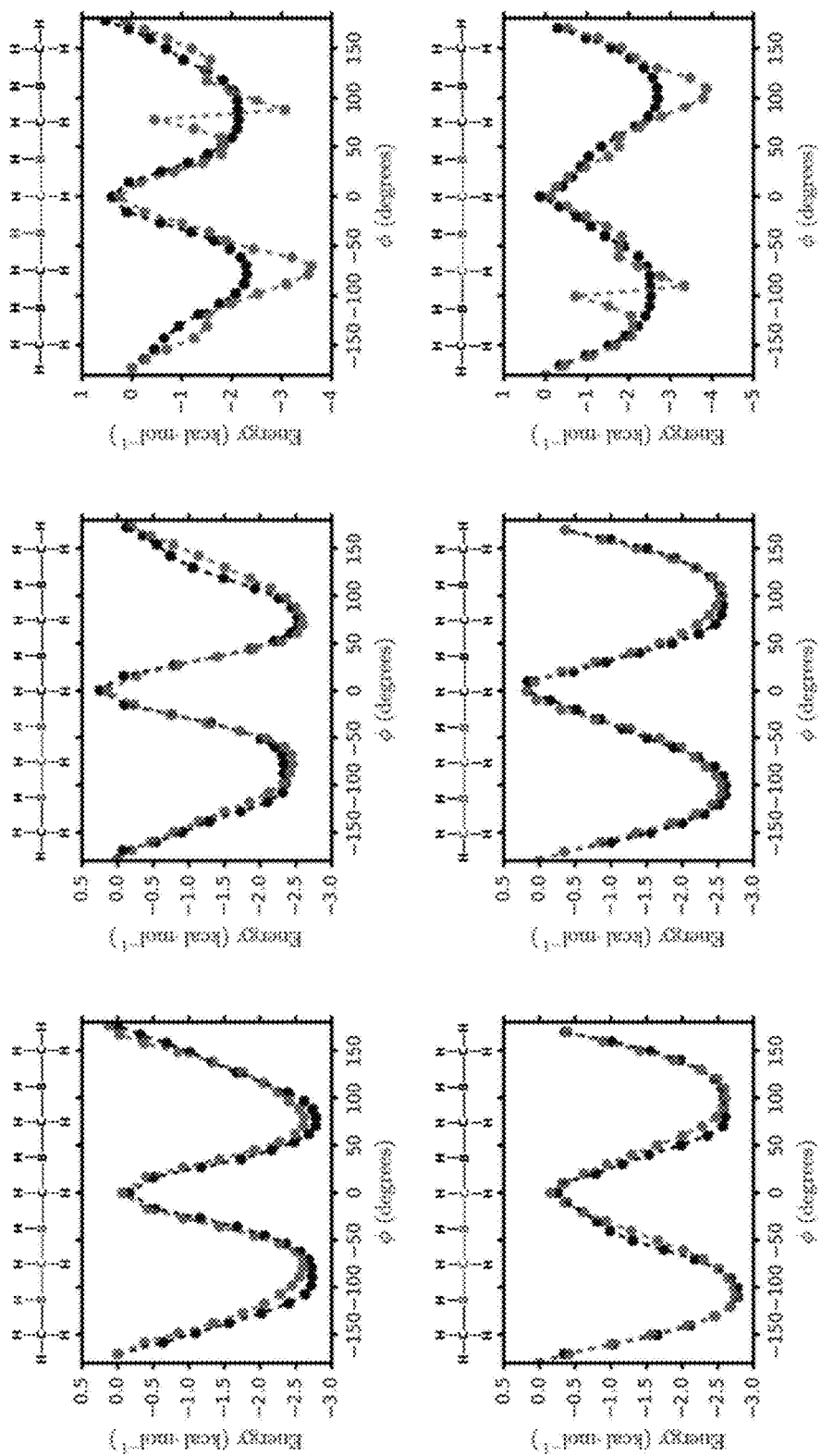
FIG. 21 shows the plots of HBC dihedral potentials (black dots) calculated at the B3LYP-D3/def2-TZVP level of theory, shown with fits to the OPLS potential (gray dots). The configuration closest to −180° has been set to zero in each plot.
Figure 22:
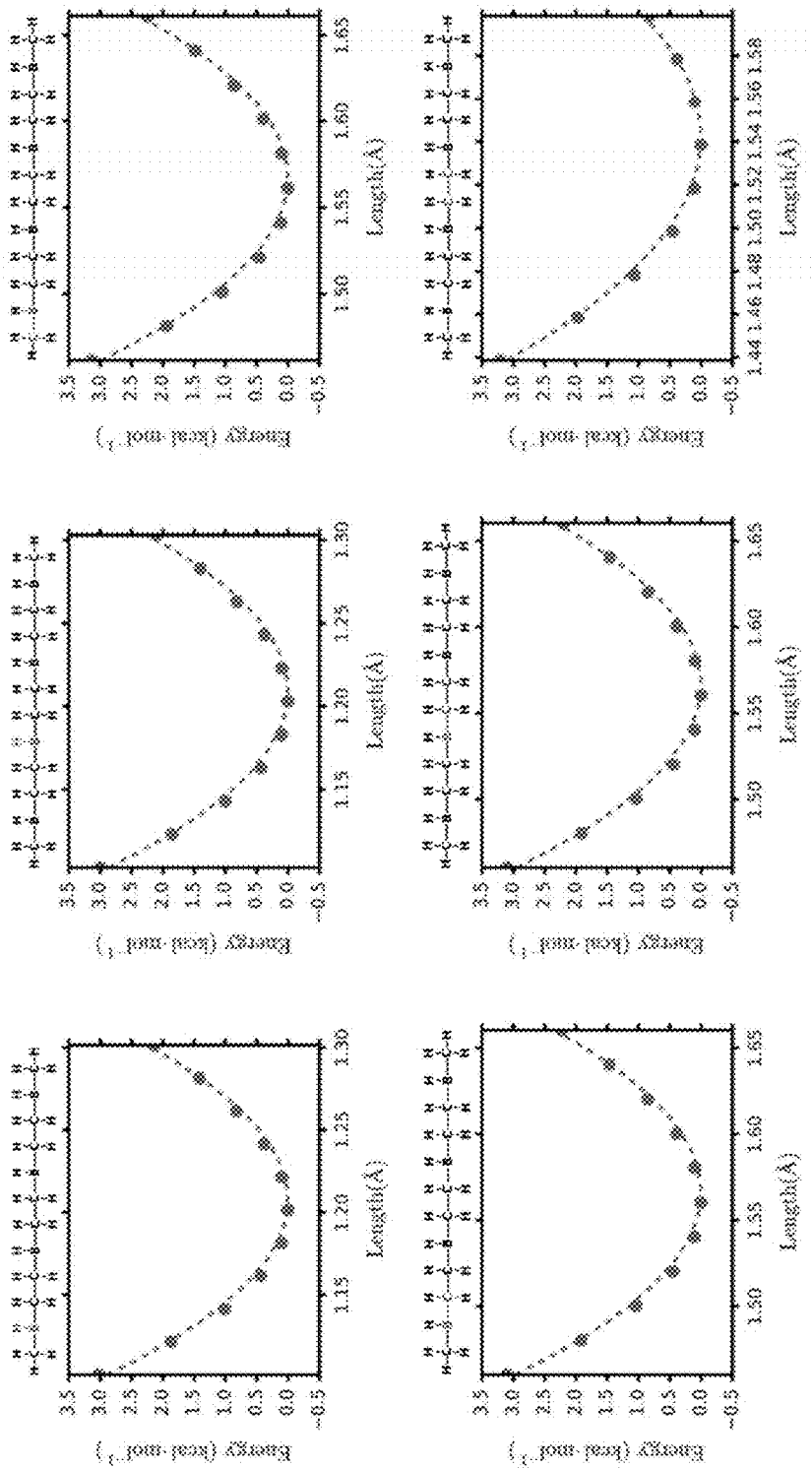
FIG. 22 shows the plots of HBCC bond potentials (solid dots) calculated at the B3LYP-D3/def2-TZVP level of theory, shown with harmonic fits (dashed lines). The energy minima have been set to zero.
Figure 23:
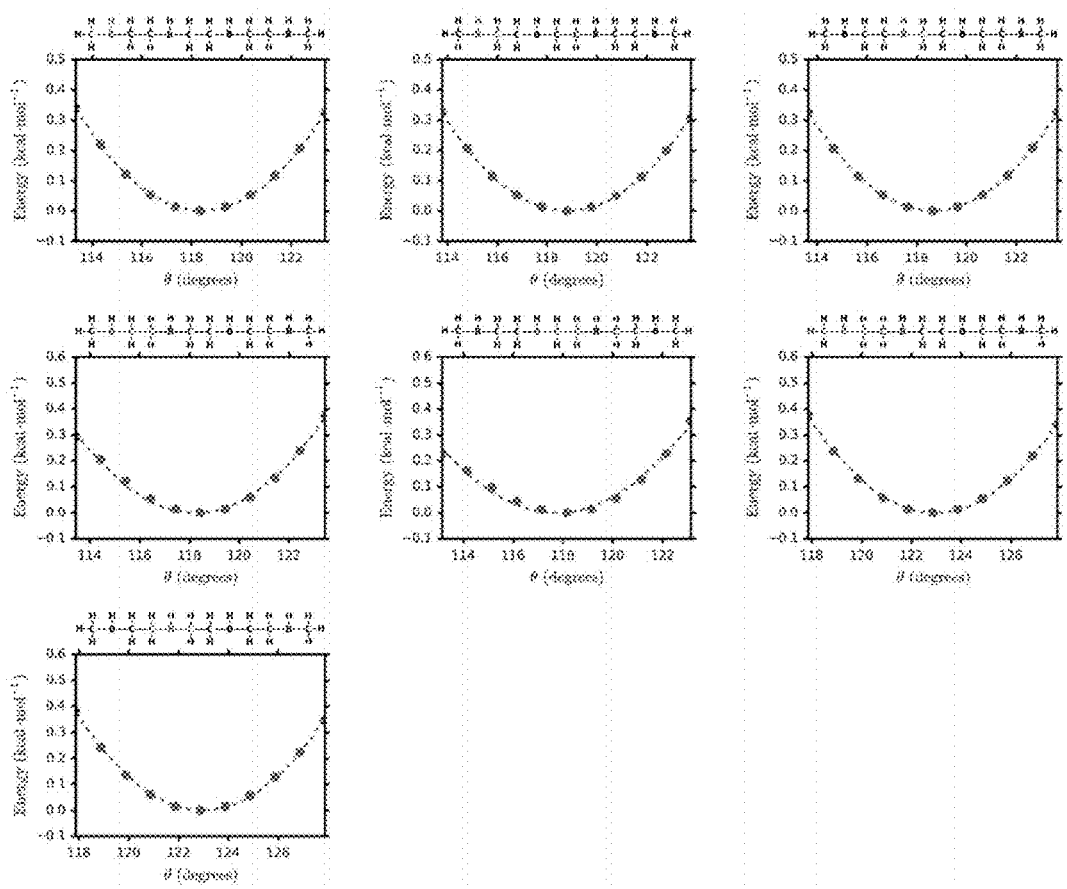
FIG. 23 shows the plots of HBCC angle potentials (solid dots) calculated at the B3LYP-D3/def2-TZVP level of theory, shown with harmonic fits (dashed lines). The energy minima have been set to zero.
Figure 24:
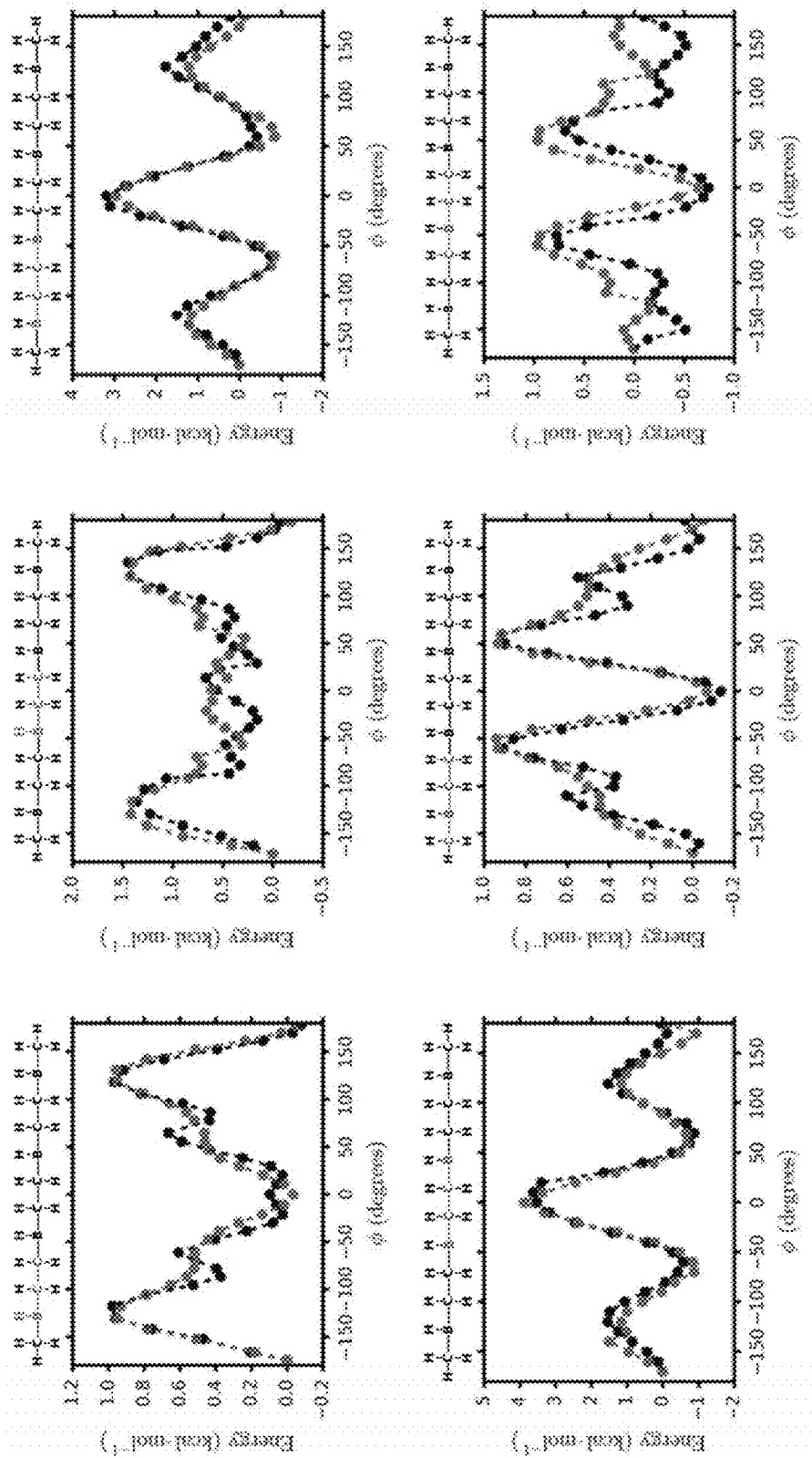
FIG. 24 shows the plots of HBCC dihedral potentials (black dots) calculated at the B3LYP-D3/def2-TZVP level of theory, shown with fits to the OPLS potential (gray dots). The configuration closest to −180° has been set to zero in each plot.
Figure 25:
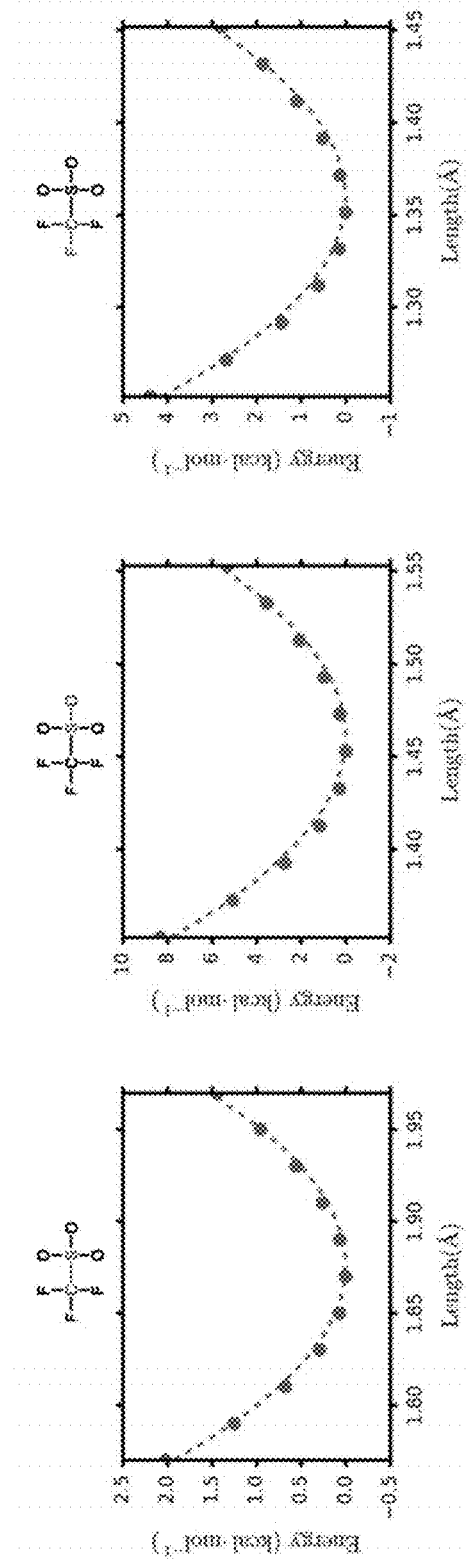
FIG. 25 shows the plots of Triflate bond potentials (solid dots) calculated at the B3LYP-D3/def2-TZVP level of theory, shown with harmonic fits (dashed lines). The energy minima have been set to zero.
Figure 26:
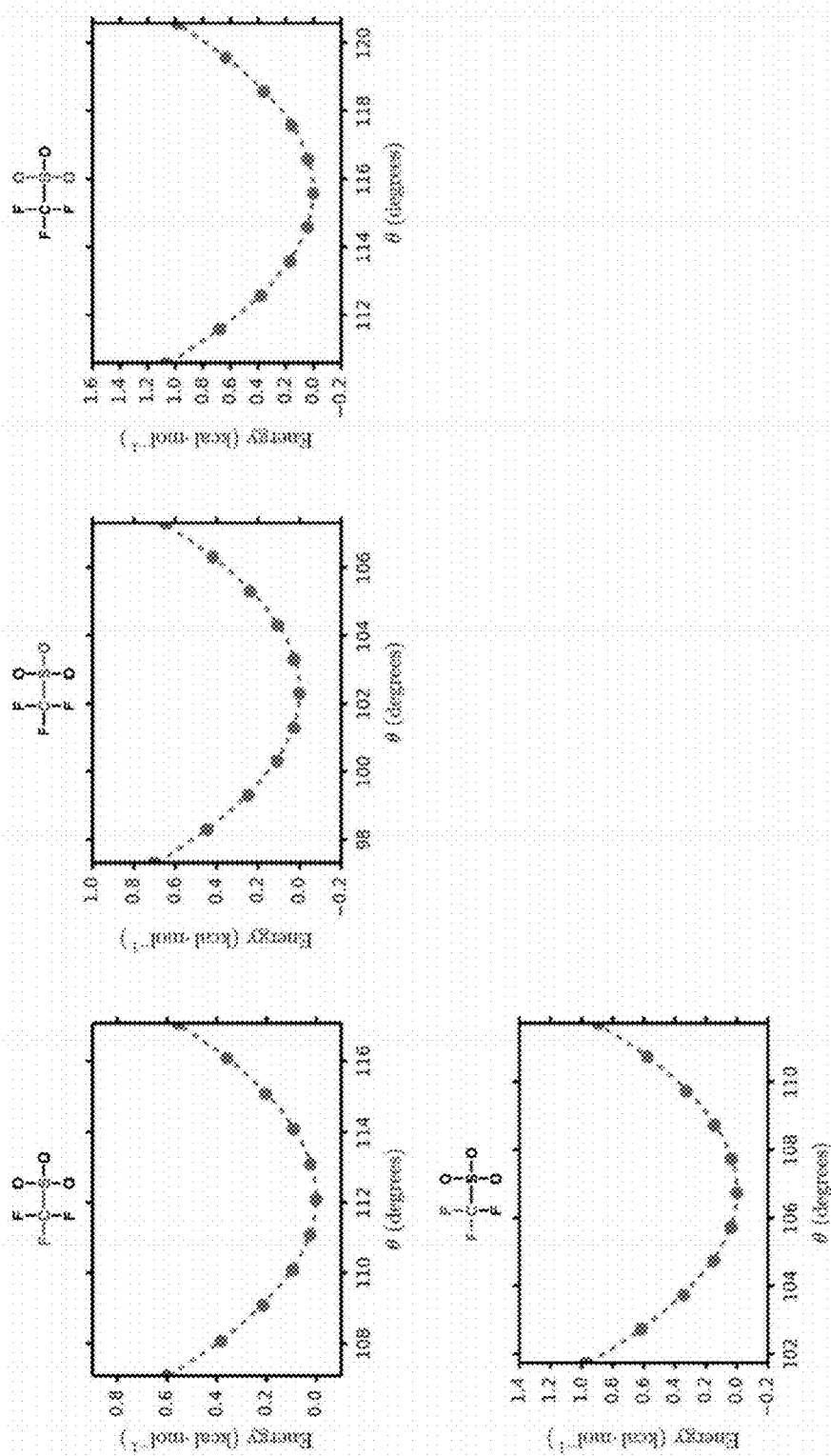
FIG. 26 shows the plots of Triflate angle potentials (solid dots) calculated at the B3LYP-D3/def2-TZVP level of theory, shown with harmonic fits (dashed lines). The energy minima have been set to zero.
Figure 27:
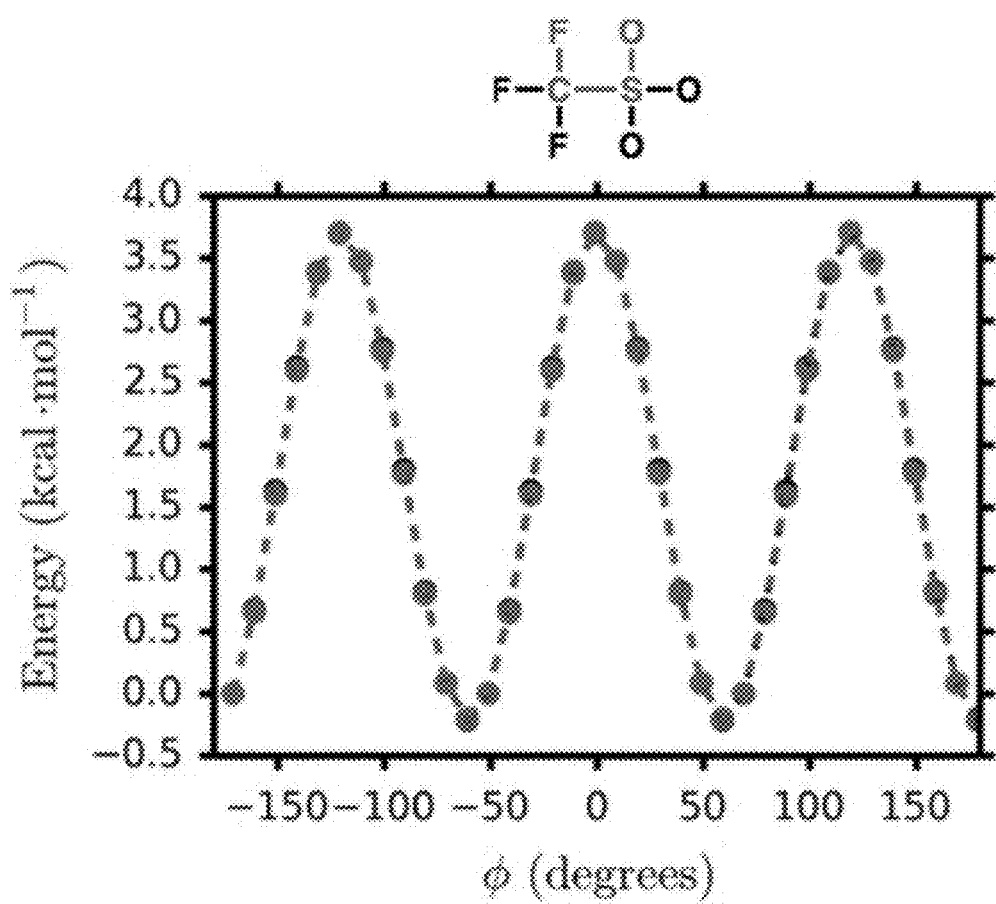
FIG. 27 shows the plots of Triflate dihedral potentials (black dots) calculated at the B3LYP-D3/def2-TZVP level of theory, shown with fits to the OPLS potential (gray dots). The configuration closest to −180° has been set to zero in each plot.
Figure 28:
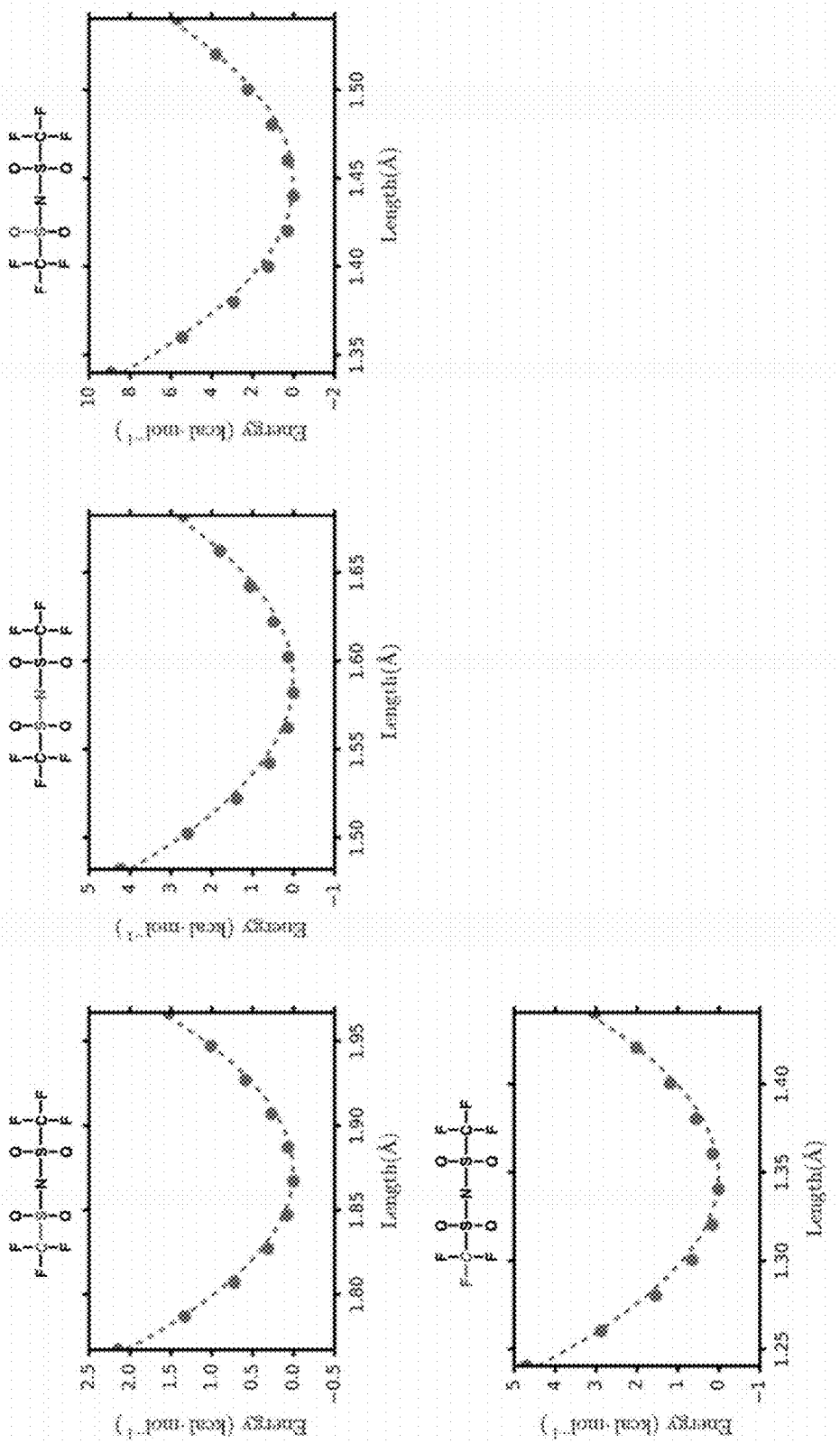
FIG. 28 shows the plots of TFSI⁻ bond potentials (solid dots) calculated at the B3LYP-D3/def2-TZVP level of theory, shown with harmonic fits (dashed lines). The energy minima have been set to zero.
Figure 29:
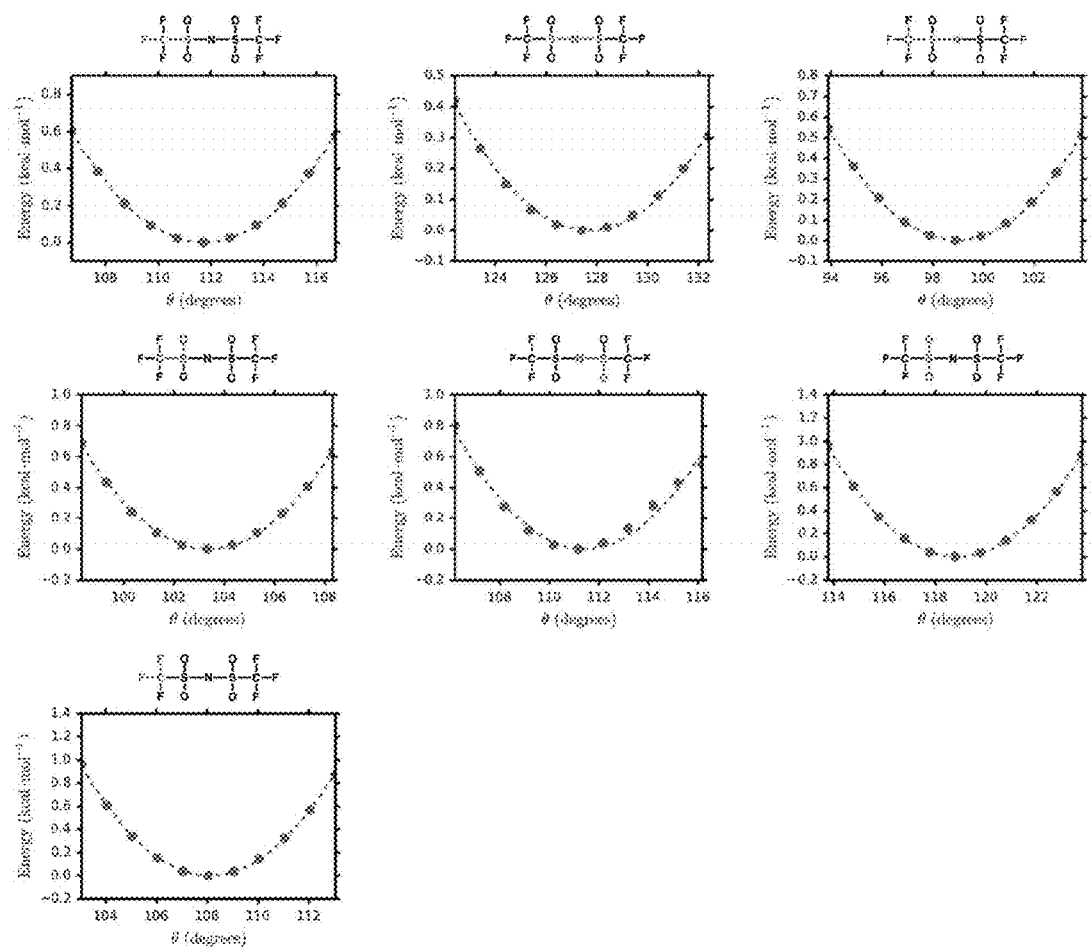
FIG. 29 shows the plots of TFSI⁻ angle potentials (solid dots) calculated at the B3LYP-D3/def2-TZVP level of theory, shown with harmonic fits (dashed lines). The energy minima have been set to zero.
Figure 30:
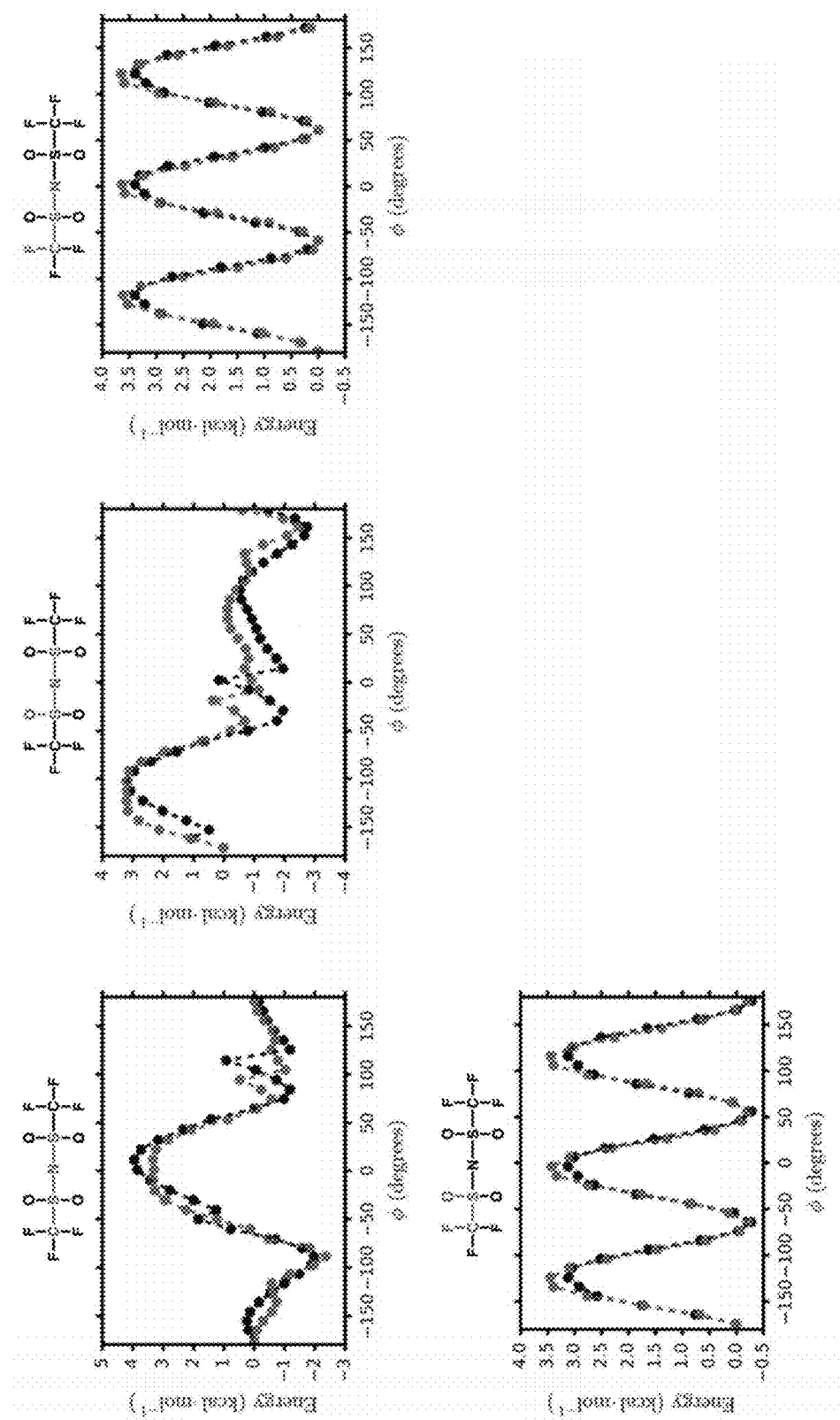
FIG. 30 shows the plots of TFSI⁻ dihedral potentials (black dots) calculated at the B3LYP-D3/def2-TZVP level of theory, shown with fits to the OPLS potential (gray dots). The configuration closest to −180° has been set to zero in each plot.
Figure 31:
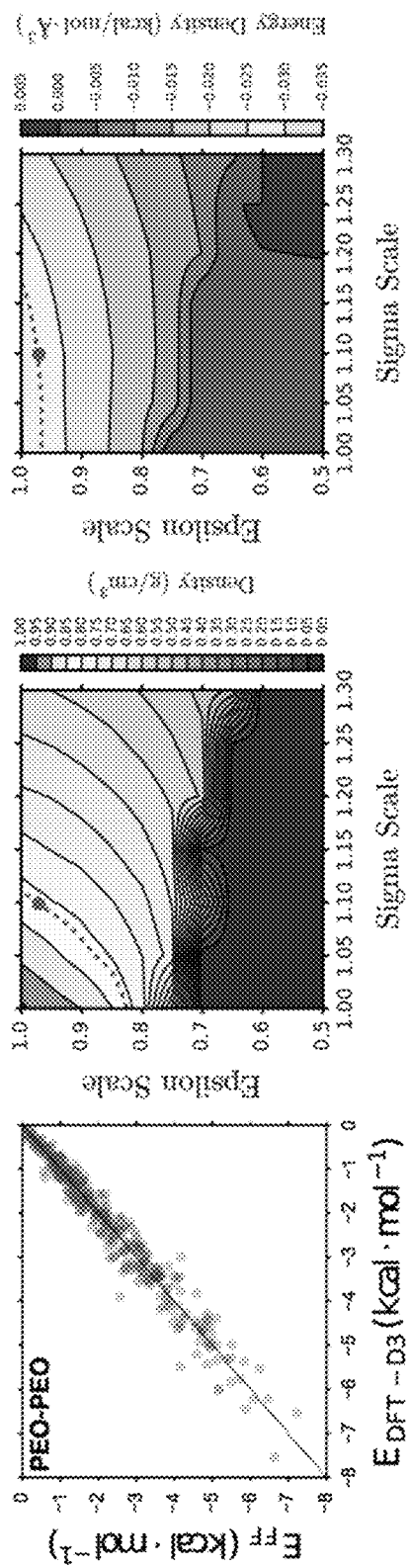
FIG. 31 shows in some embodiments the fit of united-atom polymer-polymer Lennard-Jones (LJ) interactions. (left) B3LYP-D3/def2-TZVP interaction energies ($E_{DFT-D3}$) compared with force-field (FF) interaction energies ($E_{FF}$) for all pair configurations included in the fit set. The B3LYP-D3/def2-TZVP interaction energy reflects the counterpoise-corrected interaction energy and the FF interaction energy reflects the sum of intermolecular electrostatic and LJ potentials at the all-atom level of representation. (middle) The dependence of the united-atom mass density on the uniform scaling of the united-atom epsilon and sigma values. (right) The dependence of the united-atom LJ energy density on the uniform scaling of the united-atom epsilon and sigma values. The contours in the middle and right plots depict the epsilon and sigma values that reproduce the all-atom mass density and energy density; the dot represents the combination of scaling values that simultaneously reproduce both the all-atom mass density and energy density at the united-atom level of description.
Figure 32:
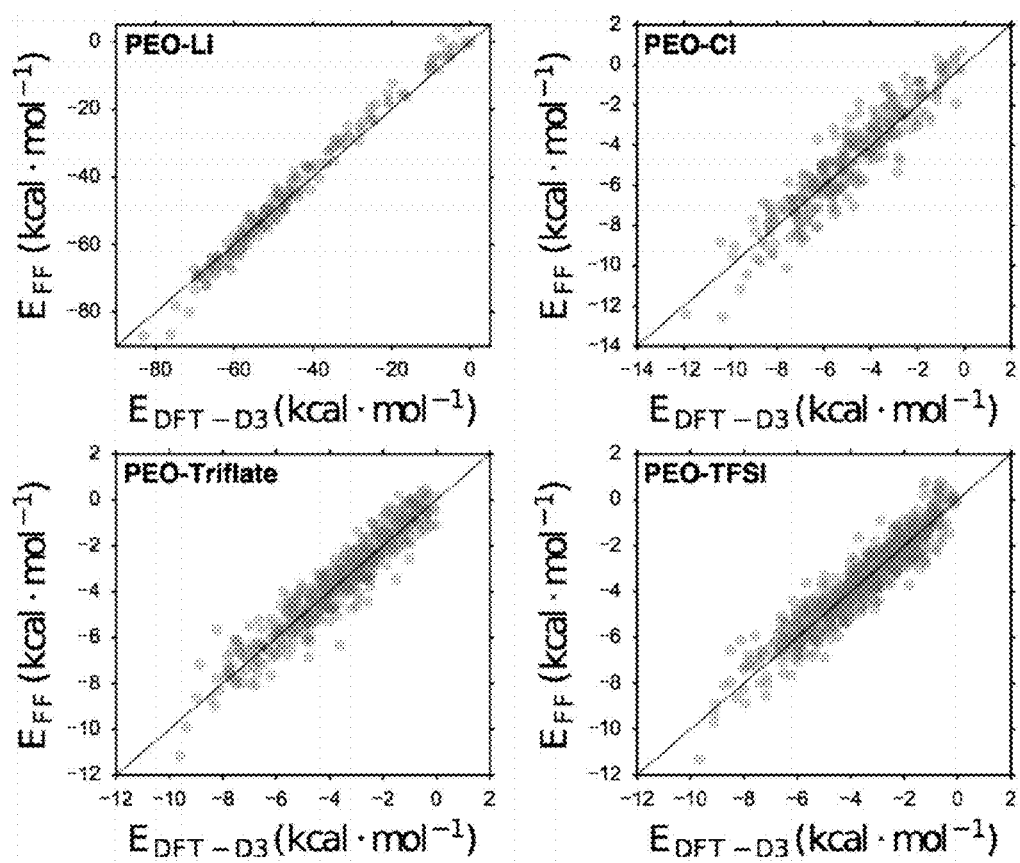
FIG. 32 shows in some embodiments the fit of the united-atom polymer-ion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials. All fits were performed with the united-atom approximation.
Figure 33:
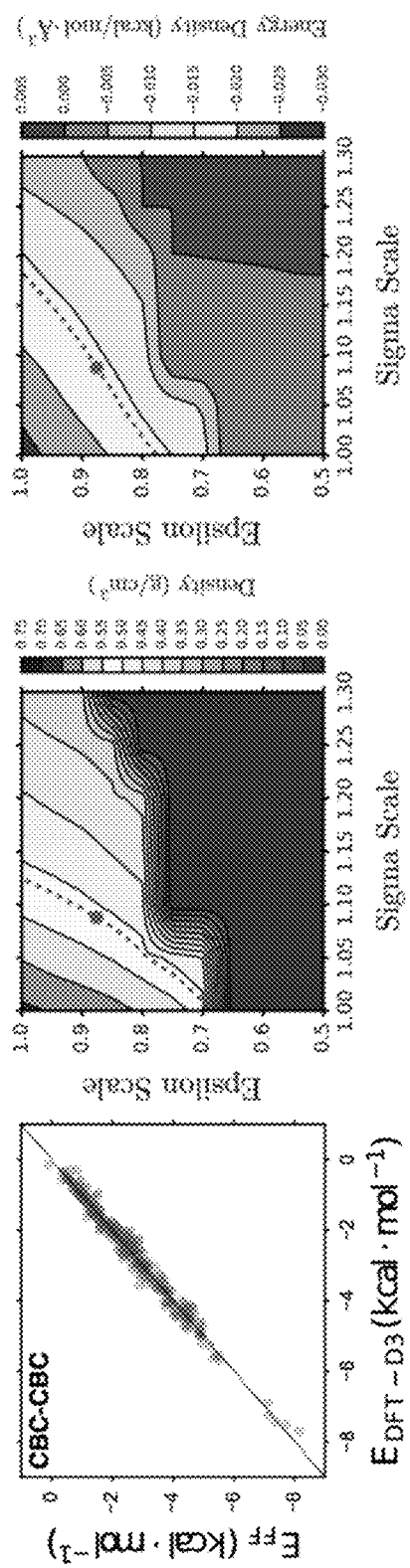
FIG. 33 shows in some embodiments the fit of united-atom polymer-polymer Lennard-Jones interactions. (left) B3LYP-D3/def2-TZVP interaction energies ($E_{DFT-D3}$) compared with force-field interaction energies ($E_{FF}$) for all pair configurations included in the fit set. The B3LYP-D3/def2-TZVP interaction energy reflects the counterpoise-corrected interaction energy and the FF interaction energy reflects the sum of intermolecular electrostatic and LJ potentials at the all-atom level of representation. (middle) The dependence of the united-atom mass density on the uniform scaling of the united-atom epsilon and sigma values. (right) The dependence of the united-atom LJ energy density on the uniform scaling of the united-atom epsilon and sigma values. The contours in the middle and right plots depict the epsilon and sigma values that reproduce the all-atom mass density and energy density; the dot represents the combination of scaling values that simultaneously reproduce both the all-atom mass density and energy density at the united-atom level of description.
Figure 34:
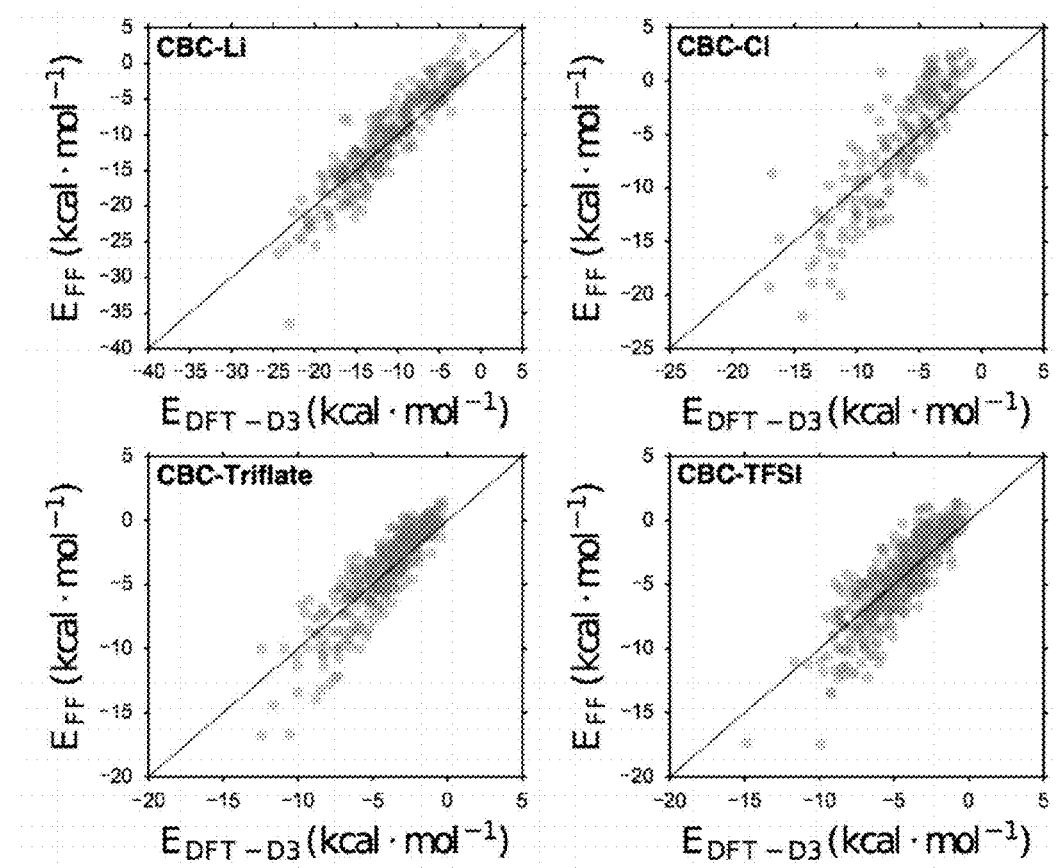
FIG. 34 shows in some embodiments the fit of the united-atom polymer-ion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials. All fits were performed with the united-atom approximation
Figure 35:
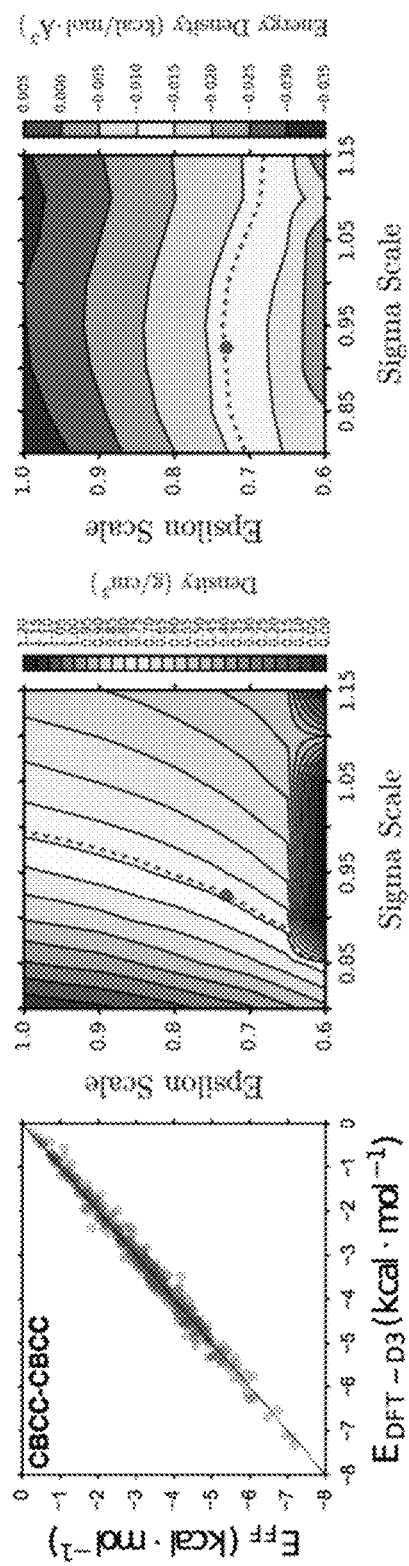
FIG. 35 shows in some embodiments the fit of united-atom polymer-polymer Lennard-Jones interactions. (left) B3LYP-D3/def2-TZVP interaction energies ($E_{DFT-D3}$) compared with force-field interaction energies ($E_{FF}$) for all pair configurations included in the fit set. The B3LYP-D3/def2-TZVP interaction energy reflects the counterpoise-corrected interaction energy and the FF interaction energy reflects the sum of intermolecular electrostatic and LJ potentials at the all-atom level of representation. (middle) The dependence of the united-atom mass density on the uniform scaling of the united-atom epsilon and sigma values. (right) The dependence of the united-atom LJ energy density on the uniform scaling of the united-atom epsilon and sigma values. The contours in the middle and right plots depict the epsilon and sigma values that reproduce the all-atom mass density and energy density; the dot represents the combination of scaling values that simultaneously reproduce both the all-atom mass density and energy density at the united-atom level of description.
Figure 36:
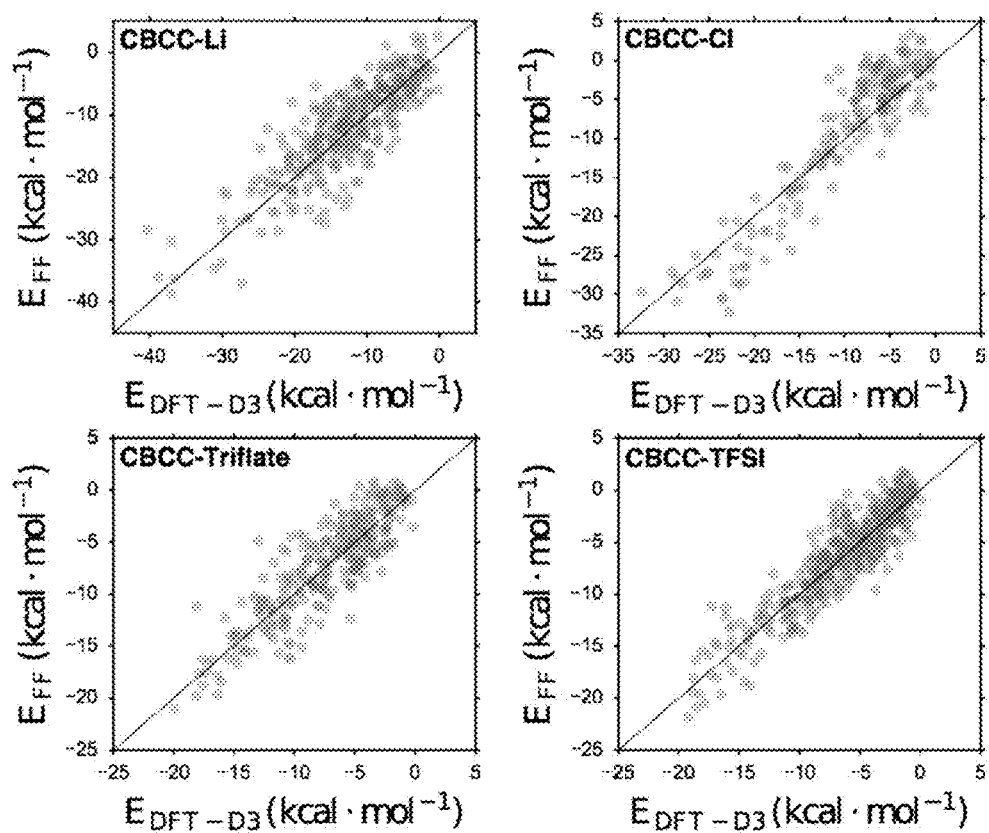
FIG. 36 shows in some embodiments the fit of the united-atom polymer-ion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials. All fits were performed with the united-atom approximation.
Figure 37:
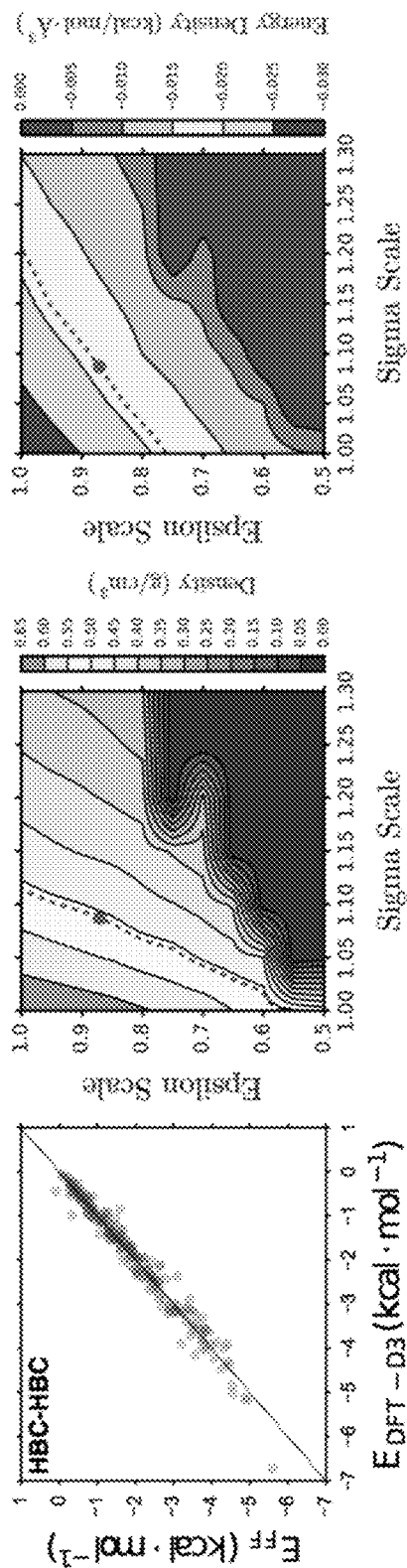
FIG. 37 shows in some embodiments the fit of united-atom polymer-polymer Lennard-Jones interactions. (left) B3LYP-D3/def2-TZVP interaction energies ($E_{DFT-D3}$) compared with force-field interaction energies ($E_{FF}$) for all pair configurations included in the fit set. The B3LYP-D3/def2-TZVP interaction energy reflects the counterpoise-corrected interaction energy and the FF interaction energy reflects the sum of intermolecular electrostatic and LJ potentials at the all-atom level of representation. (middle) The dependence of the united-atom mass density on the uniform scaling of the united-atom epsilon and sigma values. (right) The dependence of the united-atom LJ energy density on the uniform scaling of the united-atom epsilon and sigma values. The contours in the middle and right plots depict the epsilon and sigma values that reproduce the all-atom mass density and energy density; the dot represents the combination of scaling values that simultaneously reproduce both the all-atom mass density and energy density at the united-atom level of description.
Figure 38:
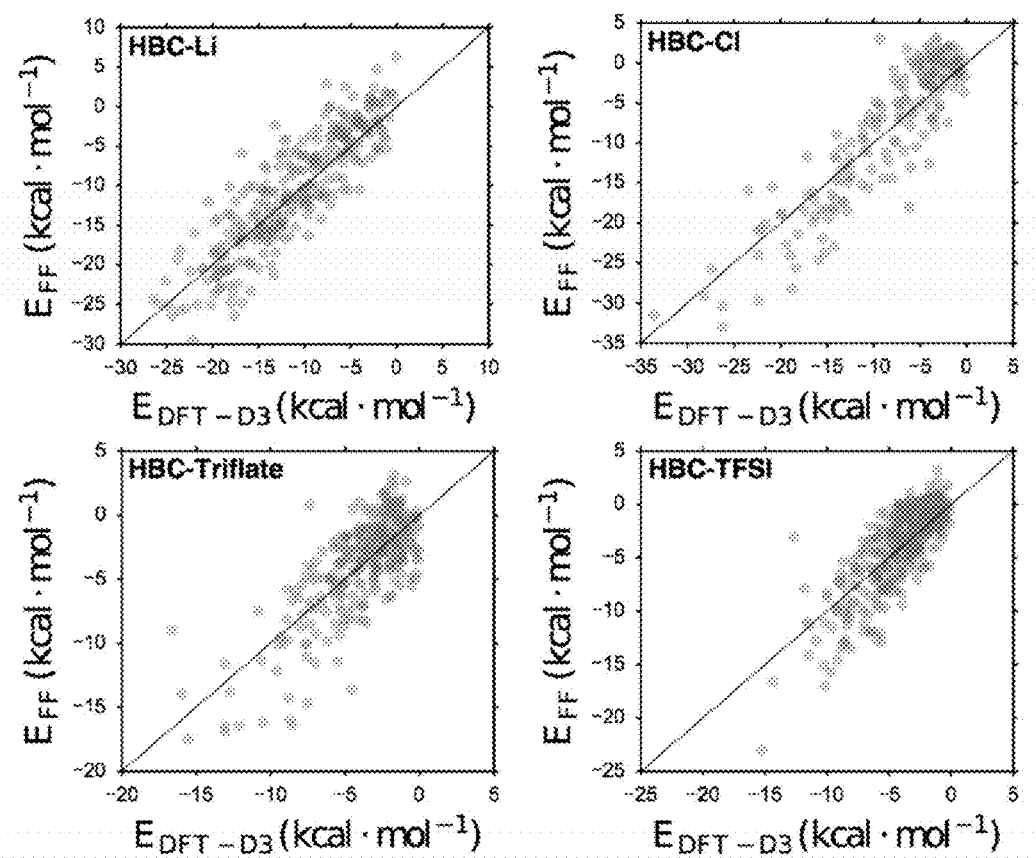
FIG. 38 shows in some embodiments the fit of the united-atom polymer-ion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials. All fits were performed with the united-atom approximation.
Figure 39:
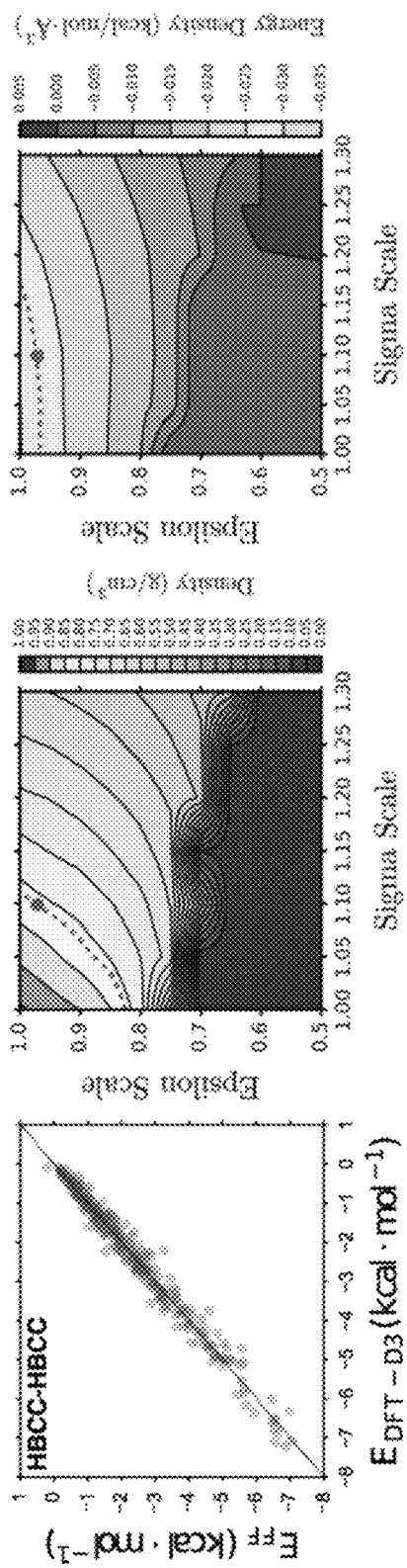
FIG. 39 shows in some embodiments the fit of united-atom polymer-polymer Lennard-Jones interactions. (left) B3LYP-D3/def2-TZVP interaction energies ($E_{DFT-D3}$) compared with force-field interaction energies ($E_{FF}$) for all pair configurations included in the fit set. The B3LYP-D3/def2-TZVP interaction energy reflects the counterpoise-corrected interaction energy and the FF interaction energy reflects the sum of intermolecular electrostatic and LJ potentials at the all-atom level of representation. (middle) The dependence of the united-atom mass density on the uniform scaling of the united-atom epsilon and sigma values. (right) The dependence of the united-atom LJ energy density on the uniform scaling of the united-atom epsilon and sigma values. The contours in the middle and right plots depict the epsilon and sigma values that reproduce the all-atom mass density and energy density; the dot represents the combination of scaling values that simultaneously reproduce both the all-atom mass density and energy density at the united-atom level of description.
Figure 40:
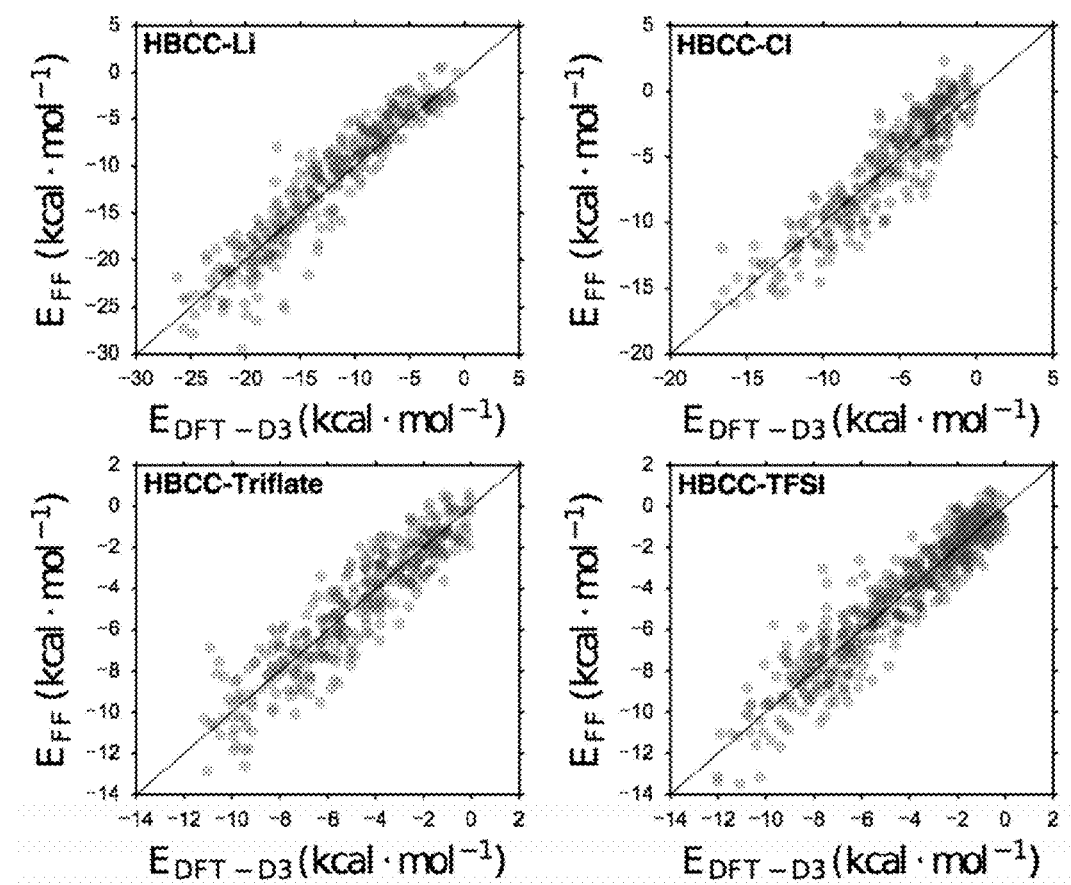
FIG. 40 shows in some embodiments the fit of the united-atom polymer-ion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials. All fits were performed with the united-atom approximation.
Figure 41:
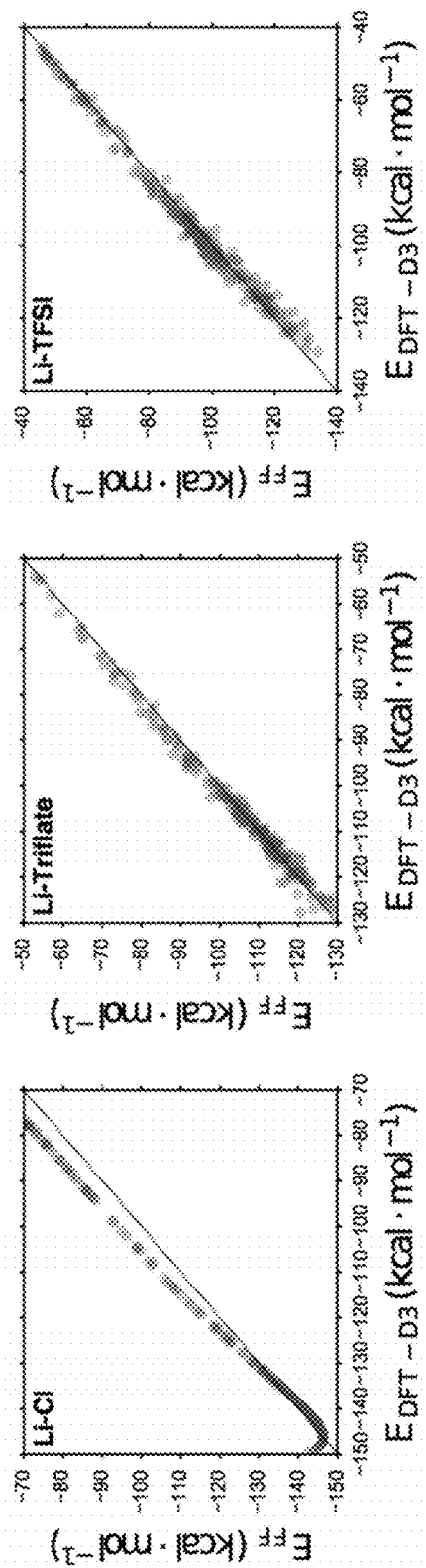
FIG. 41 shows in some embodiments the fits of the Li-anion Lennard-Jones interactions. Each plot presents the B3LYP-D3/def2-TZVP interaction energies ($E_{DFT-D3}$) compared with force-field interaction energies ($E_{FF}$) for all pair-configurations included in the fit set. The B3LYP-D3/def2-TZVP interaction energy reflects the counterpoise-corrected interaction energy and the FF interaction energy reflects the sum of intermolecular electrostatic and LJ potentials.

The fitted parameters for intramolecular modes including bonds, angles, and dihedrals are shown in FIGS. 10-12 (PEO), FIGS. 13-15 (CBC), FIGS. 16-83 (CBCC), FIG. 19-21 (HBC), FIGS. 22-24 (HBCC), FIGS. 25-27 (Triflate) and FIG. 28-30 (TFSI⁻).

Fitting Procedure for Lennard-Jones Parameters and Atomic Charges

Condensed-phase all-atom MD simulations were used to generate ensembles of single molecule and pair configurations for refining the partial charges and parametrizing the Lennard-Jones interactions. The force-field potential for these simulations consisted of the intramolecular modes obtained as described above, the approximate equilibrium CHELPG charges, and Lennard-Jones parameters from UFF. [Rappe, A. K., Casewit, C. J., Colwell, K. S., Goddard, W. A. & Skiff, W. M. Uff, a full periodic table force field for molecular mechanics and molecular dynamics simulations. *J. Am. Chem. Soc.* 114, 10024-10035 (1992).] Five types of condensed phase MD simulations were performed for each oligomer type: model oligomer only, model oligomer with Li+, model oligomer with Cl⁻, model oligomer with triflate, and model oligomer with TFSI. Three additional MD simulations were performed with PEO to generate Li+-anion configurations: PEO model compound with LiCl, Li triflate, and LiTFSI. The MD simulations were initialized with 30 oligomers placed randomly on a cubic lattice to avoid atomic overlaps. In simulations including ions, the ions were also added to sites on a cubic lattice, to reach a concentration of 1:20 ions per oligomer repeat unit. The initial coordinates were then rescaled to obtain a number density of 0.1 atoms·Å⁻³ (used as an approximate liquid density) and the charges on all atoms were scaled by 0.5 to reduce viscosity and accelerate configurational sampling. A one femtosecond timestep was used for all simulations. A uniform background charge was used to establish charge neutrality in simulations where only one species of ion was present. The remainder of the MD simulation details match those used in the rest of this work. The initial geometry was relaxed by performing 1 ps of NVE dynamics with atom displacements limited to 0.01 Å for each timestep, followed by 500 ps of NVT dynamics at a temperature of 400 K and pressure of 1 atm. After relaxation, an additional 2 ns of NVT dynamics were performed to collect production data used for generating single molecule and pair configurations used in the refinement of partial charges and calculation of Lennard-Jones parameters.

To refine the partial charges, one hundred molecular configurations for each model compound were sampled from the condensed phase simulations. Snapshots were drawn every 10 ps from the production data and the molecular coordinates were unwrapped to account for periodic boundary conditions. Snapshots were drawn until 100 molecular configurations had been parsed. For each parsed configuration, the DFT-calculated electron densities were used for CHELPG calculations to obtain nuclear charges. The atomic charges averaged across all configurations were used as the final charges in all simulations and also during the fitting of Lennard-Jones parameters (described below).

Configurations involving pairs of molecules were parsed from the condensed phase MD simulations for use in parametrizing the Lennard-Jones interactions. When sampling pair configurations from the condensed phase MD simulations, the following algorithm was used to ensure samples were included at short pairwise separations for all interactions being fit. Snapshots were drawn every 10 ps from the production data and the molecular coordinates were unwrapped to account for periodic boundary conditions. In every snapshot there are many possible pairs of molecules, most of which occur at large separations and are not useful for fitting the binding and repulsive regions of the Lennard-Jones potential. A molecular pair was retained if at least one pair of atoms from each molecule resided within, $r_{thresh}=1.5\sigma_{ij}$ where $\sigma_{ij}$ is the UFF Lennard-Jones radial parameter for the pair. Pairs of molecules were drawn this way until each pair of intermolecular atom types had at least 100 configurations within $r_{thresh}$. Once a given pair of atom types have at least 100 configurations within $r_{thresh}$, the pairwise separation of these atom types is no longer used as a criterion for keeping configurations. Usually this algorithm terminates after about 200 pairs of molecules are extracted from 1 ns of snapshots.

Counterpoise-corrected interaction energies, $E_{I,DFT}$, calculated for the pair of molecules, A and B, in each configuration were used to parametrize the Lennard-Jones interactions. $E_{I,DFT}$ was calculated according to $$E_{I,DFT} = E_{AB}^{AB} - E_A^{AB} - E_B^{AB}, \quad (5)$$

where each term on the right-hand side corresponds to a single-point energy, the subscript of each term refers the atoms present in the calculation, and the superscript refers to the basis functions present in the calculation. In the context of the force-field, the interaction energy between molecules A and B, $E_{I,FF}$, is calculated as $$E_{I,FF} = \sum_{i \in A}^{N_A} \sum_{j \in B}^{N_B} \left\{ \frac{q_i q_j e^2}{4\pi \epsilon_0 r_{ij}} + 4\epsilon_{ij} \left[ \left(\frac{\sigma_{ij}}{r_{ij}}\right)^{12} - \left(\frac{\sigma_{ij}}{r_{ij}}\right)^6 \right] \right\}, \quad (6)$$

where the summations run over the atoms on each molecule, q is the partial charge on each atom, and $\epsilon$ and $\sigma$ are the Lennard-Jones parameters being fit. The Lennard-Jones parameters were obtained by performing numerical least-squares fitting (Levenberg-Marquardt) of $E_{I,FF}$ to $E_{I,DFT}$ across all pair configurations. The Lennard-Jones parameters for each pair type were iteratively fit until the variance converged to within $10^{-5}$ kcal/mol. UFF parameters were used as the starting guess for the fit, and in each iterative cycle the sequence of pair types was fit in a randomized order.

For polymer-polymer Lennard-Jones interactions, the above procedure yields all-atom Lennard-Jones parameters that accurately reproduce both the DFT-D3 interaction energies (FIGS. 31-41) and the experimental mass density of PEO (Example 4). To obtain united-atom (UA) Lennard-Jones parameters from these values, each carbon atom and its attached hydrogens was refit as a single UA particle centered at the carbon atom to reproduce the all-atom (AA) Lennard-Jones potential. Further refinement of the UA parameters was performed to ensure that the UA-description reproduces the AA mass density and cohesive energy density (defined in the context of the force-field as the energy per unit volume of all Lennard-Jones interactions). This refinement was accomplished by running additional condensed phase simulations with uniform scaling of all UA-parameters. The scaling parameter for UA-$\epsilon$ values ranged from 0.5 to 1.0 in steps of 0.05. The scaling parameter for UA-$\sigma$ values ranged from 1.0 to 1.3 in steps of 0.05. These simulations were initialized and run with the same protocol as described above, except with 50 oligomers in each simulation and unscaled partial charges. The initial geometry was relaxed by performing 1 ps of NVE dynamics with atom displacements limited to 0.01 Å for each timestep, followed by 250 ps of NPT dynamics at a temperature of 400 K and pressure of 1 atm. After relaxation, an additional 750 ps of NPT dynamics were performed to collect production data used for calculating the average mass and cohesive energy densities. The final UA-parameters were obtained by applying the combination of $\epsilon$ and $\sigma$ scaling values which best reproduced the AA mass and cohesive energy densities.

For the polymer-ion Lennard-Jones interactions, the UA parameters were obtained by least-squares fitting of $E_{I,FF}$ to $E_{I,DFT}$ while excluding electrostatic and Lennard-Jones interactions between hydrogens attached to carbon and the ion (The fit results are presented in FIGS. 31-41).

Example 2: Force-Field Validation Used to Simulate Ion Behavior for Representative Cation-Coordinating Polymer PolyEthylene Oxide (PEO)

Since no experimental data were available for the anion-coordinating polymers, the approach developed here was to derive all force-field parameters directly from dispersion-corrected DFT calculations so that all polymers were represented at the same level of theory.

Figure 2A:
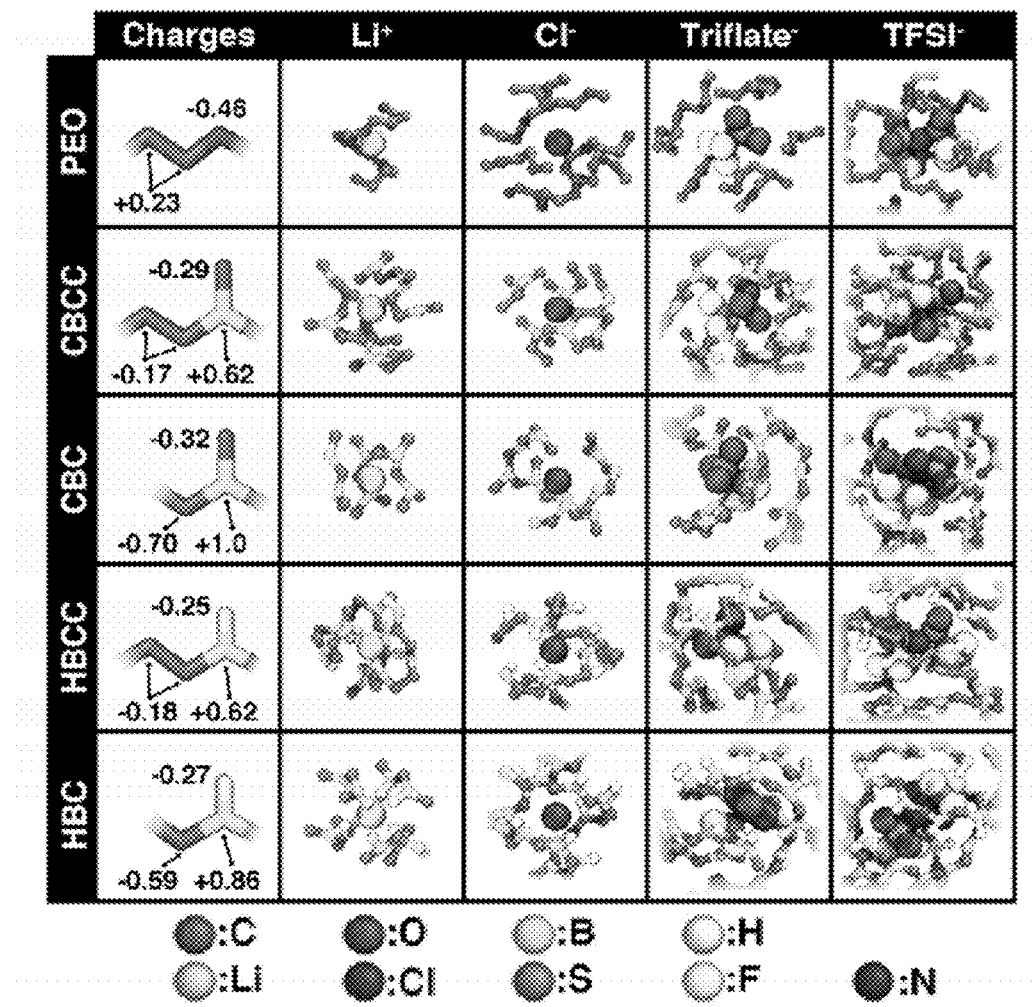
FIGS. 2A-B show in some embodiments contrasting ion coordination behavior in cation-coordinating and anion-coordinating polymers.

PEO has been widely characterized and provides a basis for validating the force-field developed in this work. The average mass density of neat PEO at 400 K in the presented MD simulations is 0.994 g·cm$^{-3}$, in good agreement with previously reported experimental and theoretical values. [Wick, C. D. & Theodorou, D. N. Connectivity-altering monte carlo simulations of the end group effects on volumetric properties for poly(ethylene oxide). *Macromolecules* 37, 7026-7033 (2004).] [Borodin, O., Douglas, R., Smith, G. D., Trouw, F. & Petrucci, S. Md simulations and experimental study of structure, dynamics, and thermodynamics of poly(ethylene oxide) and its oligomers. *J. Phys. Chem. B* 107, 6813-6823 (2003).] [Hyun, J.-K., Dong, H., Rhodes, C. P., Frech, R. & Wheeler, R. A. Molecular dynamics simulations and spectroscopic studies of amorphous tetraglyme (ch3o(ch2ch2o)4ch3) and tetraglyme:licf3so3 structures. *J. Phys. Chem. B* 105, 3329-3337 (2001).] The dilute ion concentration diffusivities for Li+ and TFSI in PEO also show excellent agreement with NMR-based diffusivity measurements at dilute concentrations (Table 3). [Edman, L., Ferry, A. & Orädd, G. Analysis of diffusion in a solid polymer electrolyte in the context of a phase-separated system. *Phys. Rev. E* 65, 042803 (2002).] The qualitative features of the dilute-ion coordination structure of Li+ in PEO also agree well with the coordination structures observed in crystal structures of PEO oligomers with various Li+ salts. Although crystal structures only exist for small oligomers of PEO at high salt concentrations, a common feature of these structures is coordination of Li+ by four to five PEO oxygens, usually from a single chain, with the remaining one to two coordination positions occupied by anions. [Lightfoot, P., Nowinski, J. & Bruce, P. crystal structures of the polymer electrolytes poly (ethylene oxide) 4: Mscn (m=nh4, k). *J. Am. Chem. Soc.* 116, 7469-7470 (1994).] [Henderson, W., Brooks, N. & Young, V. Single-crystal structures of polymer electrolytes. *J. Am. Chem. Soc.* 125, 12098-12099 (2003).] [Andreev, Y. et al. Crystal structures of poly (ethylene oxide) 3: Libf4 and (diglyme) n: Libf4 (n=1, 2). *Chem. Mater.* 17 (2005).] In the presented MD simulations, Li+ is tightly coordinated by four PEO oxygen atoms in the equatorial positions, and more weakly coordinated by two additional PEO oxygen atoms in the axial positions (FIG. 2A). In addition, the position and height of the first peak in the Li+-polymer radial-distribution function agrees well with g(r) obtained with other PEO force-fields (FIG. 6). [Halley, J. W., Duan, Y., Curtiss, L. A. & Baboul, A. G. Lithium perchlorate ion pairing in a model of amorphous polyethylene oxide. *J. Chem. Phys.* 111, 3302-3308 (1999).][Borodin, O. & Smith, G. D. Mechanism of ion transport in amorphous poly(ethylene oxide)/LiTFSI from molecular dynamics simulations. *Macromolecules* 39, 1620-1629 (2006).] We also note that force-fields of this type employed here have been used to accurately simulate the relative Li-salt conductivity in PEO versus a range of polyester [Webb, M. A. et al. Systematic computational and experimental investigation of lithium-ion transport mechanisms in polyester-based polymer electrolytes. *ACS Cent. Sci.* (2015).] and polyether electrolytes [Webb, M. A., Savoie, B. M., Wang, Z.-G. & Miller III, T. F. Chemically specific dynamic bond percolation model for ion transport in polymer electrolytes. *Macromolecules* 48, 7346-7358 (2015).].

In general, finite ion concentration MD simulations are less accurate than dilute ion concentration due to the importance of electronic polarization effects. As seen in Table 3, comparison of our simulations with available experiments at similar concentrations reveals excellent agreement for the LiTriflate salt, overestimation for the LiTFSI salt, and underestimation for the LiCl salt. These results are reasonably encouraging, as polarizable MD force fields that quantitatively reproduce finite-concentration PEO:LiTFSI diffusivities were parameterized against experimental diffusivity data, [Borodin, O. & Smith, G. D. Development of many-body polarizable force fields for Li-battery applications: 2. LiTFSI-doped oligoether, polyether, and carbonate-based electrolytes. *J. Phys. Chem. B* 110, 6293-6299 (2006).] [Borodin, O. Polarizable force field development and molecular dynamics simulations of ionic liquids. *J. Phys. Chem. B* 113, 11463-11478 (2009).] which is not possible for the current study, as the proposed anion-coordinating polymers have not yet been synthesized. Regardless, none of the main conclusions of this work are based on the absolute simulated conductivities of the polymer electrolytes in the finite-concentration regime.

TABLE 3

Comparison of experimental and simulated results for PEO at finite concentrations.†

| Salt | Li:O | $\sigma_{exp}$ (mS · cm$^{-1}$) | Avg. $\sigma_{exp}$ (mS · cm$^{-1}$)‡ | $\sigma_{sim}$ (mS · cm$^{-1}$)+ |
|---|---|---|---|---|
| LiTFSI | 1:10 | 2.0,$^a$ 1.0,$^b$ 0.63,$^c$ 1.0$^d$ | 1.3 ± 0.4 | 0.11 ± 0.01 |
| LiTFSI | 1:20 | 2.0,$^e$ 1.2,$^f$ 0.85$^g$ | 1.4 ± 0.3 | 0.05 ± 0.02 |
| LiTriflate | 1:10 | 0.002,$^h$ 0.1$^i$ | 0.051 ± 0.05 | 0.03 ± 0.004 |
| LiTriflate | 1:20 | 0.06,$^j$ 0.08,$^k$ 0.2$^l$ | 0.11 ± 0.04 | 0.07 ± 0.01 |
| LiCl | 1:10 | — | — | 0.07 ± 0.01 |
| LiCl | 1:20 | 0.002,$^m$ 0.003$^n$ | 0.0025 ± 0.0005 | 0.09 ± 0.01 |

†For the dilute-ion regime, the simulated diffusivities (7.9 × 10$^{-8}$ cm$^2$ · s$^{-1}$ for Li+ and 5.9 × 10$^{-7}$ cm$^2$ · s$^{-1}$) for TFSI show good agreement with NMR-based diffusivity measurements at similar temperatures and at dilute concentrations (7-9 × 10$^{-8}$ cm$^2$ · s$^{-1}$ for Li+ and 4-5 × 10$^{-7}$ cm$^2$ · s$^{-1}$ for TFSI).
‡Standard errors among the various experimental reports.
+Standard errors from the simulation data.
$^a$Lascaud et al. Macromolecules (1994) vol. 27 pp. 7469-7477 (1:11; 100 C.)
$^b$Marzantowicz et al. J. Power Sources (2006) vol. 159 pp. 420-430 (1:10; 80 C.)
$^c$Marzantowicz et al. J. Power Sources (2006) vol. 159 pp. 420-430 (1:12; 80 C.)
$^d$Kim et al. (2007) vol. 171 pp. 861-869 (1:10; 100 C.)
$^e$Lascaud et al. Macromolecules (1994) vol. 27 pp. 7469-7477 (1:24; 100 C.)
$^f$Marzantowicz et al. J. Power Sources (2006) vol. 159 pp. 420-430 (1:16; 80 C.)
$^g$Shin et al. Electrochem. Comm. (2003) vol. 5 pp. 1016-1020 (1:20; 90 C.)
$^h$Walker and Salomon. J. Electrochem. Soc. (1993) vol. 140 pp. 3409-3412 (1:11; 74 C.)
$^i$Caruso et al. Ionics (2002) vol. 8 pp. 36-43 (1:10; 103 C.)
$^j$Walker and Salomon. J. Electrochem. Soc. (1993) vol. 140 pp. 3409-3412 (1:20; 74 C.)
$^k$Fan et al. Solid State Ionics (2008) vol. 179 (27-32) pp. 1772-1775 (1:16; 80 C.)
$^l$Caruso et al. Ionics (2002) vol. 8 pp. 36-43 (1:20; 103 C.)
$^m$Fan et al. Solid State Ionics (2008) vol. 179 (27-32) pp. 1772-1775 (1:16; 80 C.)
$^n$Watanabe et al. Macromolecules (1987) vol. 20 (3) pp. 569-573 (1:50, 75 C.)

Figure 9:
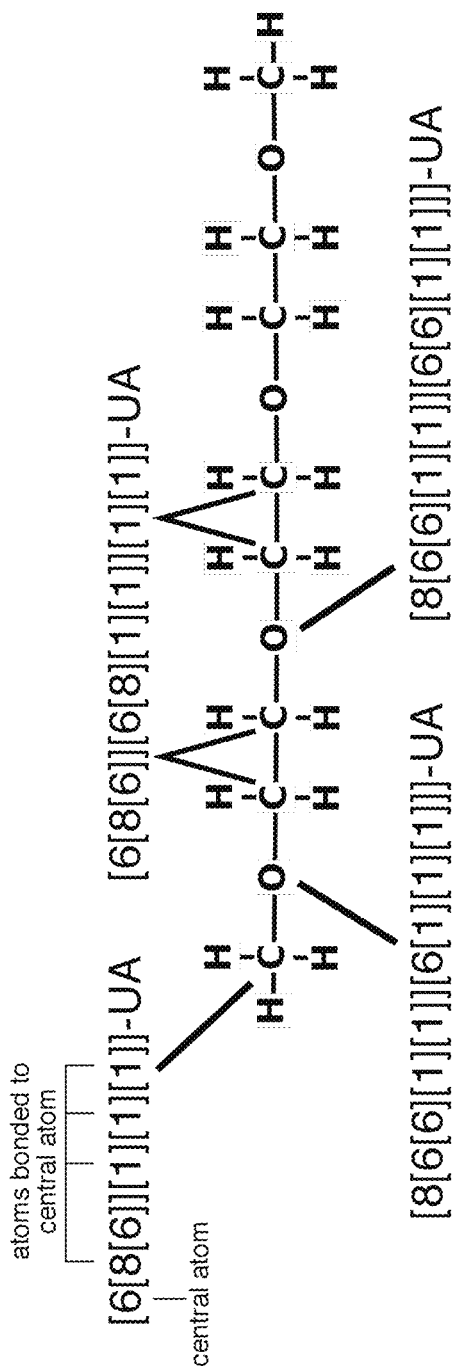
FIG. 9 illustrates the model compound used for PEO parametrization, with several atom types shown as illustrations of the naming syntax.

Example 3: Force-Field Parameters to Simulate Ion Behavior for Representative Cation-Coordinating Polymer PEO and Representative Anion-Coordinating Polymers HBC, HBCC, CBC and CBCC Unique atom types were determined on the basis of topological uniqueness out to two bonds. Here topology refers to the chemical bond connectivity graph (or adjacency matrix) of each model compound. Thus, each atom types reflects the local chemical structure of the atom out to two connected atoms. A simple syntax was developed for naming atom types, such that the name encodes the chemical connectivity about the atom type. In this syntax, all numbers refer to atomic numbers (i.e. 1 corresponds to hydrogen, and 6 to carbon), open brackets ("[") designate bonds, and closed brackets "]") designate the end of bonded groups (i.e. either the point at which two bonds is reached or at which a branch terminates). The central atom is always designated first, and descriptive notes are appended at the end of the label after a hyphen. As a rule, "[" implies a bond between the atom directly following the open bracket and the first atom preceding the bracket that is not enclosed by a "]". A canonicalization procedure is used to order the groups attached to the central atom so that the atom types are consistently generated. Several examples are illustrated in FIG. 9 for the model compound used to parametrize PEO.

Tables 4-6 show the atomic parameters, Lennard-Jones parameters, and intramolecular parameters for PEO simulations.

TABLE 4

Atomic parameters for PEO simulations.

| Atom | Label | m (amu) | q (e) |
|---|---|---|---|
| [16[8][8][7[16]][6[9][9][9]]]-UA | S2 | 32.0660 | 1.0734 |
| [16[8][8][8][6[9][9][9]]]-UA | S1 | 32.0660 | 1.1193 |
| [17]-UA | Cl1 | 35.4527 | -1.0000 |
| [3]-UA | Li1 | 6.9410 | 1.0000 |
| [6[16[8][8][7]][9][9][9]]-UA | C2 | 12.0110 | 0.3305 |
| [6[16[8][8][8]][9][9][9]]-UA | C3 | 12.0110 | 0.4405 |
| [6[8[6]][1][1][1]]-UA | C1 | 15.0348 | 0.1388 |
| [6[8[6]][6[8][1][1]][1][1]]-UA | C4 | 14.0269 | 0.2268 |
| [7[16[8][8][6]][16[8][8][6]]]-UA | N1 | 14.0067 | -0.6816 |
| [8[16[8][7][6]]]-UA | O3 | 15.9994 | -0.5419 |
| [8[16[8][8][6]]]-UA | O2 | 15.9994 | -0.6365 |
| [8[6[6][1][1]][6[1][1][1]]]-UA | O4 | 15.9994 | -0.3582 |
| [8[6[1][1][1]][6[6][1][1]]]-UA | O1 | 15.9994 | -0.4609 |
| [9[6[16][9][9]]]-UA-TFSI | F1 | 18.9984 | -0.1598 |
| [9[6[16][9][9]]]-UA-Triflate | F2 | 18.9984 | -0.2168 |

TABLE 5

Lennard-Jones parameters for PEO simulations.

| Pair$^a$ | $\sigma_{ij}$ (Å) | $\epsilon_{ij}\left(\dfrac{\text{kcal}}{\text{mol}}\right)$ |
|---|---|---|
| C1-C1 | 0.1050 | 3.4309 |
| C1-C2 | 0.3245 | 3.7074 |
| C1-C3 | 0.2173 | 3.9166 |
| C1-Cl1 | 3.4930 | 3.2303 |
| C1-Li1 | 5.5726 | 2.4693 |
| C1-S1 | 1.0738 | 3.6172 |
| C1-S2 | 0.9863 | 3.6813 |
| C4-C1 | 0.0010 | 3.3441 |
| C4-C2 | 0.0091 | 4.8131 |
| C4-C3 | 0.0825 | 3.1519 |
| C4-C4 | 0.1525 | 4.1531 |
| C4-Cl1 | 0.0083 | 4.8810 |
| C4-Li1 | 4.1481 | 2.5062 |
| C4-S1 | 0.1102 | 4.2195 |
| C4-S2 | 0.0181 | 4.4415 |
| F1-C1 | 0.1276 | 3.1589 |
| F1-C4 | 0.0898 | 3.2350 |
| F1-O1 | 0.0613 | 2.8028 |
| F1-O4 | 0.0458 | 2.8172 |
| F2-C1 | 0.4454 | 3.0096 |
| F2-C4 | 0.0037 | 4.1811 |
| F2-O1 | 0.2906 | 2.7786 |
| F2-O2 | 0.0548 | 3.0576 |
| F2-O4 | 0.0010 | 2.3633 |
| N1-C1 | 0.1738 | 3.0196 |
| N1-C4 | 0.1539 | 3.1265 |
| O1-C1 | 0.0508 | 4.0347 |
| O1-C2 | 0.0804 | 3.9046 |
| O1-C3 | 0.3810 | 2.8886 |
| O1-C4 | 0.0173 | 4.4575 |
| O1-Cl1 | 5.1649 | 3.2066 |
| O1-Li1 | 0.0322 | 2.0532 |
| O1-N1 | 0.7780 | 3.5464 |
| O1-O1 | 1.6197 | 3.0194 |
| O1-O2 | 0.0861 | 3.0885 |
| O1-O3 | 0.6737 | 2.7089 |
| O1-O4 | 0.7997 | 3.1961 |
| O1-S1 | 2.9729 | 3.5470 |
| O1-S2 | 1.0563 | 3.5549 |
| O2-C1 | 0.9280 | 2.9608 |
| O2-C3 | 0.0794 | 3.2745 |
| O2-C4 | 0.0380 | 3.5338 |
| O2-O2 | 0.0600 | 3.1181 |
| O2-S1 | 0.1282 | 3.3565 |
| O3-C1 | 0.3640 | 3.1295 |
| O3-C4 | 0.0114 | 3.9946 |
| O4-C1 | 0.1164 | 3.7229 |
| O4-C2 | 0.0010 | 2.8557 |
| O4-C3 | 0.0176 | 4.5403 |

TABLE 5-continued

Lennard-Jones parameters for PEO simulations.

| Pair[a] | $\sigma_{ij}$ (Å) | $\epsilon_{ij} \left(\frac{kcal}{mol}\right)$ |
|---|---|---|
| O4-C4 | 0.0227 | 4.3256 |
| O4-Cl1 | 1.9051 | 3.2246 |
| O4-Li1 | 3.1720 | 1.8324 |
| O4-N1 | 0.0010 | 2.9674 |
| O4-O2 | 0.2357 | 2.7715 |
| O4-O3 | 0.4906 | 2.8529 |
| O4-O4 | 0.7662 | 3.0684 |
| O4-S1 | 0.3330 | 3.8991 |
| O4-S2 | 0.0073 | 4.3930 |

TABLE 6

Intramolecular parameters for PEO simulations.

| Bond[a] | k $\left(\frac{kcal}{mol}\right)$ | $r_0$ (Å) | Angle[a] | k $\left(\frac{kcal}{mol}\right)$ | $\theta_0$ (degrees) | Dihedral[a] | $V_1 \left(\frac{kcal}{mol}\right)$ | $V_2 \left(\frac{kcal}{mol}\right)$ | $V_3 \left(\frac{kcal}{mol}\right)$ | $V_4 \left(\frac{kcal}{mol}\right)$ |
|---|---|---|---|---|---|---|---|---|---|---|
| C1-O4 | 348.3839 | 1.4174 | C1-O4-C4 | 75.1630 | 112.9953 | C1-O4-C4-C4 | 5.1700 | −1.9363 | 2.2300 | −0.0080 |
| C4-C4 | 312.0003 | 1.5208 | C4-C4-O1 | 82.6123 | 107.8300 | C4-C4-O1-C4 | 3.8612 | −1.8428 | 2.4516 | 0.3515 |
| C4-O1 | 340.9891 | 1.4198 | C4-C4-O4 | 82.3129 | 107.8526 | O1-C4-C4-O1 | 3.6952 | −1.6906 | 1.8441 | −0.0951 |
| C4-O4 | 340.8649 | 1.4190 | C4-O1-C4 | 72.7345 | 113.3741 | O4-C4-C4-O1 | 6.3943 | −3.3187 | 3.6780 | −0.2097 |

Tables 7-9 show the atomic parameters, Lennard-Jones parameters, and intramolecular parameters for CBC simulations.

TABLE 7

Atomic parameters for CBC simulations.

| Atom | Label | m (amu) | q (e) |
|---|---|---|---|
| [16[8][8][7[16]][6[9][9]]]-UA | S2 | 32.0660 | 1.0734 |
| [16[8][8][8][6[9][9][9]]]-UA | S1 | 32.0660 | 1.1193 |
| [17]-UA | Cl1 | 35.4527 | −1.0000 |
| [3]-UA | Li1 | 6.9410 | 1.0000 |
| [5[6[5][1][1]][6[1][1][1]][6[1][1][1]]]-UA | B1 | 10.8110 | 0.9347 |
| [5[6[5][1][1]][6[5][1][1]][6[1][1][1]]]-UA | B2 | 10.8110 | 1.0316 |
| [6[16[8][8][7]][9][9][9]]-UA | C3 | 12.0110 | 0.3305 |
| [6[16[8][8][8]][9][9][9]]-UA | C4 | 12.0110 | 0.4405 |
| [6[5[6][6]][1][1][1]]-UA | C2 | 15.0348 | −0.3104 |
| [6[5[6][6]][5[6][6]][1][1]]-UA | C1 | 14.0269 | −0.6902 |
| [7[16[8][8][6]][16[8][8][6]]]-UA | N1 | 14.0067 | −0.6816 |
| [8[16[8][7][6]]]-UA | O1 | 15.9994 | −0.5419 |
| [8[16[8][8][6]]]-UA | O2 | 15.9994 | −0.6365 |
| [9[6[16[8][9][9]]]]-UA-TFSI | F1 | 18.9984 | −0.1598 |
| [9[6[16[8][9][9]]]]-UA-Triflate | F2 | 18.9984 | −0.2168 |

TABLE 8

Lennard-Jones parameters for CBC simulations.

| Pair[a] | $\sigma_{ij}$ (Å) | $\epsilon_{ij} \left(\frac{kcal}{mol}\right)$ |
|---|---|---|
| B1-B1 | 0.1800 | 3.6375 |
| B1-Cl1 | 2.1494 | 3.7056 |
| B1-Li1 | 7.7148 | 2.4555 |
| B1-S1 | 0.0566 | 4.8106 |
| B1-S2 | 0.0027 | 5.9711 |
| B2-B1 | 0.1800 | 3.6375 |
| B2-B2 | 0.1800 | 3.6375 |
| B2-Cl1 | 0.0080 | 5.5014 |
| B2-Li1 | 13.5800 | 2.5708 |
| B2-S1 | 0.0053 | 6.4735 |
| B2-S2 | 0.0010 | 3.3453 |
| C1-B1 | 0.1980 | 3.7806 |
| C1-B2 | 0.0015 | 3.5184 |
| C1-C1 | 0.1958 | 4.2512 |
| C1-C2 | 0.1375 | 4.2031 |
| C1-C3 | 0.1907 | 3.1642 |
| C1-C4 | 0.0010 | 3.2949 |
| C1-Cl1 | 3.4518 | 3.0169 |
| C1-Li1 | 0.3445 | 2.9025 |
| C1-S1 | 2.7894 | 3.3492 |
| C1-S2 | 1.5341 | 3.2089 |
| C2-B1 | 0.1378 | 3.7594 |
| C2-B2 | 0.3389 | 3.3056 |
| C2-C2 | 0.1152 | 4.2112 |
| C2-C3 | 0.0010 | 5.0515 |
| C2-C4 | 0.0204 | 4.6323 |
| C2-Cl1 | 0.3002 | 3.4605 |
| C2-Li1 | 8.7889 | 2.3395 |
| C2-S1 | 1.0745 | 3.0204 |
| C2-S2 | 0.1497 | 3.1051 |
| C3-B1 | 0.0191 | 5.1728 |
| C3-B2 | 0.0030 | 6.1934 |
| C4-B1 | 0.1331 | 4.3235 |
| C4-B2 | 0.0010 | 3.4872 |
| F1-B1 | 0.4093 | 2.5297 |
| F1-B2 | 0.0010 | 2.5059 |
| F1-C1 | 0.4398 | 2.8530 |
| F1-C2 | 0.0263 | 3.5359 |
| F2-B1 | 0.4131 | 3.0402 |
| F2-B2 | 0.0014 | 5.1073 |
| F2-C1 | 0.1846 | 3.2622 |
| F2-C2 | 0.1773 | 2.9681 |
| F2-O2 | 0.0548 | 3.0576 |
| N1-B1 | 1.9087 | 4.0343 |
| N1-B2 | 0.0010 | 3.5344 |
| N1-C1 | 0.0046 | 5.3217 |
| N1-C2 | 1.1785 | 3.1062 |
| O1-B1 | 0.0010 | 2.6050 |
| O1-B2 | 0.0027 | 5.2539 |
| O1-C1 | 0.8599 | 2.7148 |
| O1-C2 | 0.0983 | 3.5500 |
| O2-B1 | 0.0195 | 4.0466 |
| O2-B2 | 0.0032 | 4.9278 |
| O2-C1 | 1.7320 | 2.6593 |
| O2-C2 | 0.1841 | 3.2994 |
| O2-C4 | 0.0794 | 3.2745 |
| O2-O2 | 0.0600 | 3.1181 |
| O2-S1 | 0.1282 | 3.3565 |

TABLE 9

Intramolecular parameters for CBC simulations.

| Bond[a] | k (kcal/mol) | $r_0$ (Å) | Angle[a] | k (kcal/mol) | $\theta_0$ (degrees) | Dihedral[a] | $V_1$ (kcal/mol) | $V_2$ (kcal/mol) | $V_3$ (kcal/mol) | $V_4$ (kcal/mol) |
|---|---|---|---|---|---|---|---|---|---|---|
| B1-C1 | 232.3056 | 1.5790 | B1-C1-B2 | 33.1351 | 113.3530 | B1-C1-B2-C1 | −13.3074 | 0.9454 | 0.8903 | −1.5044 |
| B1-C2 | 254.7037 | 1.5791 | B2-C1-B2 | 25.7782 | 110.4320 | B1-C1-B2-C2 | −7.2348 | −3.3289 | 0.7736 | 1.4828 |
| B2-C1 | 213.3887 | 1.5837 | C1-B2-C1 | 70.0835 | 120.6234 | B2-C1-B1-C2 | −0.5730 | −0.6788 | −1.5664 | 0.4294 |
| B2-C2 | 252.4856 | 1.5815 | C2-B1-C1 | 63.2298 | 121.1550 | B2-C1-B2-C1 | −1.9851 | 0.8404 | 1.0914 | −0.9601 |
|  |  |  | C2-B1-C2 | 61.1794 | 118.1474 | B2-C1-B2-C2 | 0.6715 | 0.4757 | −0.4933 | 0.2771 |
|  |  |  | C2-B2-C1 | 70.9508 | 119.8894 |  |  |  |  |  |

Tables 10-12 show the atomic parameters, Lennard-Jones parameters, and intramolecular parameters for CBCC simulations.

TABLE 10

Atomic parameters for CBCC simulations

| Atom | Label | m (amu) | q (e) |
|---|---|---|---|
| [16[8][8][7[16][6[9][9]]]]-UA | S2 | 32.0660 | 1.0734 |
| [16[8][8][8][6[9][9]]]]-UA | S1 | 32.0660 | 1.1193 |
| [17]-UA | Cl1 | 35.4527 | −1.0000 |
| [3]-UA | Li1 | 6.9410 | 1.0000 |
| [5[6[6][1][1]][6[1][1][1]][6[1][1][1]]]-UA | B2 | 10.8110 | 0.8301 |
| [5[6[6][1][1]][6[6][1][1]][6[1][1][1]]]-UA | B1 | 10.8110 | 0.6118 |
| [6[16[8][8][7]][9][9][9]]-UA | C3 | 12.0110 | 0.3305 |
| [6[16[8][8][8]][9][9][9]]-UA | C4 | 12.0110 | 0.4405 |
| [6[5[6][6]][1][1][1]]-UA | C2 | 15.0348 | −0.3018 |
| [6[6[5][1][1]][5[6][6]][1][1]]-UA | C1 | 14.0269 | −0.1789 |
| [7[16[8][8][6]][16[8][8][6]]]-UA | N1 | 14.0067 | −0.6816 |
| [8[16[8][7][6]]]-UA | O1 | 15.9994 | −0.5419 |
| [8[16[8][8][6]]]-UA | O2 | 15.9994 | −0.6365 |
| [9[6[16][9][9]]]-UA-TFSI | F1 | 18.9984 | −0.1598 |
| [9[6[16][9][9]]]-UA-Triflate | F2 | 18.9984 | −0.2168 |

TABLE 11

Lennard-Jones parameters for CBCC simulations

| Pair[a] | $\sigma_{ij}$ (Å) | $\epsilon_{ij}$ (kcal/mol) |
|---|---|---|
| B1-B1 | 0.1800 | 3.6375 |
| B1-B2 | 0.1800 | 3.6375 |
| B1-Cl1 | 0.0243 | 4.3578 |
| B1-Li1 | 4.3317 | 2.9037 |
| B1-S1 | 0.0086 | 5.4222 |
| B1-S2 | 0.4785 | 4.0609 |
| B2-B2 | 0.1800 | 3.6375 |
| B2-Cl1 | 0.0010 | 2.8866 |
| B2-Li1 | 16.2933 | 2.6932 |
| B2-S1 | 0.0051 | 5.6304 |
| B2-S2 | 0.0010 | 3.3526 |
| C1-B1 | 0.0738 | 3.2313 |
| C1-B2 | 0.0803 | 3.0918 |
| C1-C1 | 0.1397 | 3.4357 |
| C1-C2 | 0.1421 | 3.5153 |
| C1-C3 | 0.0010 | 5.9132 |
| C1-C4 | 0.4283 | 3.3330 |
| C1-Cl1 | 0.4599 | 3.7222 |
| C1-Li1 | 11.1239 | 2.0295 |
| C1-S1 | 0.0106 | 4.7999 |
| C1-S2 | 0.1940 | 3.3082 |
| C2-B1 | 0.0869 | 3.3963 |

TABLE 11-continued

Lennard-Jones parameters for CBCC simulations

| Pair[a] | $\sigma_{ij}$ (Å) | $\epsilon_{ij}$ (kcal/mol) |
|---|---|---|
| C2-B2 | 0.0066 | 2.9822 |
| C2-C2 | 0.1604 | 3.5439 |
| C2-C3 | 0.0892 | 4.1311 |
| C2-C4 | 1.3947 | 3.2561 |
| C2-C11 | 4.0613 | 2.9067 |
| C2-Li1 | 5.2410 | 2.2158 |
| C2-S1 | 0.4521 | 3.5286 |
| C2-S2 | 0.0054 | 5.0248 |
| C3-B1 | 0.3975 | 3.9347 |
| C3-B2 | 0.0010 | 3.2468 |
| C4-B1 | 0.3365 | 3.3607 |
| C4-B2 | 0.0010 | 3.3679 |
| F1-B1 | 0.1973 | 3.5029 |
| F1-B2 | 0.0010 | 4.9924 |
| F1-C1 | 0.0012 | 4.3655 |
| F1-C2 | 0.2200 | 3.1572 |
| F2-B1 | 0.0034 | 2.5879 |
| F2-B2 | 0.0013 | 5.2502 |
| F2-C1 | 0.1523 | 3.3348 |
| F2-C2 | 0.1915 | 3.1735 |
| F2-O2 | 0.0548 | 3.0576 |
| N1-B1 | 4.2256 | 4.1396 |
| N1-B2 | 0.0010 | 3.7841 |
| N1-C1 | 0.0010 | 3.5981 |
| N1-C2 | 1.0536 | 3.4994 |
| O1-B1 | 0.0010 | 2.5974 |
| O1-B2 | 0.0015 | 5.6053 |
| O1-C1 | 0.0045 | 4.3752 |
| O1-C2 | 0.9469 | 2.5709 |
| O2-B1 | 1.1865 | 3.0230 |
| O2-B2 | 0.0016 | 5.0469 |
| O2-C1 | 0.3076 | 3.3306 |
| O2-C2 | 0.5208 | 3.0149 |
| O2-C4 | 0.0794 | 3.2745 |
| O2-O2 | 0.0600 | 3.1181 |
| O2-S1 | 0.1282 | 3.3565 |

TABLE 12

Intramolecular parameters for CBCC simulations

| Bond[a] | k (kcal/mol) | $r_0$ (Å) | Angle[a] | k (kcal/mol) | $\theta_0$ (degrees) | Dihedral[a] | $V_1$ (kcal/mol) | $V_2$ (kcal/mol) | $V_3$ (kcal/mol) | $V_4$ (kcal/mol) |
|---|---|---|---|---|---|---|---|---|---|---|
| B1-C1 | 248.2053 | 1.5828 | B1-C1-C1 | 61.7531 | 118.6635 | B1-C1-C1-B1 | 3.3239 | 3.7914 | −0.8343 | 1.3696 |
| B1-C2 | 256.0949 | 1.5754 | B2-C1-C1 | 31.6742 | 106.7799 | B2-C1-C1-B1 | 11.9121 | 1.8814 | 0.1416 | 0.9374 |
| B2-C1 | 255.6278 | 1.5754 | C1-B1-C1 | 66.4949 | 118.3454 | C1-B1-C1-C1 | −3.4483 | 2.2207 | −3.2360 | −0.1405 |
| B2-C2 | 255.1161 | 1.5782 | C2-B1-C1 | 61.5526 | 121.3437 | C2-B1-C1-C1 | 6.8959 | 1.3393 | −1.8685 | 1.8090 |
| C1-C1 | 241.9187 | 1.5606 | C2-B2-C1 | 59.7090 | 119.6654 | C2-B2-C1-C1 | 2.2216 | −0.0175 | −0.2227 | 0.1320 |
|  |  |  | C2-B2-C2 | 49.2138 | 120.3698 |  |  |  |  |  |

Tables 13-15 show the atomic parameters, Lennard-Jones parameters, and intramolecular parameters for HBC simulations.

TABLE 13

Atomic parameters for HBC simulations

| Atom | Label | m (amu) | q (e) |
|---|---|---|---|
| [16[8][8][7[16]][6[9][9][9]]]-UA | S2 | 32.0660 | 1.0734 |
| [16[8][8][8][6[9][9][9]]]-UA | S1 | 32.0660 | 1.1193 |
| [17]-UA | Cl1 | 35.4527 | −1.0000 |
| [1[5[6][6]]]-UA | H1 | 1.0079 | −0.2742 |
| [3]-UA | Li1 | 6.9410 | 1.0000 |
| [5[6[5][1][1]][6[1][1][1][1]]]-UA | B2 | 10.8110 | 0.8684 |
| [5[6[5][1][1]][6[5][1][1][1]]]-UA | B1 | 10.8110 | 0.8593 |
| [6[16[8][8][7]][9][9][9]]-UA | C2 | 12.0110 | 0.3305 |
| [6[16[8][8][8]][9][9][9]]-UA | C3 | 12.0110 | 0.4405 |
| [6[5[6][1]][1][1][1]]-UA | C1 | 15.0348 | −0.2872 |
| [6[5[6][1]][5[6][1]][1][1]]-UA | C4 | 14.0269 | −0.5948 |
| [7[16[8][8][6]][16[8][8][6]]]-UA | N1 | 14.0067 | −0.6816 |
| [8[16[8][7][6]]]-UA | O2 | 15.9994 | −0.5419 |
| [8[16[8][8][6]]]-UA | O1 | 15.9994 | −0.6365 |
| [9[6[16][9][9]]]-UA-TFSI | F1 | 18.9984 | −0.1598 |
| [9[6[16][9][9]]]-UA-Triflate | F2 | 18.9984 | −0.2168 |

TABLE 14

Lennard-Jones parameters for HBC simulations

| Pair[a] | $\sigma_{ij}$ (Å) | $\epsilon_{ij}$ (kcal/mol) |
|---|---|---|
| B1-B1 | 0.1800 | 3.6375 |
| B1-B2 | 0.1800 | 3.6375 |
| B1-Cl1 | 0.0066 | 5.4526 |
| B1-H1 | 0.0890 | 3.1043 |
| B1-Li1 | 5.2357 | 2.5866 |
| B1-S1 | 0.0016 | 6.2420 |
| B1-S2 | 0.0010 | 3.1090 |
| B2-B2 | 0.1800 | 3.6375 |
| B2-Cl1 | 0.0010 | 2.8024 |
| B2-H1 | 0.0890 | 3.1043 |
| B2-Li1 | 10.4170 | 2.3764 |
| B2-S1 | 0.0010 | 3.1439 |
| B2-S2 | 0.0010 | 6.2627 |
| C1-B1 | 0.1902 | 3.8363 |
| C1-B2 | 0.1819 | 3.5456 |
| C1-C1 | 0.1591 | 4.0654 |
| C1-C2 | 0.1130 | 3.0919 |
| C1-C3 | 0.7992 | 3.3080 |
| C1-Cl1 | 0.0195 | 3.9996 |
| C1-H1 | 0.0257 | 3.7387 |
| C1-Li1 | 7.8126 | 2.2888 |
| C1-S1 | 0.0010 | 3.2338 |
| C1-S2 | 0.0488 | 4.3837 |
| C2-B1 | 0.0020 | 6.2445 |
| C2-B2 | 0.0010 | 3.2214 |
| C2-H1 | 0.0010 | 2.6097 |
| C3-B1 | 0.0014 | 6.6607 |

TABLE 14-continued

Lennard-Jones parameters for HBC simulations

| Pair[a] | $\sigma_{ij}$ (Å) | $\epsilon_{ij}$ (kcal/mol) |
|---|---|---|
| C3-B2 | 0.0010 | 3.1546 |
| C3-H1 | 0.0010 | 2.5092 |
| C4-B1 | 0.0880 | 3.4416 |
| C4-B2 | 0.2738 | 3.4931 |
| C4-C1 | 0.1243 | 4.2083 |
| C4-C2 | 0.4016 | 3.2967 |
| C4-C3 | 0.0801 | 4.2456 |
| C4-C4 | 0.1224 | 4.2285 |
| C4-Cl1 | 6.5002 | 2.9389 |
| C4-H1 | 0.0228 | 3.7824 |
| C4-Li1 | 0.0010 | 4.3570 |
| C4-S1 | 1.3978 | 3.2707 |
| C4-S2 | 1.9654 | 3.1337 |
| F1-B1 | 0.0031 | 4.6433 |
| F1-B2 | 0.0031 | 4.5724 |
| F1-C1 | 0.0117 | 3.7189 |
| F1-C4 | 1.2762 | 2.5652 |
| F1-H1 | 0.0040 | 3.4612 |
| F2-B1 | 0.0015 | 5.1739 |
| F2-B2 | 0.0022 | 4.9205 |
| F2-C1 | 0.0099 | 3.8456 |
| F2-C4 | 2.6196 | 2.5479 |
| F2-H1 | 0.0010 | 2.0402 |
| F2-O1 | 0.0548 | 3.0576 |
| H1-Cl1 | 0.0010 | 2.3965 |
| H1-H1 | 0.0440 | 2.5711 |
| H1-S1 | 0.0010 | 2.6708 |
| H1-S2 | 0.0010 | 2.4544 |
| Li1-H1 | 9.3292 | 1.8203 |
| N1-B1 | 0.0010 | 3.3383 |
| N1-B2 | 0.0010 | 3.0845 |
| N1-C1 | 2.1688 | 3.4621 |
| N1-C4 | 0.0010 | 3.3279 |
| N1-H1 | 0.0010 | 4.5661 |
| O1-B1 | 0.0058 | 4.8692 |
| O1-B2 | 0.0024 | 5.0803 |
| O1-C1 | 0.8426 | 2.5469 |
| O1-C3 | 0.0794 | 3.2745 |
| O1-C4 | 2.8442 | 2.7131 |
| O1-H1 | 0.0010 | 2.1353 |
| O1-O1 | 0.0600 | 3.1181 |
| O1-S1 | 0.1282 | 3.3565 |
| O2-B1 | 0.0018 | 5.1097 |
| O2-B2 | 0.0018 | 5.0999 |
| O2-C1 | 0.4122 | 2.4934 |
| O2-C4 | 1.7348 | 2.6048 |
| O2-H1 | 0.0049 | 3.6638 |

TABLE 15

Intramolecular parameters for HBC simulations.

| Bond[a] | k $\left(\frac{kcal}{mol}\right)$ | $r_0$ (Å) | Angle[a] | k $\left(\frac{kcal}{mol}\right)$ | $\theta_0$ (degrees) | Dihedral[a] | $V_1 \left(\frac{kcal}{mol}\right)$ | $V_2 \left(\frac{kcal}{mol}\right)$ | $V_3 \left(\frac{kcal}{mol}\right)$ | $V_4 \left(\frac{kcal}{mol}\right)$ |
|---|---|---|---|---|---|---|---|---|---|---|
| B1-C4 | 241.3756 | 1.5705 | B1-C4-B1 | 27.7807 | 106.7004 | B1-C4-B1-C4 | -3.9887 | 1.3337 | -2.1262 | 0.4463 |
| B2-C1 | 269.7731 | 1.5662 | B2-C4-B1 | 24.7349 | 106.8924 | B1-C4-B2-C1 | 0.1277 | -0.9754 | 0.1200 | -0.0160 |
| B2-C4 | 240.6383 | 1.5708 | C1-B2-C4 | 52.4693 | 123.2142 | B2-C4-B1-C4 | -2.6490 | 1.1176 | -0.2814 | -0.3637 |
| H1-B1 | 262.2066 | 1.2030 | C4-B1-C4 | 55.4532 | 122.5544 | H1-B1-C4-B1 | -2.4033 | -1.6903 | -0.9231 | -1.6210 |
| H1-B2 | 260.0591 | 1.2048 | H1-B1-C4 | 48.1681 | 118.8050 | H1-B1-C4-B2 | 2.5105 | -2.4940 | 0.1429 | 0.2511 |
| | | | H1-B2-C1 | 44.4883 | 118.3976 | H1-B2-C4-B1 | 0.0147 | -1.2149 | 0.2320 | -0.4234 |
| | | | H1-B2-C4 | 47.9228 | 118.5387 | | | | | |

Tables 16-18 show the atomic parameters, Lennard-Jones parameters, and intramolecular parameters for HBCC simulations.

TABLE 16

Atomic parameters for HBCC simulations.

| Atom | Label | m (amu) | q (e) |
|---|---|---|---|
| [16[8][8][7[16][6[9][9][9]]]-UA | S2 | 32.0660 | 1.0734 |
| [16[8][8][8][6[9][9][9]]]-UA | S1 | 32.0660 | 1.1193 |
| [17]-UA | Cl1 | 35.4527 | -1.0000 |
| [1[5[6][6]]]-UA | H1 | 1.0079 | -0.2641 |
| [3]-UA | Li1 | 6.9410 | 1.0000 |
| [5[6[6][1[1]][6[1[1]][1][1]]]-UA | B2 | 10.8110 | 0.7760 |
| [5[6[6][1[1]][6[6[1[1]][1][1]]]-UA | B1 | 10.8110 | 0.6119 |
| [6[16[8][8][7]][9][9][9]]-UA | C1 | 12.0110 | 0.3305 |
| [6[16[8][8][8]][9][9][9]]-UA | C4 | 12.0110 | 0.4405 |
| [6[5[6][1]][1][1][1]]-UA | C3 | 15.0348 | -0.2780 |
| [6[6[5][1[1]][5[6[1]][1][1]]]-UA | C2 | 14.0269 | -0.1939 |
| [7[16[8][8][6]][16[8][8][6]]]-UA | N1 | 14.0067 | -0.6816 |
| [8[16[8][7][6]]]-UA | O2 | 15.9994 | -0.5419 |
| [8[16[8][8][6]]]-UA | O1 | 15.9994 | -0.6365 |
| [9[6[16][9][9]]]-UA-TFSI | F1 | 18.9984 | -0.1598 |
| [9[6[16][9][9]]]-UA-Triflate | F2 | 18.9984 | -0.2168 |

TABLE 17

Lennard-Jones parameters for HBCC simulations.

| Pair[a] | $\sigma_{ij}$ (Å) | $\epsilon_{ij}$ $\left(\frac{kcal}{mol}\right)$ |
|---|---|---|
| B1-B1 | 0.1800 | 3.6375 |
| B1-B2 | 0.1800 | 3.6375 |
| B1-Cl1 | 2.6935 | 2.8271 |
| B1-H1 | 0.0890 | 3.1043 |
| B1-Li1 | 7.7192 | 2.4021 |
| B1-S1 | 0.0220 | 4.9485 |
| B1-S2 | 0.1297 | 3.9894 |
| B2-B2 | 0.1800 | 3.6375 |
| B2-Cl1 | 0.0319 | 4.5159 |
| B2-H1 | 0.0890 | 3.1043 |
| B2-Li1 | 14.9347 | 2.5725 |
| B2-S1 | 0.0020 | 6.4299 |
| B2-S2 | 0.0010 | 3.1381 |
| C1-B1 | 0.4179 | 3.8277 |
| C1-B2 | 0.0010 | 3.3219 |
| C1-H1 | 0.0010 | 2.7098 |
| C2-B1 | 0.0496 | 3.1892 |
| C2-B2 | 0.1606 | 3.2756 |
| C2-C1 | 0.0010 | 3.2131 |
| C2-C2 | 0.1819 | 3.8140 |
| C2-C3 | 0.1282 | 3.8504 |
| C2-C4 | 0.0311 | 3.8446 |
| C2-Cl1 | 1.6421 | 3.3973 |
| C2-H1 | 0.0744 | 3.2059 |
| C2-Li1 | 3.0619 | 2.5572 |
| C2-S1 | 0.2937 | 3.6220 |

TABLE 17-continued

Lennard-Jones parameters for HBCC simulations.

| Pair[a] | $\sigma_{ij}$ (Å) | $\epsilon_{ij}$ $\left(\frac{kcal}{mol}\right)$ |
|---|---|---|
| C2-S2 | 0.3637 | 3.6418 |
| C3-B1 | 0.1923 | 3.1819 |
| C3-B2 | 0.2003 | 3.4077 |
| C3-C1 | 0.2339 | 3.9721 |
| C3-C3 | 0.1063 | 3.9380 |
| C3-C4 | 0.0040 | 5.4940 |
| C3-Cl1 | 4.4564 | 3.1288 |
| C3-H1 | 0.0106 | 3.6425 |
| C3-Li1 | 2.0162 | 2.5613 |
| C3-S1 | 1.5755 | 3.2006 |
| C3-S2 | 0.3795 | 3.9270 |
| C4-B1 | 0.0636 | 4.5976 |
| C4-B2 | 0.0010 | 5.8000 |
| C4-H1 | 0.0010 | 2.7039 |
| F1-B1 | 0.0167 | 2.9321 |
| F1-B2 | 0.0026 | 4.5942 |
| F1-C2 | 0.0910 | 3.3167 |
| F1-C3 | 0.4699 | 2.9787 |
| F1-H1 | 0.0024 | 3.5375 |
| F2-B1 | 0.0057 | 3.5124 |
| F2-B2 | 0.0013 | 4.8052 |
| F2-C2 | 0.1965 | 3.2182 |
| F2-C3 | 1.2285 | 2.8041 |
| F2-H1 | 0.0211 | 2.9542 |
| F2-O1 | 0.0548 | 3.0576 |
| H1-Cl1 | 0.0018 | 3.9679 |
| H1-H1 | 0.0440 | 2.5711 |
| H1-S1 | 0.0010 | 2.7015 |
| H1-S2 | 0.0029 | 4.1673 |
| Li1-H1 | 1.3246 | 1.9716 |
| N1-B1 | 0.4727 | 3.5420 |
| N1-B2 | 0.0010 | 3.3564 |
| N1-C2 | 0.0015 | 5.0627 |
| N1-C3 | 1.1281 | 3.3460 |
| N1-H1 | 0.0010 | 2.7751 |
| O1-B1 | 1.3836 | 2.5545 |
| O1-B2 | 0.0037 | 4.6250 |
| O1-C2 | 0.6207 | 3.2344 |
| O1-C3 | 1.2335 | 2.9560 |
| O1-C4 | 0.0794 | 3.2745 |
| O1-H1 | 0.3336 | 2.0889 |
| O1-O1 | 0.0600 | 3.1181 |
| O1-S1 | 0.1282 | 3.3565 |
| O2-B1 | 0.1752 | 2.4663 |
| O2-B2 | 0.0047 | 4.6847 |
| O2-C2 | 0.3657 | 3.1507 |
| O2-C3 | 0.8674 | 2.8904 |
| O2-H1 | 0.0010 | 2.0904 |

TABLE 18

Intramolecular parameters for HBCC simulations

| Bond[a] | k $\left(\frac{kcal}{mol}\right)$ | $r_0$ (Å) | Angle[a] | k $\left(\frac{kcal}{mol}\right)$ | $\theta_0$ (degrees) | Dihedral[a] | $V_1$ $\left(\frac{kcal}{mol}\right)$ | $V_2$ $\left(\frac{kcal}{mol}\right)$ | $V_3$ $\left(\frac{kcal}{mol}\right)$ | $V_4$ $\left(\frac{kcal}{mol}\right)$ |
|---|---|---|---|---|---|---|---|---|---|---|
| B1-C2 | 262.5299 | 1.5664 | B1-C2-C2 | 38.6545 | 117.7502 | B1-C2-C2-B1 | 10.3866 | −0.6689 | 2.0740 | 0.0463 |
| B2-C2 | 263.8729 | 1.5664 | B2-C2-C2 | 44.3290 | 118.2331 | B2-C2-C2-B1 | 13.9722 | −1.5753 | 1.3512 | 0.2761 |
| B2-C3 | 266.9141 | 1.5672 | C2-B1-C2 | 47.9064 | 122.9635 | C2-B1-C2-C2 | 0.3542 | 1.7026 | −1.3785 | −0.2549 |
| C2-C2 | 287.7822 | 1.5422 | C3-B2-C2 | 46.8288 | 122.9528 | C3-B2-C2-C2 | 0.2337 | 0.3147 | −0.1421 | 0.1065 |
| H1-B1 | 253.2126 | 1.2093 | H1-B1-C2 | 42.5869 | 118.6413 | H1-B1-C2-C2 | 0.5861 | 1.6786 | −0.0075 | 0.1503 |
| H1-B2 | 255.8662 | 1.2077 | H1-B2-C2 | 41.6971 | 118.8230 | H1-B2-C2-C2 | −0.2422 | 0.1767 | 0.1774 | 0.2636 |
|  |  |  | H1-B2-C3 | 43.6002 | 118.4065 |  |  |  |  |  |

Tables 19-20 show the atomic parameters and Lennard-Jones parameters for Cl⁻ simulations.

TABLE 19

Atomic parameters for Cl− simulations

| Atom | Label | m (amu) | q (e) |
|---|---|---|---|
| [17]-UA | Cl1 | 35.4527 | −1.0000 |
| [3]-UA | Li1 | 6.9410 | 1.0000 |

TABLE 20

Lennard-Jones parameters for Cl— simulations.

| Pair[a] | $\sigma_{ij}$ (Å) | $\epsilon_{ij}$ $\left(\frac{kcal}{mol}\right)$ |
|---|---|---|
| Cl1-Cl1 | 0.2270 | 3.5164 |
| Li1-Cl1 | 9.2424 | 2.2822 |

Tables 21-23 show the atomic parameters, Lennard-Jones parameters and intramolecular parameters for triflate simulations.

TABLE 21

Atomic parameters for triflate simulations

| Atom | Label | m (amu) | q (e) |
|---|---|---|---|
| [16[8][8][6][9][9]]-UA | S1 | 32.0660 | 1.1193 |
| [6[16[8][8]][9][9][9]]-UA | C1 | 12.0110 | 0.4405 |

TABLE 21-continued

Atomic parameters for triflate simulations

| Atom | Label | m (amu) | q (e) |
|---|---|---|---|
| [8[16[8][8][6]]]-UA | O1 | 15.9994 | −0.6365 |
| [9[6[16][9][9]]]-UA | F1 | 18.9984 | −0.2168 |
| [3]-UA | Li1 | 6.9410 | 1.0000 |

TABLE 22

Lennard-Jones parameters for triflate simulations.

| Pair[a] | $\sigma_{ij}$ (Å) | $\epsilon_{ij}$ $\left(\frac{kcal}{mol}\right)$ |
|---|---|---|
| C1-C1 | 0.1050 | 3.4309 |
| C1-Li1 | 0.0180 | 3.7206 |
| C1-S1 | 0.1696 | 3.5128 |
| F1-C1 | 0.0725 | 3.2139 |
| F1-F1 | 0.0500 | 2.9970 |
| F1-Li1 | 5.7608 | 1.9488 |
| F1-O1 | 0.0548 | 3.0576 |
| F1-S1 | 0.1170 | 3.2959 |
| Li1-S1 | 1.3957 | 2.7964 |
| O1-C1 | 0.0794 | 3.2745 |
| O1-Li1 | 8.4364 | 1.9425 |
| O1-O1 | 0.0600 | 3.1181 |
| O1-S1 | 0.1282 | 3.3565 |
| S1-S1 | 0.2740 | 3.5948 |

TABLE 23

Intramolecular parameters for triflate simulations.

| Bond[a] | k $\left(\frac{kcal}{mol}\right)$ | $r_0$ (Å) | Angle[a] | k $\left(\frac{kcal}{mol}\right)$ | $\theta_0$ (degrees) | Dihedral[a] | $V_1$ $\left(\frac{kcal}{mol}\right)$ | $V_2$ $\left(\frac{kcal}{mol}\right)$ | $V_3$ $\left(\frac{kcal}{mol}\right)$ | $V_4$ $\left(\frac{kcal}{mol}\right)$ |
|---|---|---|---|---|---|---|---|---|---|---|
| C2-F2 | 353.7506 | 1.3596 | C2-S2-O2 | 88.6478 | 102.3759 | O1-S1-C1-F1 | −2.2268 | −1.0401 | 0.4445 | 1.8495 |
| S2-C2 | 172.0823 | 1.8760 | F2-C2-F2 | 122.2029 | 106.8052 |  |  |  |  |  |
| S2-O2 | 671.4135 | 1.4607 | O2-S2-O2 | 134.6661 | 115.6511 |  |  |  |  |  |
|  |  |  | S2-C2-F2 | 76.0103 | 112.1533 |  |  |  |  |  |

Tables 24-26 show the atomic parameters, Lennard-Jones parameters and intramolecular parameters for TFSI⁻ simulations.

TABLE 24

Atomic parameters for TFSI⁻ simulations

| Atom | Label | m (amu) | q (e) |
|---|---|---|---|
| [16[8][8][7[16]][6[9][9][9]]]-UA | S2 | 32.0660 | 1.0734 |
| [6[16[8][8][7]][9][9][9]]-UA | C1 | 12.0110 | 0.3305 |
| [7[16[8][8][6]][16[8][8][6]]]-UA | N1 | 14.0067 | −0.6816 |
| [8[16[8][7][6]]]-UA | O1 | 15.9994 | −0.5419 |
| [9[6[16][9][9]]]-UA | F1 | 18.9984 | −0.1598 |
| [3]-UA | Li1 | 6.9410 | 1.0000 |

TABLE 25

Lennard-Jones parameters for TFSI⁻ simulations.

| Pair$^a$ | $\sigma_{ij}$ (Å) | $\epsilon_{ij}\left(\dfrac{kcal}{mol}\right)$ |
|---|---|---|
| C1-C1 | 0.1050 | 3.4309 |
| C1-Li1 | 9.0805 | 2.6855 |
| C1-S2 | 0.1696 | 3.5128 |
| F1-C1 | 0.0725 | 3.2139 |
| F1-F1 | 0.0500 | 2.9970 |
| F1-Li1 | 0.5683 | 1.7900 |
| F1-N1 | 0.0587 | 3.1288 |
| F1-O1 | 0.0548 | 3.0576 |
| F1-S2 | 0.1170 | 3.2959 |
| Li1-S2 | 0.5121 | 2.9625 |
| N1-C1 | 0.0851 | 3.3458 |
| N1-Li1 | 0.0010 | 2.2778 |
| N1-N1 | 0.0690 | 3.2607 |
| N1-S2 | 0.1375 | 3.4277 |
| O1-C1 | 0.0794 | 3.2745 |
| O1-Li1 | 7.6513 | 1.9299 |
| O1-N1 | 0.0643 | 3.1894 |
| O1-O1 | 0.0600 | 3.1181 |
| O1-S2 | 0.1282 | 3.3565 |
| S2-S2 | 0.2740 | 3.5948 | hydrocarbons. *J. Am. Chem. Soc.* 106, 6638-3346 (1984).] [Briggs, J. M., Matsui, T. & Jorgensen, W. L. Monte Carlo simulations of liquid alkyl ethers with the OPLS potential functions. *J. Comput. Chem.* 11, 958-971 (1990).] All intramolecular modes, atomic partial charges, and ion-polymer Lennard-Jones parameters were parameterized in this work to provide a consistent description of all polymers (see Examples 2-5). Intramolecular modes, such as bonds, angles, and dihedrals, were parameterized by fitting OPLS potential energy terms to mode-scans performed at the B3LYP-D3/def2-TZVP level (see Example 2). For each polymer, a model compound comprised of a tetramer of the polymer capped with methyl groups was employed for the intramolecular mode parametrization. Approximate atomic partial charges were obtained from CHELPG calculations based on the B3LYP-D3/def2-TZVP electron densities at the optimized geometries (see Example 3). After obtaining the intramolecular modes and approximate partial charges, condensed phase MD simulations were performed on the pure oligomers and also solutions with each salt to provide configurations to further refine the atomic partial charges and parametrize the dispersion interactions. Final partial charges on each atom were determined by averaging the results of CHELPG calculations based on the B3LYP-D3/def2-TZVP electron densities for one hundred molecular configurations sampled from condensed phase MD trajectories. Pairwise molecular configurations sampled from the condensed phase MD trajectories were used to parametrize the dispersion contributions to the polymer-polymer, ion-polymer, and ion-ion interactions. The dispersion interactions were parameterized by fitting Lennard-Jones potentials to the residual of the fixed electrostatic interactions and the counter-poise corrected B3LYP-D3/def2-TZVP interaction energies calculated for the pairwise configurations. Full parametrization details, parameter tables, mode scans, and fit potentials are included in the Supporting Information.

All MD simulations were performed within the LAMMPS software suite. [Plimpton, S. Fast parallel algorithms for short-range molecular dynamics. *J. Comput. Phys.* 117, 1-19 (1994).] All trajectories employed periodic boundary conditions, particle-particle-particle-mesh (pppm) evaluations

TABLE 26

Intramolecular parameters for TFSI⁻ simulations.

| Bond$^a$ | $k\left(\dfrac{kcal}{mol}\right)$ | $r_0$ (Å) | Angle$^a$ | $k\left(\dfrac{kcal}{mol}\right)$ | $\theta_0$ (degrees) | Dihedral$^a$ | $V_1\left(\dfrac{kcal}{mol}\right)$ | $V_2\left(\dfrac{kcal}{mol}\right)$ | $V_3\left(\dfrac{kcal}{mol}\right)$ | $V_4\left(\dfrac{kcal}{mol}\right)$ |
|---|---|---|---|---|---|---|---|---|---|---|
| C2-F2 | 380.3657 | 1.3483 | C2-S1-N2 | 70.1005 | 98.9717 | N1-S2-C1-F1 | 3.1887 | 12.2415 | 1.2828 | 11.6296 |
| S1-C2 | 182.3244 | 1.8731 | C2-S1-O2 | 86.2016 | 103.3834 | O1-S2-C1-F1 | −1.8803 | 12.7720 | −0.0974 | 12.7720 |
| S1-N2 | 341.6037 | 1.5902 | F2-C2-F2 | 120.4710 | 108.1211 | O1-S2-N1-S2 | −0.5300 | −0.3077 | −0.1853 | 2.0016 |
| S1-O2 | 719.9940 | 1.4479 | N2-S1-O2 | 91.7672 | 111.4256 | S2-N1-S2-C1 | 13.1981 | −0.3478 | −1.8131 | 0.9827 |
| | | | O2-S1-O2 | 120.7440 | 118.8719 | | | | | |
| | | | S1-C2-F2 | 77.5978 | 111.7436 | | | | | |
| | | | S1-N2-S1 | 47.4866 | 127.7101 | | | | | |

Example 4: Molecular Dynamics to Simulate Ion Behavior for Representative Cation-Coordinating Polymer PEO and Representative Anion-Coordinating Polymers HBC, HBCC, CBC and CBCC The molecular dynamics (MD) simulations employed a systematically parameterized version of the optimized potentials for liquid simulations (OPLS) force-field (see Example 1). [Jorgensen, W. L., Madura, J. D. & Swenson, C. J. Optimized intermolecular potential functions for liquid of long-range interactions beyond a 14 Å cut-off, a Nosé-Hoover barostat with 1000 fs relaxation, and a Nosé-Hoover thermostat with 100 fs relaxation (NPT). Equations of motion were evolved using the velocity-Verlet integrator and a two femtosecond timestep for polymers without explicit hydrogen atoms and a one femtosecond timestep for polymers with explicit hydrogen atoms. Intramolecular pairwise interactions for atom pairs connected by fewer than four bonds were excluded during the MD simulations to avoid double counting with dihedral energy terms. Ion diffusion and solvation free energy trajectories were initialized from a common set of four independently equilibrated neat polymer trajectories. Each neat polymer trajectory included a single polymer chain with a mass of approximately 30 kDa that was initialized using a protocol to randomize chain orientation and avoid configurations with significant overlap between atoms. These configurations were initially equilibrated at a temperature of 10 K and a pressure of 50 atm for 50 ps, followed by a 10 ns annealing phase at a temperature of 500 K and a pressure of 1 atm. After annealing, the configurations were simulated for 11 ns at a temperature of 400 K and a pressure of 1 atm to collect production data. The first nanosecond of the production trajectories was used for equilibration and the remaining 10 ns were used to confirm the convergence of the density. The final configurations from the neat polymer trajectories were used as input geometries for the ion diffusion and solvation free energy trajectories.

Example 5: Trajectories for Ion Diffusion Simulations for Representative Cation-Coordinating Polymer PEO and Representative Anion-Coordinating Polymers HBC, HBCC, CBC and CBCC For each combination of ion and polymer, sixteen independent ion-diffusion trajectories were performed. These trajectories were initialized from the four pre-equilibrated neat polymer trajectories by randomly inserting a single ion into each configuration (four independent insertions for each pre-equilibrated configuration). Each trajectory included a single ion to avoid correlated ion motions, and the excess charge was neutralized with a uniformly distributed background charge. The initial geometry was relaxed by performing 1 ps of NVE dynamics with atom displacements limited to 0.01 Å for each timestep, followed by 1 ns of NPT dynamics at a temperature of 400 K and pressure of 1 atm. After relaxation, an additional 300 ns of NPT dynamics were performed to collect production data. A total of 4.8 μs of ion diffusion dynamics were collected for each ion in each polymer (16 independent trajectories, each 300 ns long).

Diffusivities can be calculated from the long-timescale trajectories using the Einstein equation $$D_i = \lim_{t \to \infty} \frac{d\langle |r_i(t) - r_i(0)|^2 \rangle}{6dt}, \qquad (3)$$

where $D_i$ is the diffusion coefficient for ion, i, and the term in brackets is the MSD evaluated at time t. Because many of the systems studied still exhibit sub-diffusive behavior even at long times, apparent diffusivities are reported by approximating the derivative in Eq. (3) by finite difference using the MSD at t=150 and t=0 ns. [Webb, M. A. et al. Systematic computational and experimental investigation of lithium-ion transport mechanisms in polyester-based polymer electrolytes. *ACS Cent. Sci.* (2015).] [Borodin, O. & Smith, G. D. Mechanism of ion transport in amorphous poly(ethylene oxide)/LiTFSI from molecular dynamics simulations. *Macromolecules* 39, 1620-1629 (2006).] The $Li^+$ transference number, $T_{Li}$, was calculated using $T_{Li}=D_{Li}/(D_{Li}+D_{anion})$.

Contact durations were calculated by defining a characteristic function, $h_{ij}(t)$, that reports on contacts between pairs of atoms $$h_{ij}(r) = \begin{cases} 1, & \text{for } r_{ij} \leq r_T \\ 0, & \text{for } r_{ij} > r_T \end{cases}, \qquad (4)$$

where i and j denote atomic indices, and $r_T$ is a pair-specific threshold distance, which is chosen based on the size of the first coordination shell for the corresponding atom types. Specifically, $r_T=r_{max}+2\sigma$, where $r_{max}$ is the radial separation at the first maximum of the corresponding ion-polymer radial-distribution function, and $\sigma$ is the standard deviation obtained by fitting the full width at half maximum of the peak to a Gaussian function. The time autocorrelation function, $\langle h_{ij}(0)h_{ij}(t) \rangle$, was calculated for each contact type by averaging the trajectories with respect to time. Standard errors were calculated by separately averaging the results from the sixteen independent trajectories.

Example 6: Solvation Free-Energy Calculations for Representative Cation-Coordinating Polymer PEO and Representative Anion-Coordinating Polymers HBC, HBCC, CBC and CBCC Thermodynamic integration was used to calculate the ion-specific solvation free energies in each polymer. [Frenkel, D. & Smit, B. *Understanding Molecular Simulation. From Algorithms to Applications* (Academic Press, 2001), 2nd edn.] For each combination of ion and polymer, sixteen independent ion-insertion trajectories were used. Scaled potentials were used to gradually introduce the ion-polymer potential energy terms, and convergence was facilitated by introducing the polymer-ion Lennard-Jones interactions before introducing the polymer-ion electrostatic interactions. A scaled potential was used to first introduce the polymer-ion Lennard-Jones interactions $$U_{LJ}(\lambda_1)=U_P+\lambda_1(U_{P+X_{LJ}}-U_P), \qquad (5)$$

where $\lambda_1$ is the scaling parameter, $U_P$ is the potential of the pure polymer, and $U_{P+X_{LJ}}$ is the potential of the pure polymer plus ion-polymer Lennard-Jones interactions. Standard $\lambda$-dependent soft-core Lennard-Jones potentials, as implemented in LAMMPS with n=1 and $\alpha_{LJ}=0.5$, were used for all ion-polymer interactions to smooth the potential energy function. [Beutler, T. C., Mark, A. E., van Schaik, R. C., Gerber, P. R. & van Gunsteren, W. F. Avoiding singularities and numerical instabilities in free energy calculations based on molecular simulations. *Chem. Phys. Lett.* 222, 529-539 (1994).] When $\lambda_1=0$, the ion and polymer are non-interacting, and when $\lambda_1=1$, the ion-polymer Lennard-Jones terms fully contribute to the potential energy. A second scaled potential was used to subsequently introduce the polymer-ion electrostatic interactions $$U_C(\lambda_2)=U_{P+X_{LJ}}+\lambda_2(U_{P+X_{LJ}+X_C}-U_{P+X_{LJ}}) \qquad (6)$$

where $U_{P+X_{LJ}+X_C}$ is the potential of the polymer plus all polymer-ion interactions. The potential in Eq. (6) was implemented by using $\lambda$-scaled charges on the ion. When $\lambda_2=0$, the ion and polymer interact only through the Lennard-Jones potential, and when $\lambda_2=1$, both the ion-polymer electrostatic and Lennard-Jones terms fully contribute to the potential energy. The total solvation free-energy was obtained by $$\Delta G_{TI} = \int_0^1 \left\langle \frac{dU_{LJ}}{d\lambda_1} \right\rangle d\lambda_1 + \int_0^1 \left\langle \frac{dU_C}{d\lambda_2} \right\rangle d\lambda_2. \qquad (7)$$

The brackets in Eq. (7) indicate an ensemble average, and the approximation has been made that the P$\Delta$V contribution to the free energy change can be safely neglected. The integrals in Eq. (7) were evaluated numerically using the trapezoidal rule, with $\lambda_1$ and $\lambda_2$ incremented in steps of 0.1

(twenty-one steps total, eleven for the Lennard-Jones phase and eleven for the electrostatics, less one redundant step connecting the two phases). The system was allowed to equilibrate for 100 ps at each λ-step, then an additional 100 ps of dynamics were used for calculating the necessary derivatives. The derivatives in Eq. (7) were calculated by finite-difference. At endpoints, forward r backward finite-difference was used, at all other points the central difference was used with a λ-step of 0.01 to evaluate the derivative. In the case of TFSI⁻, an additional free energy contribution associated with removing the intramolecular electrostatics must be computed. Free-energy perturbation was used to evaluate this contribution from a ten ns MD trajectory of a single TFSI⁻ molecule in vacuum. The reported $\Delta G_{TI}$ values were calculated as the average over all ion-insertion trajectories, with errors in the mean estimated by bootstrap resampling (5 million samples). [Efron, B. & Tibshirani, R. J. *An Introduction to the Bootstrap* (Chapman and Hall/CRC, 1993), 1st edn.]

It is common for borane centers to undergo changes in bonding hybridization and associated structural rearrangements upon anion complexation. [Onak, T. *Organoborane Chemistry*. Organometallic Chemistry Series (Academic Press, 1975).] Since these effects are not captured by the force-field used in this work, it is anticipated that the MD thermodynamic integration calculations significantly underestimate the anion solvation free energies in the anion-coordinating polymers. Using ab initio geometry optimizations and energy calculations, we thus include a free-energy-perturbation correction to the solvation free energy (for both the anion-coordinating polymers and PEO) associated with local structural relaxation during anion complexation, $$\Delta G_{corr} = \Delta G_{rel,anion} - \Delta G_{rel,neat} \qquad (8)$$

where $$\Delta G_{rel,anion} = -\beta^{-1} \ln \langle e^{-\beta \Delta U_{rel,anion}} \rangle \qquad (9)$$

accounts for the free-energy change in the anion-polymer system upon relaxation, and $$\Delta G_{rel,neat} = -\beta^{-1} \ln \langle e^{-\beta \Delta U_{rel,neat}} \rangle \qquad (10)$$

accounts for the corresponding effect in the neat polymer. The angle brackets in Eqs. (9) and (10) correspond to ensemble averaging over the MD configurations, and the configuration-specific relaxation energies $\Delta U_{rel,anion}$ and $\Delta U_{rel,neat}$ are obtained from quantum chemistry calculations at the PBE-D3/def2-SVP level of theory, as described below.

The $\Delta U_{rel,anion}$ terms in Eq. (9) were calculated by performing constrained geometry optimizations of the anion solvation structures. For each anion in each polymer, ten solvation snapshots were extracted at 100-picosecond intervals from the dilute ion concentration MD trajectories. Each solvation snapshot consisted of the anion and all polymer atoms within $r_{outer}=5$ Å of any anion atom. The value of $r_{outer}$ was chosen to be large enough to include the first solvation shell for all combinations of polymer and anion ($r_{inner}=4.5$ Å, see FIG. 6) plus a buffer region of 0.5 Å. The united-atom moieties and the terminal atoms of polymer fragments in the solvation snapshot were then hydrogenated, and a constrained geometry optimization of the added hydrogens was performed. Subsequently, a constrained geometry optimization was performed in which all binding atoms (carbon for PEO and boron for all anion-coordinating polymers) within $r_{inner}$ of any anion atom and polymer atoms within two bonds of those binding atoms were relaxed, while the positions of all anion atoms and remaining polymer atoms were constrained. For instances where these cutoff values return a polymer fragment without any constrained atoms, a position constraint was placed on the atom in the fragment farthest from the anion. The relaxation energy, $\Delta U_{rel,anion}$, is obtained from the single-point energy difference for the system before and after the constrained geometry optimization. For each combination of polymer and anion, the average number of polymer binding atoms that were within $r_{inner}$, $N_{poly}$, is determined, and this value is used in the protocol for the calculation of $\Delta U_{rel,neat}$.

The $\Delta U_{rel,neat}$ terms in Eq. (10) were similarly calculated by performing constrained geometry optimizations of snapshots obtained from neat-polymer MD trajectories. The procedures for sampling and optimizing the neat polymer snapshots were identical to the solvation geometries, except that the neat polymer snapshots included all polymer atoms within $r_{outer}=7.5$ Å of the center of the simulation box; this larger value of $r_{outer}$ was used in the neat-polymer calculations to account for the reduced density of binding atoms in the neat-polymer snapshots relative to the anion-containing snapshots. During the geometry relaxation, only the $N_{poly}$ binding atoms closest to the center of the simulation box and the polymer atoms within two bonds of those binding atoms were allowed to relax, where $N_{poly}$ is defined above; this ensures that the same average number of binding atoms are relaxing in calculating both $\Delta U_{rel,anion}$ and $\Delta U_{rel,neat}$. The neat relaxation energy, $\Delta U_{rel,neat}$, is obtained from the single-point energy difference for the system before and after the constrained geometry optimization.

The final expression used to evaluate the solvation free energy for an anion was $$\Delta G_S = \Delta G_{TI} + \Delta G_{corr}. \qquad (11)$$

Table 2 includes the values of $\Delta G_{corr}$ for all anions in all polymers. For Li⁺ in all polymers, $\Delta G_S = \Delta G_{TI}$.

TABLE 2

Free energy corrections, $\Delta G_{corr}$, associated with structural relaxations during anion complexation for all anions in all polymers.

|       | Cl⁻      | Triflate  | TFSI     |
|-------|----------|-----------|----------|
| PEO   | −10 ± 4  | −14 ± 9   | −1 ± 6   |
| CBC   | −37 ± 6  | −19 ± 6   | −74 ± 14 |
| CBCC  | −100 ± 9 | −28 ± 8   | −26 ± 5  |
| HBC   | −83 ± 14 | −10 ± 10  | −33 ± 14 |
| HBCC  | −67 ± 13 | −41 ± 15  | −61 ± 8  |

Units in kcal · mol⁻¹.
Standard errors are reported.

Salt Lattice Energies

Figure 5A:
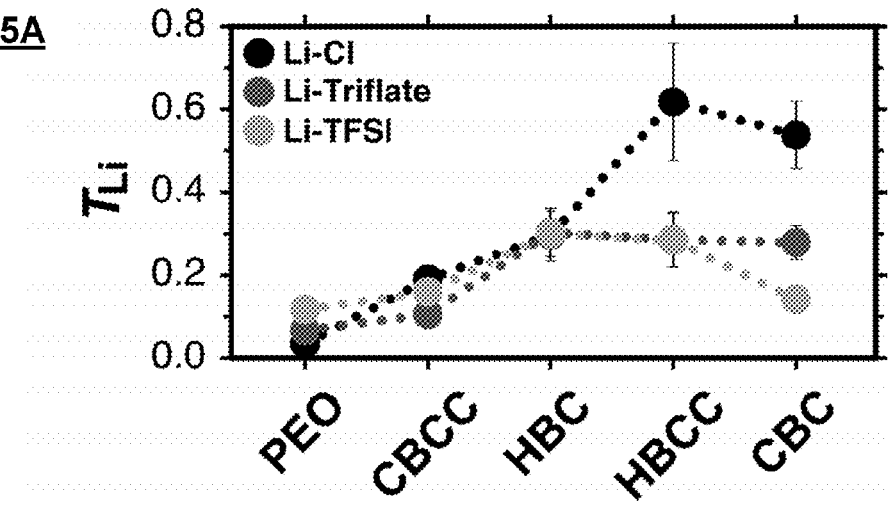
FIGS. 5A-C show in some embodiments comparison of $Li^+$ transference number $T_{Li}$ and ion solvation free energies in cation-coordinating and anion-coordinating polymers.
Figure 5B:
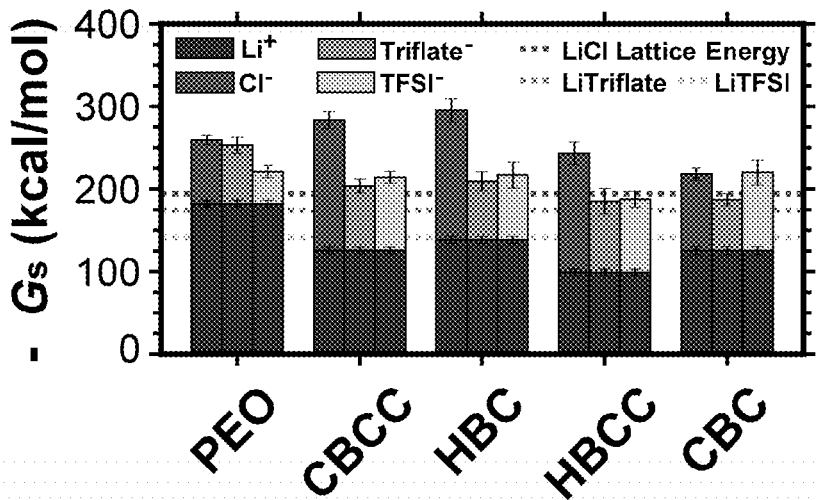

The salt lattice energies for LiCl and LiTriflate presented in FIG. 5b were taken from reference 16 (ref: Bruce, P. & Vincent, C. Polymer electrolytes. *J. Chem. Soc. Faraday Trans.* 89, 3187 (1993). No experimental reference exists for LiTFSI, so the lattice energy was estimated using a modified Kapustinki approach [Jenkins, H., Roobottom, H., Passmore, J. & Glasser, L. Relationships among ionic lattice energies, molecular (formula unit) volumes, and thermochemical radii. *Inorg. Chem.* 38, 3609-3620 (1998).] developed by Jenkins and a volume of 136.1 Å³ for TFSI calculated based on the DFT optimized structure at the B3LYP-D3/def2-TZVP level.

Example 7: Diffusivities of Li+, Cl− and Other Anions for Representative Cation-Coordinating Polymer PEO and Representative Anion-Coordinating Polymers HBC, HBCC, CBC and CBCC In order to investigate the diffusivities of Li⁺, Cl⁻ and other anions for Lewis acidic and Lewis basic polymer, an initial set of simulations were performed in a dilute-ion regime whose results are illustrated in FIG. 1.

Cation-coordinating polymer such as PEO-based materials have net conductivities on the order of $10^{-4}$-$10^{-3}$ S·cm$^{-1}$ at ambient temperature. However, net conductivity overstates electrolyte performance, since only Li$^+$ typically participates in the electrode chemistries in lithium-based batteries (FIG. 1A). Measurements of the Li$^+$ transference number, $T_{Li}$ (the ratio of Li+ conductivity to the total conductivity), show that anions are responsible for most of the conductivity in PEO, and ion diffusivity measurements reveal that anion diffusivity is an order of magnitude larger than Li$^+$ diffusivity for common salts at typical concentrations. Most strategies for increasing $T_{Li}$ have focused on immobilizing the anion, while the primary strategy for increasing overall diffusion rates has been to decrease the glass-transition temperature, $T_g$, of the polymer. However, neither approach addresses the fundamental ion-polymer interactions that are responsible for asymmetric cation and anion conduction.

Figure 1B:
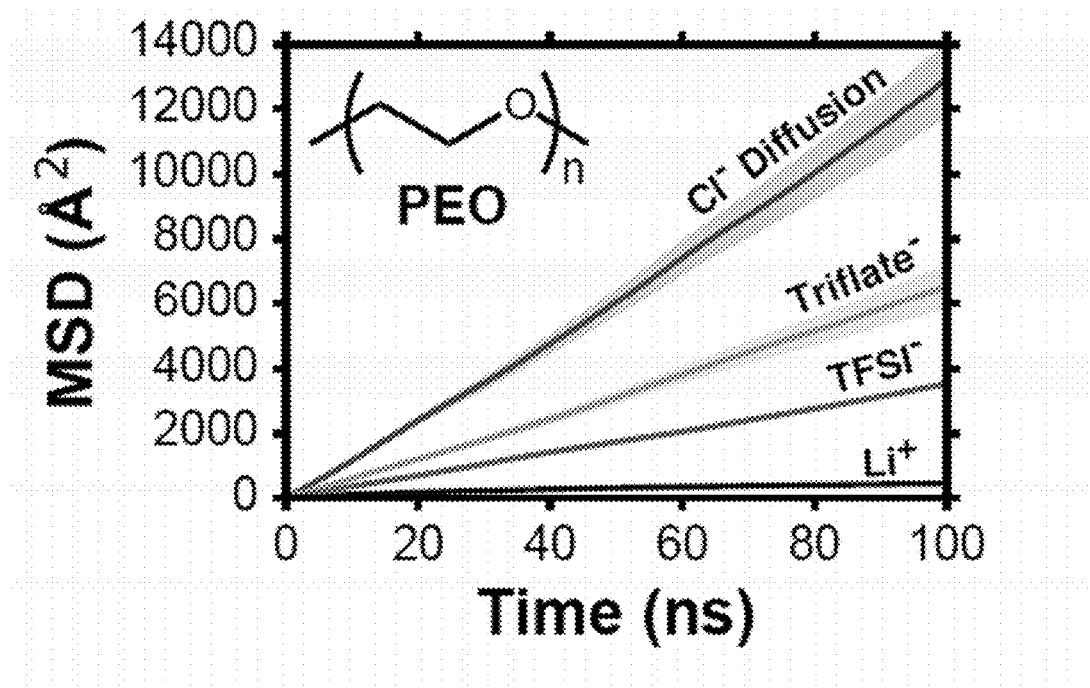

It has been demonstrated in the current experiments that the low Li$^+$ diffusivity and high anion diffusivity that characterize PEO-based SPEs can be reversed to favor Li$^+$ conduction in anion-coordinating polymers. In conventional SPEs based on polyethers and other cation-coordinating units, salt solubility is driven by strong cation-polymer interactions. [McBreen, J., Lee, H., Yang, X. & Sun, X. New approaches to the design of polymer and liquid electrolytes for lithium batteries. *J. Power Sources* 89, 163-167 (2000).] [Fenton, D. E., Parker, J. M. & Wright, P. V. Complexes of alkali metal ions with poly(ethylene oxide). *Polymer* 14, 589 (1973).][Shriver, D. F. et al. Structure and ion transport in polymer-salt complexes. *Solid State Ion.* 5, 83-88 (1981).] However, this preferential coordination of cations leads to both the high relative diffusivity of weakly coordinated anions and the low diffusivity of Li$^+$ (FIG. 1B). The trade-off between strong cation coordination and diffusivity suggests that the strategy of driving salt solubility with relatively stronger anion-polymer interactions and weaker cation-polymer interactions may enhance SPE performance.

Figure 1C:
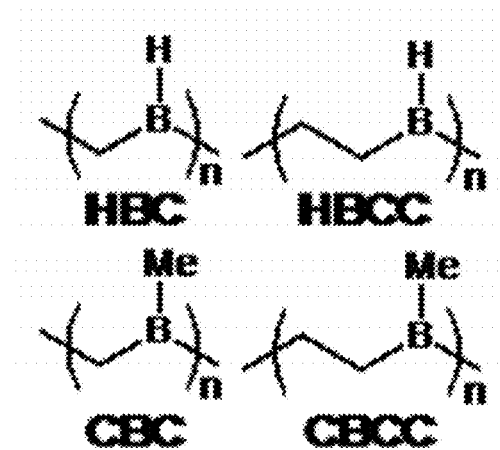
Figure 1D:
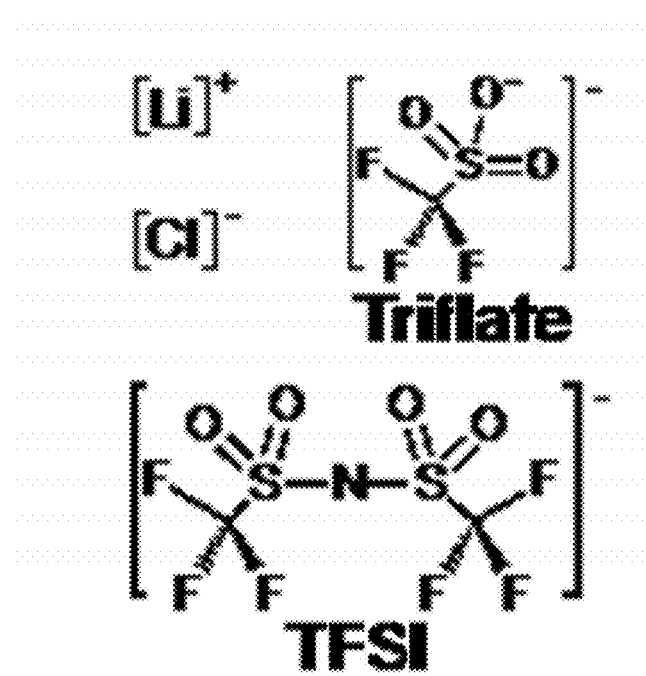

To investigate this trade-off, over 100 microseconds of MD simulations were presented to characterize the ion diffusivities, coordination structures, and solvation free energies in PEO and four anion-coordinating polyboranes (FIG. 1C). The employed force-fields are parameterized from ab initio electronic structure calculations (methods) without experimental fitting; this approach provides a consistent level of theory for all studied polymers and enables the description of the anion-coordinating polymers for which experimental data does not exist.

To illustrate the relative Li$^+$ and anion diffusivities in a cation-coordinating environment, FIG. 1B presents MD simulations of ion diffusion in PEO in the dilute-ion regime. Results are presented for several anions, including Cl$^-$, triflate, and TFSI; these anions vary in both size and charge delocalization, with larger anions possessing increased charge delocalization and reduced Li-salt lattice energies. [Borodin, O. & Smith, G. D. Mechanism of ion transport in amorphous poly(ethylene oxide)/LiTFSI from molecular dynamics simulations. *Macromolecules* 39, 1620-1629 (2006).] [Ratner, M. A. & Shriver, D. F. Ion transport in solvent-free polymers. *Chem. Rev.* 88, 109-124 (1988).] Comparison of the cation and anion diffusivities in PEO reveals that the anion diffusivities dramatically exceed that of Li+ by eight- to thirty-fold, depending on the anion.

Table 1 lists the apparent ion diffusivities and monomer-uni diffusivities calculated for each of the polymer electrolytes in the dilute-ion regime.

| Polymer | $D_{Li}^{app}$ | $D_{Cl}^{app}$ | $D_{triflate}^{app}$ | $D_{TFSI}^{app}$ | $D_{seg}^{app}$ |
|---|---|---|---|---|---|
| PEO | 0.79 (6) | 22 (2) | 11 (1) | 5.9 (6) | 1.05 (2) |
| CBC | 2.7 (3) | 2.4 (3) | 7.1 (7) | 17 (1) | 1.63 (2) |
| CBCC | 0.16 (1) | 0.66 (6) | 1 (2) | 0.8 (1) | 0.79 (1) |
| HBC | 0.56 (9) | 1.3 (3) | 1.3 (2) | 1.3 (1) | 2.07 (6) |
| HBCC | 6 (1) | 4.0 (7) | 16 (3) | 16 (3) | 1.37 (2) |

$^a$Calculated based on the average MSD of oxygen or boron in each polymer
$^b$For all cases, apparent diffusivity is based on the MSD at t = 150 ns, as described in the methods section. Units of $10^{-7}$ cm$^2$·s$^{-1}$ are reported. Numbers in parentheses indicate the statistical uncertainty in the last reported digit.

For PEO:LiTFSI, the simulated dilute ion concentration diffusivities presented in FIG. 1B and Table 1 (7.9×10$^{-8}$ cm$^2$·s$^{-1}$ for Li+ and 5.9×10$^{-7}$ cm$^2$·s$^{-1}$ for TFSI) show good agreement with NMR-based diffusivity measurements at similar temperatures and at dilute concentrations (7-9×10$^{-8}$ cm$^2$·s$^{-1}$ for Li+ and 4-5×10$^{-7}$ cm$^2$·s$^{-1}$ for TFSI) [Edman, L., Ferry, A. & Orädd, G. Analysis of diffusion in a solid polymer electrolyte in the context of a phase-separated system. *Phys. Rev. E* 65, 042803 (2002).]. Direct comparison between theory and experiment for PEO:LiCl and PEO:LiTriflate in FIG. 1B is not possible, as ion-pairing occurs even at the lowest concentrations that have been experimentally studied. [Watanabe, M., Itoh, M., Sanui, K. & Ogata, N. Carrier transport and generation processes in polymer electrolytes based on poly(ethylene oxide) networks. *Macromolecules* 20, 569-573 (1987).] [Muhuri, P., Das, B. & Hazra, D. Ionic association of some lithium salts in 1, 2-dimethoxyethane. a raman spectroscopic and conductivity study. *J. Phys. Chem. B* 101, 3329-3332 (1997).] [Boden, N., Leng, S. & Ward, I. Ionic conductivity and diffusivity in polyethylene oxide/electrolyte solutions as models for polymer electrolytes. *Solid State Ion.* 45, 261-270 (2002).]

Figure 6:
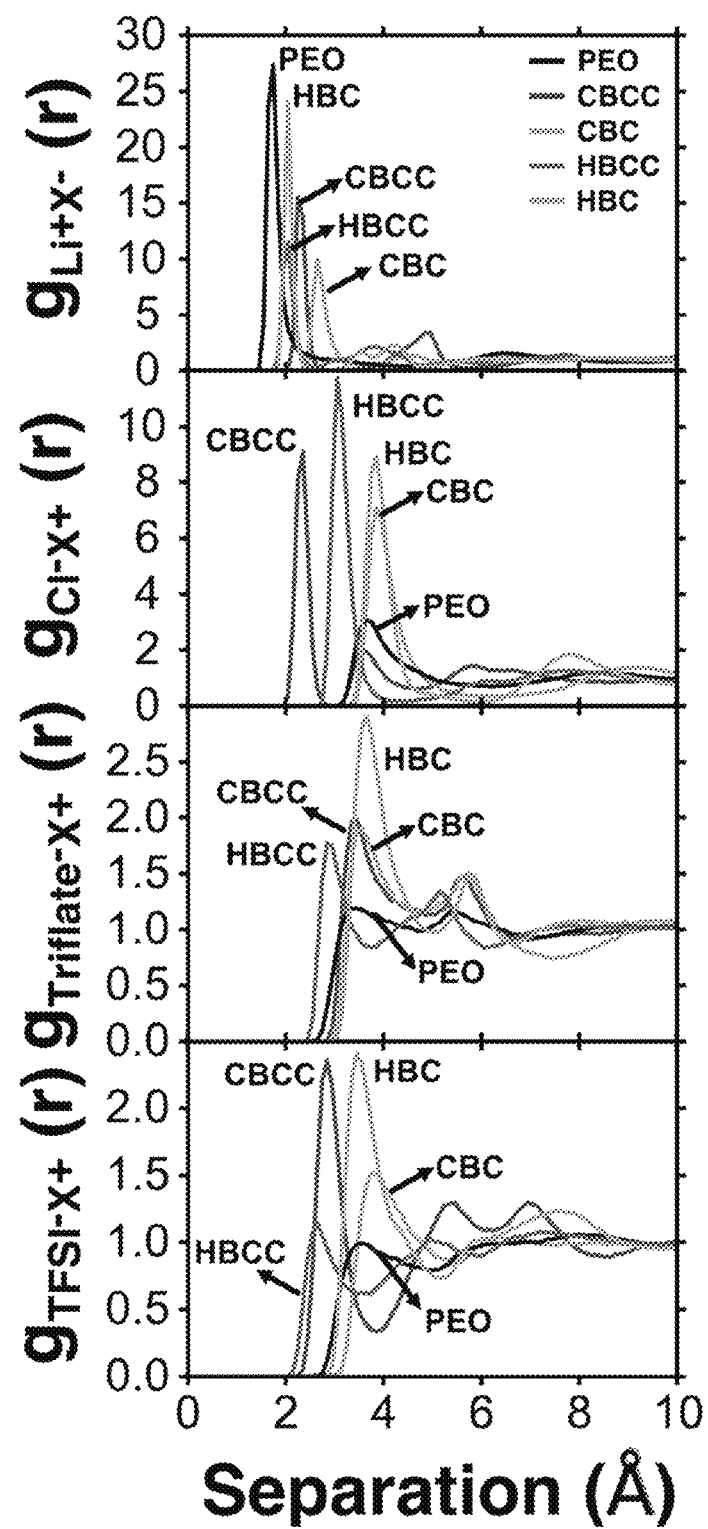
FIG. 6 shows in some embodiments comparison of radial-distribution functions (RDFs) for all ions in all polymers simulated in the dilute-ion regime at 400 K. "X" in each case includes all polymer atoms of opposite partial charge as the ion. The data are represented as a histogram with a bin width of 0.1 Å for r.

Example 8: Coordination and Charge Distribution of Coordinating Chemical Units of Representative Cation-Coordinating Polymer PEO and Representative Anion-Coordinating Polymers HBC, HBCC, CBC and CBCC In order to investigate the coordination and charges of distribution of coordinating chemical units in Lewis acidic and Lewis basic polymer, simulations were performed in a dilute-ion regime whose results are illustrated in FIGS. 2 and 6.

Figure 2B:
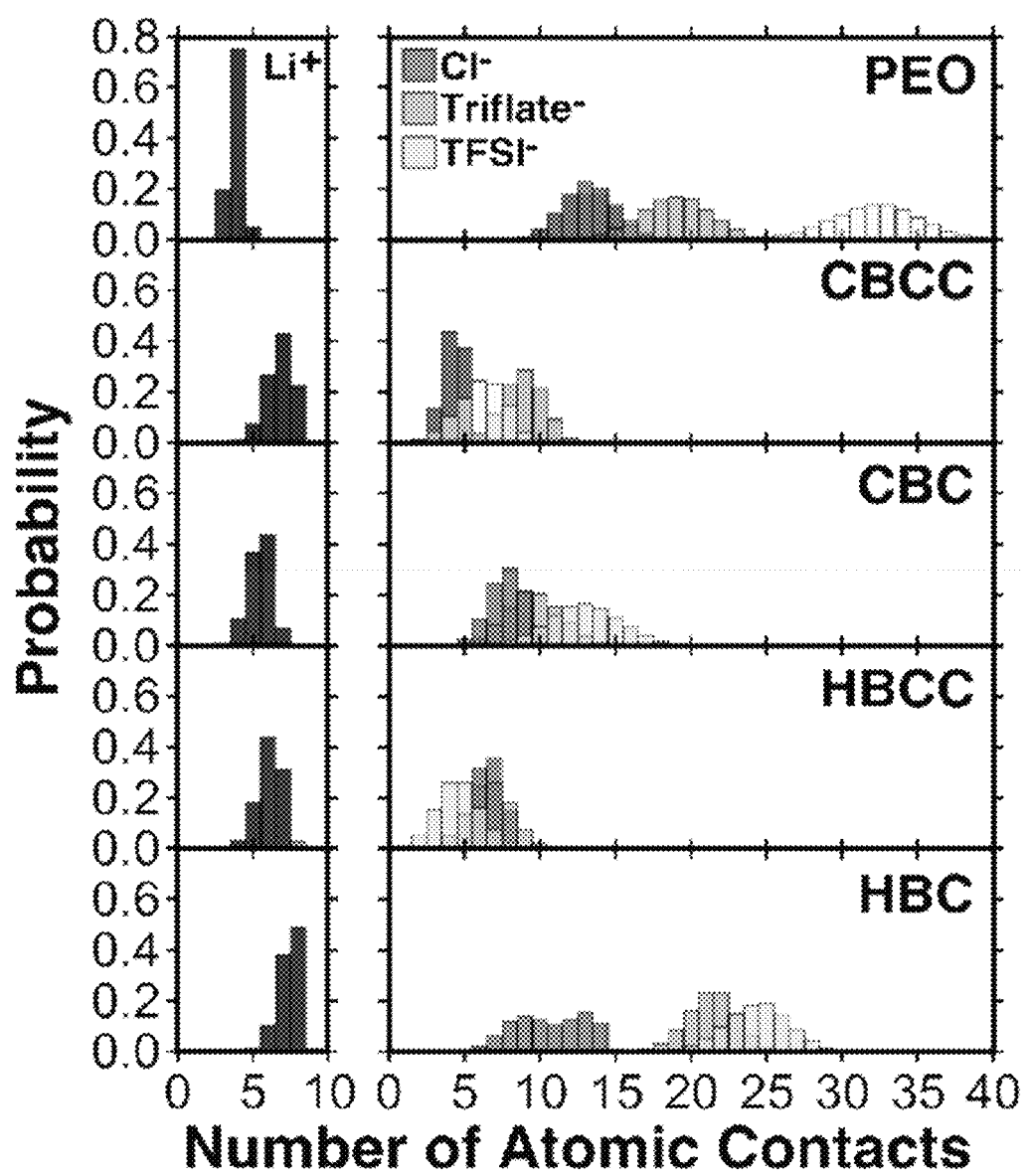

In particular, FIG. 2 examines the molecular basis for the preferential anion diffusion in PEO. FIG. 2a (top row) presents representative coordination structures of all ions in PEO, and FIG. 2b (top panel) shows histograms of the number of polymer atoms that coordinate each ion. Strong coordination of Li+ in PEO is reflected in the helical distortion of the polymer structure about the ion and the strongly peaked distribution of coordination structures (FIG. 2a). In contrast, each anion is weakly associated with a large number of methlyene units from several PEO segments, and a broad distribution of coordination structures is observed (FIG. 2b). These results demonstrate the intrinsic disadvantage that the coordination characteristics of PEO-based polymers represent to increasing Li$^+$ diffusivity and $T_{Li}$.

Additionally, FIG. 2 reveals that the asymmetric coordination of cations and anions in PEO is reversed in the anion-coordinating polyboranes. FIG. 2a (left column)

shows that the charge distributions of anion-coordinating polymers is essentially inverted with respect to PEO; whereas PEO exhibits large negative charges that are localized on the oxygen and delocalized positive charges on the carbon backbone, the anion-coordinating polymers exhibit large positive charges that are localized on the boron and delocalized negative charges on the remaining polymer atoms. This inversion of the charge distribution between PEO and the anion-coordinating polymers is reflected in the weaker coordination of Li$^+$ and stronger coordination of the anions in the ion-coordination structures (FIG. 2a) and coordination-structure distributions (FIG. 2b). Weak coordination of Li$^+$ in the anion-coordinating polymers is indicated by the larger number of polymer atoms coordinated with Li$^+$ (FIG. 2a) and broader distribution of coordination structures (FIG. 2b), relative to PEO. In contrast, the anion coordination structures in the anion-coordinating polymers include fewer polymer atoms and narrower distributions. Analysis of the ion-polymer radial-distribution functions (FIG. 6) also demonstrates the same trend. These results indicate stronger anion coordination and weaker cation coordination in the anion-coordinating polymers.

FIG. 6 shows the ion-polymer radial distribution functions $g_{AB}(r)$ for all ions in all polymers simulated in the dilute-ion regime. For each ion-polymer combination, $g_{AB}(r)$ is calculated such that A refers to the set of atoms associated with the ion and B refers to the set of atoms associated with the polymer that have partial charges with opposite sign as the ion.

Example 9: Coordination and Diffusivity for Li+ in the Representative Cation-Coordinating Polymer PEO and Representative Anion-Coordinating Polymers HBC, HBCC, CBC and CBCC In order to investigate the coordination and diffusivity of for Li+ as a representative cation in Lewis acidic and Lewis basic polymer, simulations were performed in a dilute-ion regime whose results are illustrated in FIG. 3.

In particular, results illustrated in FIG. 3 demonstrate that weaker coordination of Li+ in the anion-coordinating polymers substantially improves the Li+ diffusivity, relative to PEO. In two of the anion-coordinating polymers, CBC and HBCC, Li+ diffusivity is increased four- to ten-fold, respectively. A third polymer, HBC, shows comparable Li+ diffusivity to PEO, while CBCC shows suppressed Li+ diffusivity. To confirm that the increased Li+ diffusivity is primarily cause by increased lability of the coordination structures and not increased polymer segmental motion, polymer-ion contact autocorrelation functions $\langle h(0)h(t)\rangle$ (see Methods, FIG. 3b) and monomer-unit mean-squared displacement (MSD) (FIG. 3c) were calculated for each system. The data presented in FIG. 3b confirm that the shorter duration of the polymer-ion contacts correlates strongly with the observed Li+ diffusion. The monomer-unit MSDs shown in FIG. 3c are less correlated with the Li+ transport, although we note that local polymer fluctuations are important for facilitating transitions of Li+ among coordination structures. [Borodin, O. & Smith, G. D. Mechanism of ion transport in amorphous poly(ethylene oxide)/LiTFSI from molecular dynamics simulations. *Macromolecules* 39, 1620-1629 (2006).] [Webb, M. A., Savoie, B. M., Wang, Z.-G. & Miller III, T. F. Chemically specific dynamic bond percolation model for ion transport in polymer electrolytes. *Macromolecules* 48, 7346-7358 (2015).] Notably, in both CBC and HBCC the Li+ MSD significantly exceeds the monomer-unit MSD, which indicates that the primary mechanism of Li+ transport is due to changes in coordination and not due to coupled diffusion with individual polymer segments.

Figures 7A, 7B:
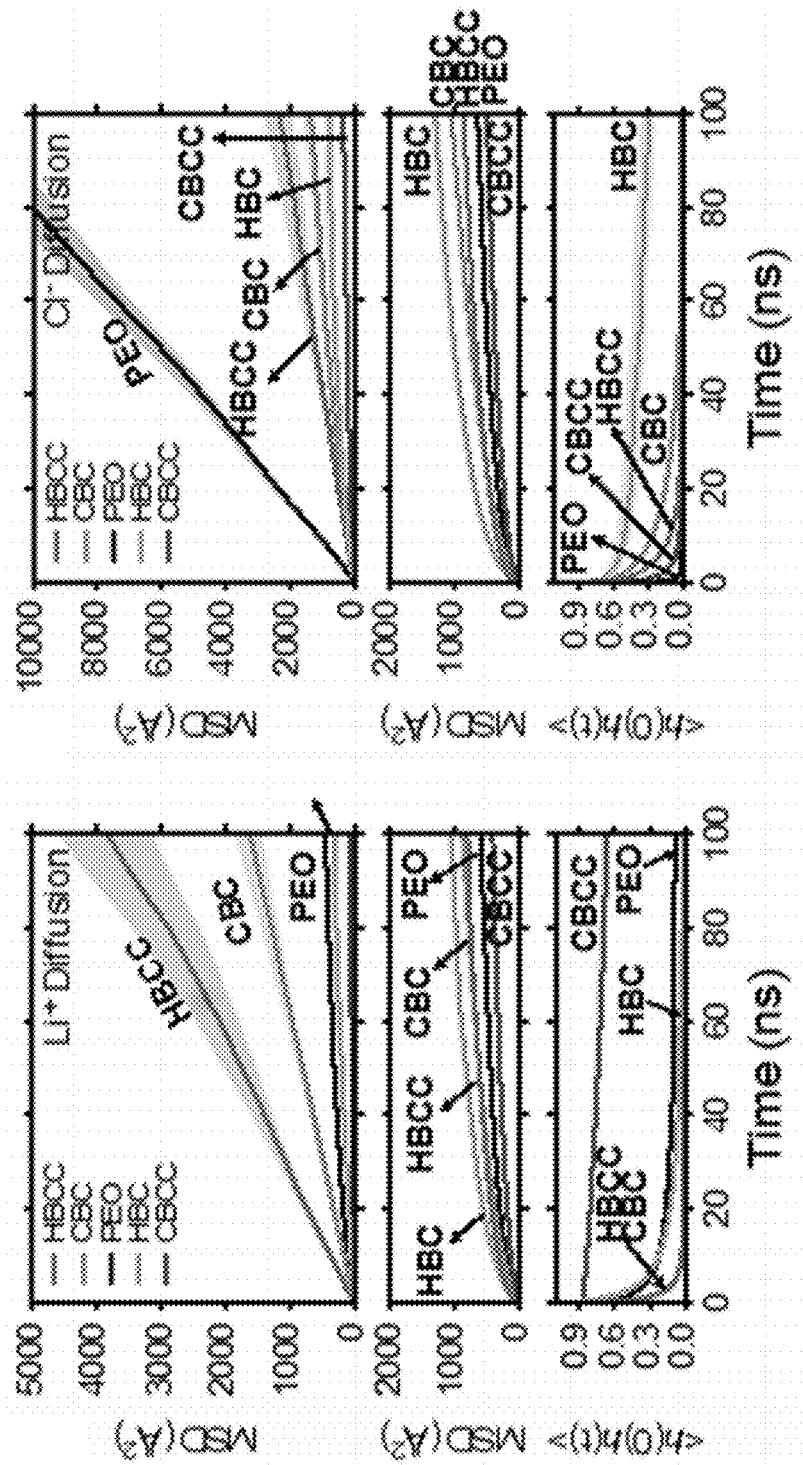
FIGS. 7A-D shows in some embodiments contrasting ion transport behavior in cation-coordinating and anion-coordinating electrolytes. In each figure, the top plot shows the mean squared displacement (MSD) of the ion in each polymer, the middle plot shows contact durations for the ion and its predominant binding atom in each polymer (for $Li^+$ this corresponds to O in PEO, $CH_3$ in CBC, $CH_2$ in CBCC; and H in HBC and HBCC; for all anions this corresponds to $CH_2$ in PEO and B in all Lewis-acid polymers), and the bottom plot shows the MSD of the polymer monomer units in each simulation. The data is derived from MD trajectories at 400 K in the dilute-ion regime. Average values are plotted as lines and standard errors are plotted as shaded regions.

Example 10: Coordination and Diffusivity for Cl$^-$ and Other Anions in the Representative Cation-Coordinating Polymer PEO and Representative Anion-Coordinating Polymers HBC, HBCC, CBC and CBCC Similarly to what illustrated in the exemplary simulation of Example 9, simulations were performed in a dilute-ion regime to investigate the coordination and diffusivity of for Cl$^-$ triflate and TFSI– as a representative anions in Lewis acidic and Lewis basic polymer whose results are illustrated in FIGS. 4 and 7.

Figure 4A:
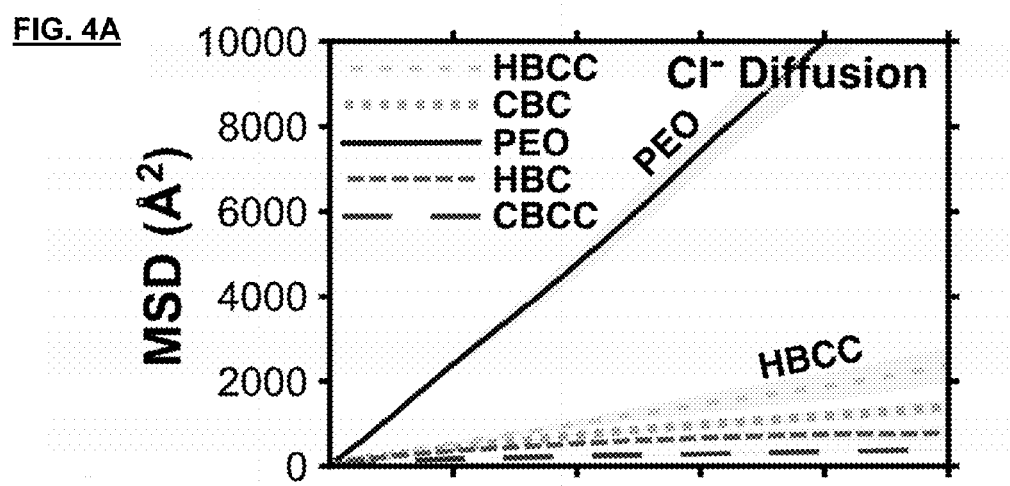
FIGS. 4A-C show in some embodiments contrasting $Cl^-$ transport behavior in cation-coordinating and anion-coordinating polymers.
Figure 4B:
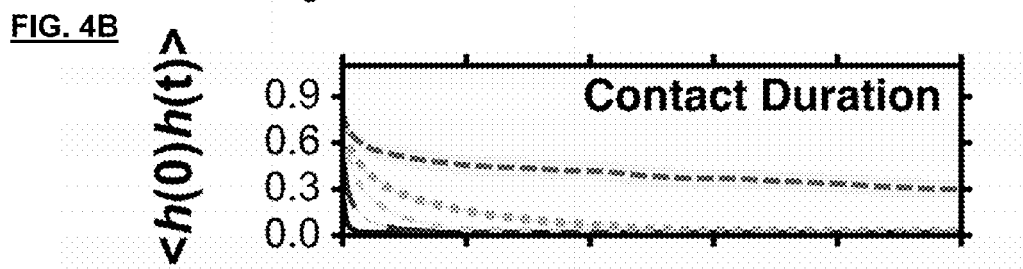
Figure 4C:
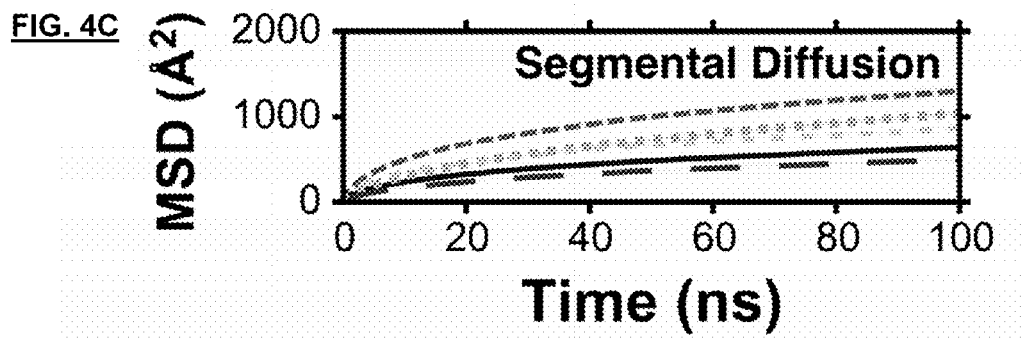

Similarly, FIG. 4 demonstrates that stronger coordination of Cl– in the anion-coordinating polymers substantially reduces the Cl– diffusivity, relative to PEO. FIG. 4a shows that the rapid Cl– diffusion observed in PEO is suppressed in all of the anion-coordinating polymers. FIGS. 4b and 4c show the calculated polymer-Cl– contact autocorrelation functions and polymer monomer unit MSDs, respectively. As in the case of Li+, rapid diffusion coincides with short-lived polymer-Cl– contacts, with the anion-coordinating polymers all showing longer-lived polymer-Cl– contacts relative to PEO. FIG. 7 contains the corresponding results for triflate and TFSI$^-$; in all cases longer-lived anion-polymer contacts correlate with decreased anion diffusivity, with most of the anion-coordinating polymers showing longer-lived anion-polymer contacts in comparison with PEO. The mechanism that emerges from these ion-diffusion simulations is that the anion-coordinating polymers generally increase the strength of anion-polymer interactions and decrease the strength of Li+-polymer interactions, leading to an increase in Li+ diffusion and relatively suppressed anion diffusion.

Figures 7C, 7D:
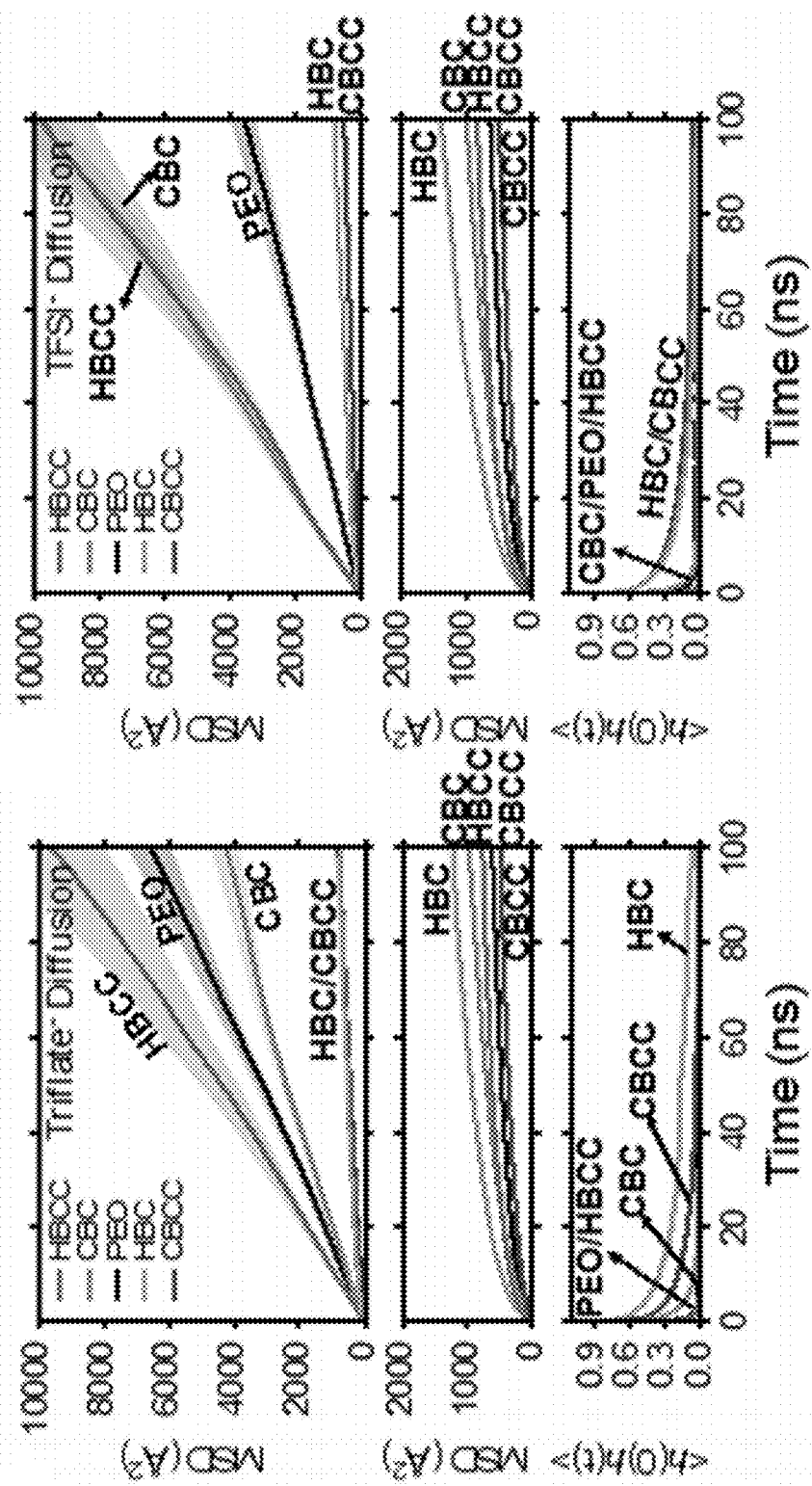

In particular, FIGS. 7C and 7D shows the mean-squared displacement (MSD) for Triflate and TFSI$^-$ ions, primary ion-polymer contact durations, and the MSDs of the polymer segments calculated from the dilute-ion simulations at 400 K. The data for Li$^+$ and Cl$^-$ are reproduced in FIGS. 7A and 7B for comparison Example 11: Transference Number of Li+ in Representative Cation-Coordinating Polymer PEO and Representative Anion-Coordinating Polymers HBC, HBCC, CBC and CBCC In order to investigate the transference number for Li+ as a representative cation in Lewis acidic and Lewis basic polymer, simulations were performed in a dilute-ion regime whose results are illustrated in FIGS. 5 and 8.

In particular, FIG. 5a shows that in all cases, the anion-coordinating polymers exhibit improved $T_{Li}$ in comparison to PEO. The two anion-coordinating polymers with the highest Li+ diffusivity, HBCC and CBC, also exhibit the largest improvements in $T_{Li}$, reflecting that these polymers achieve both increased Li+ diffusivity and decreased anion diffusivity. The magnitude of the improvement in $T_{Li}$ also varies depending on the anion, with Cl– showing the largest improvements in all anion-coordinating polymers.

Figure 5C:
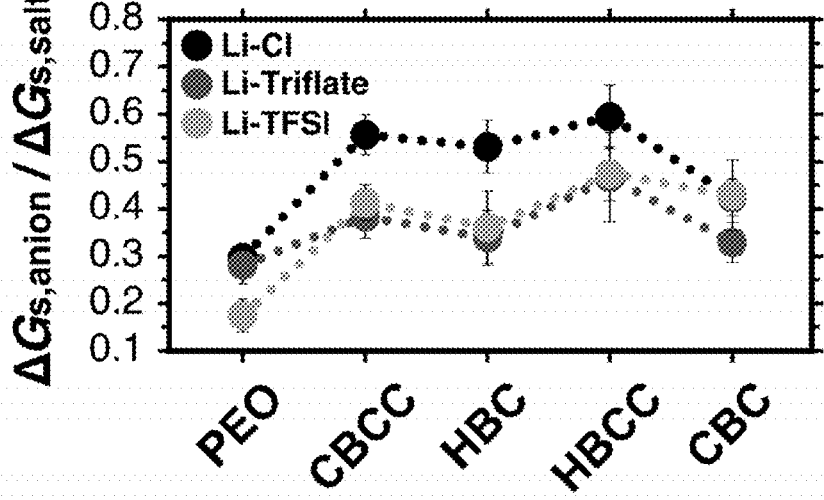

The increased anion coordination in the anion-coordinating polymers is also reflected in the relative contribution of the anion solvation to the total salt solvation. FIG. 5b presents the ion-resolved solvation free energies associated with transferring each ion from vacuum into each polymer, revealing that all combinations of Li-salt and anion-coordinating polymer exhibit total solvation free energies that exceed the lattice energies of the salts. This suggests the capacity of the anion-coordinating polymers to dissolve the studied salts, although the extent of ion-pairing cannot be established solely from dilute-ion simulations and is explored separately in FIG. 8. The capacity of the anion-coordinating polymers to dissolve Li-salts is also supported by liquid-electrolyte studies; for instance, LiTriflate is soluble in borane-based anion-coordinating solvents [Zhang, S. & Angell, C. A novel electrolyte solvent for rechargable lithium and lithium-ion batteries. J. Electrochem. Soc. 143, 4047-4053 (2004).] and both LiF and LiCl exhibit solubility increases of several orders of magnitude in liquid electrolytes when boranes are used as cosolvents. [Lee, H., Yang, X., Xiang, C., McBreen, J. & Choi, L. The synthesis of a new family of boron? based anion receptors and the study of their effect on ion pair dissociation and conductivity of lithium salts in nonaqueous solutions. J. Electrochem. Soc. 145, 2813-2818 (1998).] [Reddy, V. P., Blanco, M. & Bugga, R. Boron-based anion receptors in lithium-ion and metal-air batteries. J. Power Sources 247, 813-820 (2014).] FIG. 5c presents the fractional contribution of each anion to the total salt solvation free energy, demonstrating that the increases in $T_{Li}$ are mirrored by increases in the relative contribution of the anion solvation free energy to the total salt solvation free energy. Taken together, the results in FIG. 5 suggest that high $T_{Li}$ and high salt solubility can be simultaneously achieved by driving solubility with strong anion solvation while leaving Li+ only weakly complexed.

Additional simulations performed at finite ion concentration indicate that, in some cases, the anion-coordinating polymers exhibit comparable ion-pairing to PEO and increased conductivity (FIG. 8). Following previous work [Müller-Plathe, F. Permeation of polymers—a computational approach. Acta Polymer 45, 259-293 (1994).] [Müller-Plathe, F. & Van Gunsteren, W. Computer simulation of a polymer electrolyte: Lithium iodide in amorphous poly(ethylene oxide). J. Chem. Phys. 103, 4745 (1994)] [Lin, K. & Maranas, J. Superionic behavior in polyethylene-oxide-based single-ion conductors. Phys. Rev. E 88, 052602 (2013)][Lin, K. & Maranas, J. Does decreasing ion-ion association improve cation mobility in single ion conductors? Phys. Chem. Chem. Phys. 15, 16143 (2013)], the finite ion concentration simulations are performed with scaled partial charges on the ions to account for the effects of electronic polarizability, which reduces the viscosity and ion-pairing. This approach makes the finite ion concentration simulations more approximate than the dilute-ion simulations discussed earlier and prevents the reliable comparison of finite ion concentration results among the different Li-salts, while still enabling comparisons of ion-pairing and conductivity among polymers with a common salt.

FIG. 8 shows that, in comparison to PEO, all of the anion-coordinating polymers display increased TLi with all salts and at nearly all concentrations. In particular, CBC: LiTFSI exhibits increased conductivity and reduced levels of ion-pairing compared to PEO:LiTFSI. The current work represents a systematic computational study of ion transport in anion-coordinating polymers and suggests a strategy for developing alternative polymer chemistries for lithium-based electrolytes. Dilute-ion simulations of PEO demonstrate that strong Li$^+$ coordination and weak anion coordination manifest in dramatically suppressed Li$^+$ transport relative to several common anions (FIG. 1b). In contrast, in anion-coordinating polymers, relatively weaker Li$^+$ coordination and stronger anion coordination (FIG. 2) result in up to a ten-fold increase in Li$^+$ diffusivity (FIG. 3) and twenty-fold increase in $T_{Li}$ (FIG. 4a). The mechanism for the improved performance of the anion-coordinating polymers is shorter-lived Li$^+$-polymer contacts (FIG. 3b) and longer-lived anion polymer contacts (FIG. 4b) that liberate Li$^+$ diffusion relative to the anion in the anion-coordinating polymers. Comparisons of the ion-resolved solvation free energies in each polymer demonstrate that the anion-coordinating polymers also exhibit lower Li$^+$ sovation free energies (FIG. 4b) while generally increasing the relative contribution of the anion to the total salt solvation free energy (FIG. 4c). These results present a consistent picture of increasing SPE figures-of-merit via weakening Li$^+$ coordination and strengthening anion coordination using anion-coordinating polymer chemistries. Thus, the class of anion-coordinating polymers can potentially overcome the intrinsic limitations of PEO.

PEO was the first polymer electrolyte discovered [Fenton, D. E., Parker, J. M. & Wright, P. V. Complexes of alkali metal ions with poly(ethylene oxide). Polymer 14, 589 (1973).] and is still the majority component of the highest-performing SPEs, [Wright, P. V. Developments in polymer electrolytes for lithium batteries. MRS Bull. 597-602 (2002)] [Bruce, P. G., Scrosati, B. & Tarascon, J.-M. Nanomaterials for rechargeable lithium batteries. Angew. Chem. Int. Ed. 47, 2930-2946 (2008).] but new polymer chemistries are required to make further progress. Recent increases in Li+ diffusivity and conductivity have primarily been achieved through extrinsic innovations—the addition of nanoparticles and plasticizers, [Croce, F., Appetecchi, G. B., Persi, L. & Scrosati, B. Nanocomposite polymer electrolytes for lithium batteries. Nature 394, 456-458 (1998).] [Tarascon, J. M. & Armand, M. Issues and challenges facing rechargeable lithium batteries. Nature 414, 359-367 (2001).] the use of low-lattice energy salts, [Sylla, S., Sanchez, J. Y. & Armand, M. Electrochemical study of linear and crosslinked poe-based polymer electrolytes. Electrochim. Acta 37, 1699-1701 (1992).] [Liang, S., Choi, U. H., Liu, W., Runt, J. & Colby, R. H. Synthesis and lithium ion conduction of polysiloxane single-ion conductors containing novel weak-binding borates. Chem. Mater. 24, 2316-2323 (2012).] and the synthesis of amorphous, branched polymers [Wright, P. V. Developments in polymer electrolytes for lithium batteries. MRS Bull. 597-602 (2002).] [Zhang, L. et al. Highly conductive trimethylsilyl oligo(ethylene oxide) electrolytes for energy storage applications. J. Mater. Chem. 18, 3713-3717 (2008).] while leaving the underlying ether-based polymer chemistry unchanged. Likewise, the main strategies for increasing $T_{Li}$ include slowing anion diffusion via covalent immobilization [Hardy, L. C. & Shriver, D. F. Preparation and electrical response of solid polymer electrolytes with only one mobile species. J. Am. Chem. Soc. 107, 3823-3828 (1985).][Bouchet, R. et al. Single-ion BAB triblock copolymers as highly efficient electrolytes for lithium-metal batteries. Nat. Mater. 12, 452-457 (2013).], anion-coordinating additives [McBreen, J., Lee, H., Yang, X. & Sun, X. New approaches to the design of polymer and liquid electrolytes for lithium batteries. J. Power Sources 89, 163-167 (2000).] [Reddy, V. P., Blanco, M. & Bugga, R. Boron-based anion receptors in lithium-ion and metal-air batteries. J. Power Sources 247, 813-820 (2014).], or dilute anion-coordinating polymer moieties [Lee, H., Yang, X., Xiang, C. & McBreen, J. Synthesis of anion receptor grafted siloxane polymers and the ionic conductivity studies of polymer-salt complexes. J. Electrochem. Soc. 146, 941-946 (1999).][Matsumi, N., Sugai, K. & Ohno, H. Selective ion transport in organoboron polymer electrolytes bearing a mesitylboron unit. *Macromolecules* 35, 5731-5733 (2002).], while leaving strong Li+ coordination in place.

The current study demonstrates that the fundamental ion-polymer interactions responsible for both low $D_{Li}$ and $T_{Li}$ in PEO-based polymers can be favorably reversed in a anion-coordinating environment. Prior uses of anion-coordinating molecular additives [McBreen, J., Lee, H., Yang, X. & Sun, X. New approaches to the design of polymer and liquid electrolytes for lithium batteries. *J. Power Sources* 89, 163-167 (2000).] [Reddy, V. P., Blanco, M. & Bugga, R. Boron-based anion receptors in lithium-ion and metal-air batteries. *J. Power Sources* 247, 813-820 (2014).] suggest that the proposed polymer chemistries may be sufficiently stable for battery applications. It is also noted that electrode interfacial impedance and dendrite growth pose materials challenges for the improvement of battery technologies, [Tarascon, J. M. & Armand, M. Issues and challenges facing rechargeable lithium batteries. *Nature* 414, 359-367 (2001).] although the high Li+ diffusivity and $T_{Li}$ for the anion-coordinating polymers could potentially reduce these effects. [Gray, F. M. *Polymer Electrolytes*. RSC Materials Monographs (The Royal Society of Chemistry, 1997).] The results presented here indicate that removing cation-coordinating units entirely or developing polymer chemistries with complementary weak cation-coordinating and strong anion-coordinating moieties is a potentially more promising approach than optimizing $D_{Li}$ and $T_{Li}$ in the context of polyether chemistry. Likewise, developing anions with strong polymer-specific interactions is an opportunity for further improvement. The optimal balance will ultimately be determined by the solvating capacity and stability of the resulting polymer.

Example 12: Finite Salt Concentration Simulations for Representative Cation-Coordinating Polymer PEO and Representative Anion-Coordinating Polymers HBC, HBCC, CBC and CBCC The data shown in Examples 7 to 11 relate to simulation performed in dilute-ion regime. The dilute-ion regime is the primary focus, with additional finite-concentration results presented herein. Consideration of the dilute-ion regime enables isolation of the ion-polymer interactions that are responsible for the solvation and transport of each ion, [Bruce, P. & Vincent, C. Polymer electrolytes. *J. Chem. Soc. Faraday Trans.* 89, 3187 (1993).] [Webb, M. A. et al. Systematic computational and experimental investigation of lithium-ion transport mechanisms in polyester-based polymer electrolytes. *ACS Cent. Sci.* (2015).] while avoiding ion-pairing effects [Borodin, 0. & Smith, G. D. Mechanism of ion transport in amorphous poly(ethylene oxide)/LiTFSI from molecular dynamics simulations. *Macromolecules* 39, 1620-1629 (2006).] [Watanabe, M., Itoh, M., Sanui, K. & Ogata, N. Carrier transport and generation processes in polymer electrolytes based on poly(ethylene oxide) networks. *Macromolecules* 20, 569-573 (1987).] and increases in polymer viscosity [Gray, F. M. *Polymer Electrolytes*. RSC Materials Monographs (The Royal Society of Chemistry, 1997).] [Shriver, D. F. et al. Structure and ion transport in polymer-salt complexes. *Solid State Ion.* 5, 83-88 (1981).] that arise at higher ion concentrations. For many polymer-salt combinations, the relative ion-diffusivity in the dilute-ion regime correlates strongly with results obtained at higher concentrations. [Webb, M. A. et al. Systematic computational and experimental investigation of lithium-ion transport mechanisms in polyester-based polymer electrolytes. *ACS Cent. Sci.* (2015).] [Pesko, D. M. et al. Effect of monomer structure on ionic conductivity in a systematic set of polyester electrolytes. *Solid State Ionics* 289, 118-124 (2016).] [Timachova, K., Watanabe, H. & Balsara, N. Effect of molecular weight and salt concentration on ion transport and the transference number in polymer electrolytes. *Macromolecules* 48, 7882-7888 (2015).] [Barteau, K. et al. Allyl glycidyl ether-based polymer electrolytes for room temperature lithium batteries. *Macromolecules* 46, 8988-8994 (2013).]

Additional simulations were also performed for the finite salt concentrations. All finite salt concentration simulations were initialized using the same equilibrated neat polymer configurations that were used to initialize the dilute-ion simulations, as described in the main text.

Ions were added to the neat polymer configurations at random positions until reaching the specified concentration. The initial geometry was relaxed by performing 5,000 energy minimization steps, during which the displacements of each atom were limited to 0.01 Å per step, followed by 5 ns of NPT dynamics at a temperature of 400 K and pressure of 1 atm. After relaxation, NPT dynamics at a temperature of 400K and pressure of 1 atm were run for an additional 75 ns (using a 1 fs timestep) for polymers with explicit hydrogen atoms and 150 ns (using a 2 fs timestep) for all other polymers. A Nosé-Hoover thermostat (100 fs relaxation timescale) and barostat (1000 fs relaxation timescale) were used to control the temperature and pressure for all NPT simulations. Sixteen independent trajectories were simulated per electrolyte at each concentration.

Simulations of polymer electrolytes at high salt concentrations have been shown to exhibit increased aggregation and suppressed conductivity relative to experiment when using non-polarizable or fixed-charge force fields. [Tarascon, J. M. & Armand, M. Issues and challenges facing rechargeable lithium batteries. *Nature* 414, 359-367 (2001).] [Gray, F. M. *Polymer Electrolytes*. RSC Materials Monographs (The Royal Society of Chemistry, 1997).][Edman, L., Ferry, A. & Orädd, G. Analysis of diffusion in a solid polymer electrolyte in the context of a phase-separated system. *Phys. Rev. E* 65, 042803 (2002).] [Hayamizu, K., Sugimoto, K. & Akiba, E. An NMR and ionic conductivity study of ion dynamics in liquid poly(ethylene oxide)-based electrolytes doped with LiN(SO2CF3)2. *J. Phys. Chem. B* 106, 547-554 (2002).] Likewise, initial simulations with full charges on the ions showed negligible conductivity and failed to reach equilibrium even at long (75 ns) timescales (not shown). To obtain reduced pairing and mobile ion dynamics, the charges on the ions were uniformly scaled by 0.5 during the simulation, similarly to previous work [Tarascon, J. M. & Armand, M. *Nature* 414, 359-367 (2001).] [Gray, F. M. *Polymer Electrolytes*. RSC Materials Monographs (The Royal Society of Chemistry, 1997).] [Edman, L., Ferry, A. & Orädd, G. *Phys. Rev. E* 65, 042803 (2002) .][Hayamizu, K., Sugimoto, K. & Akiba, E. *J. Phys. Chem. B* 106, 547-554 (2002).].

Results of the finite salt concentrations simulations shown in FIG. 8 relate to net conductivity ($\sigma$), (middle) degree of uncorrelated ion motion ($\alpha$), and (bottom) Li$^+$ transference number ($T_{Li}$) for representative cation-coordinating polymer PEO and representative anion-coordinating polymers HBC, HBCC, CBC and CBCC.

Any attempt to compare the ion-pairing results in FIG. 8 with the dilute ion concentration solvation free energies in FIG. 5 of the main text should consider that the finite-concentration results in FIG. 8 are simulated with scaled point charges and do not include intramolecular relaxation corrections like those used in FIG. 5.

FIG. 8 shows the conductivity (σ), degree of uncorrelated ion motion (α), and transference number ($T_{Li}$) for each electrolyte at two concentrations (r=0.1 and r=0.05, where r is the ratio of Li$^+$ ions to polymer monomer units). The conductivity was calculated according to $$\sigma = \lim_{t \to \infty} \frac{e^2}{6tVk_BT} \sum_{ij}^{N} z_i z_j \langle d_i(t) d_j(t) \rangle, \quad (12)$$

where e is the fundamental charge, V is the simulation volume, T is the temperature, z is the integer charge of the ion, d is the vectorial displacement of the ion at time t, the i and j indices run over all ions in the simulation, and N is the total number of ions in the simulation box. When calculating σ, the charges on all ions were unscaled.

The degree of uncorrelated ion motion, α, was calculated according to $$\alpha = \lim_{t \to \infty} \frac{1}{6t(D_{Li} + D_{anion})N} \sum_{ij}^{N} z_i z_j \langle d_i(t) d_j(t) \rangle, \quad (13)$$

where $D_{Li}$ and $D_{anion}$ correspond to average the diffusivity of Li$^+$ and the anion, respectively, calculated as $$D_\beta = \lim_{t \to \infty} \frac{1}{6t} \sum_{i \in \beta} \langle d_i(t) d_j(t) \rangle, \quad (14)$$

and the summation in Eq. 14 runs over all ions of type β. When the cross terms in the summation in Eq. 13 average to zero (i.e., uncorrelated ion motion), then α equals one. When Li$^+$ motion perfectly correlates with anion motion (i.e. paired behavior), α equals zero. As in the main text, $T_{Li}$ was calculated according to $$T_{Li} = \frac{D_{Li}}{D_{Li} + D_{anion}}. \quad (15)$$

The limit on t was taken as 75 ns when calculating all quantities. The data shown in FIG. 8 represents averages over all trajectories (16 trajectories per electrolyte), with the error bars representing the standard error for each quantity calculated across all trajectories.

Example 13: Synthesis of Exemplary Anion-Coordinating Polymers

All air and water sensitive reactions are carried out under dry nitrogen conditions. All chemicals are commercially available (Sigma-Aldrich) and used without purification unless otherwise mentioned. Tri- and tetra-ethylene glycol were dried over activated 3 Å molecular sieves before use. All solvents mentioned are commercially available (Fischer Scientific) and can be dried over an alumina column and degassed by three freeze-pump-thaw cycles before use.

A first anion-coordinating polymer according to the disclosure can be synthesized according to the reaction scheme below

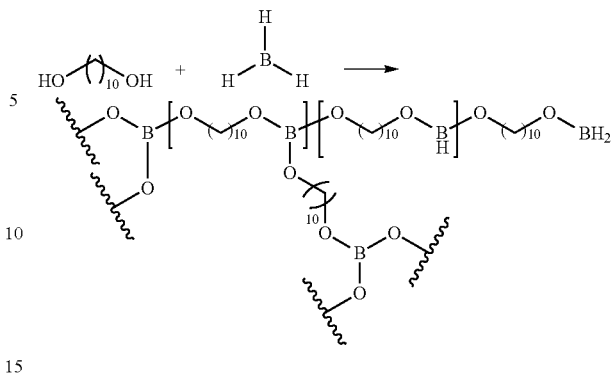

In particular 1,10-Decanediol (3 mmol) can be dissolved in anhydrous THF. To this solution can be added 1.0 M solution of borane in THF (2.0 mL, 2 mmol) under stirring at room temperature. The mixture was stirred for 22 hours and the solvent was removed under vacuum to yield a colorless solid. The solid was intractable in organic solvents but was soluble and decomposed in water.

Example 14: Synthesis of Exemplary Anion-Coordinating Polymers

An additional exemplary anion-coordinating polymer can be synthesized according to the reaction scheme below.

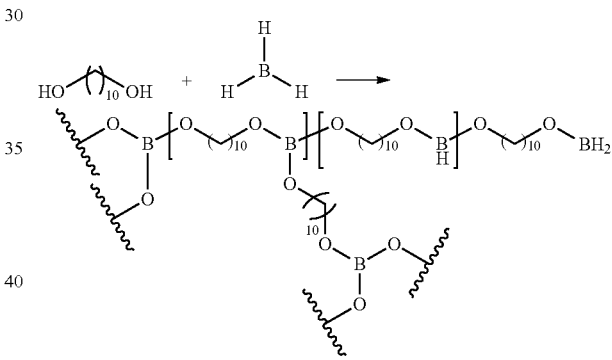

In particular, to a suspension of sodium hydride (2.37 g, 93.7 mmol, 2.5 equiv.) in anhydrous THF was added dropwise a solution of 1,10-Decanediol (6.54 g, 37.5 mmol, 1 equiv.) at 0° C. The mixture was stirred at 50° C. for 7 h. The mixture was cooled down to room temperature and allyl bromide (9.74 mL, 113 mmol, 3 equiv.) was added dropwise. The resulting mixture was stirred at room temperature for 16 h. EtOH was added to quench the reaction and the solids were filtered off. The filtrate was concentrated under vacuum and distilled under reduced pressure (0.2 torr, 80° C.) to yield 1,10-bis(allyloxy)decane as a colorless oil (86%).

1,10-bis(allyloxy)decane (552 mg, 2.17 mmols) was dissolved in anhydrous THF. To this solution was added 1.0 M solution of borane in THF (1.45 mL, 1.45 mmol) under stirring at room temperature. The mixture was gelled up immediately. The mixture was stirred for 20 h and the solvent was removed under vacuum to yield a colorless solid. The solid was intractable in organic solvents.

Example 15: Synthesis of Exemplary Anion-Coordinating Polymers

An additional exemplary anion-coordinating polymer can be synthesized according to the reaction scheme below.

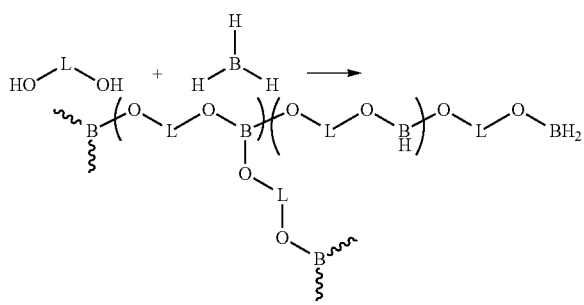

This category can be synthesized by reacting C10-32 alkyl diol (HO-L-OH) with borane. Stoichiometry of the diol and borane needs to be controlled to tune the amount of tri-, di-, and mono-boron esters in the polymer.

Example 16: Synthesis of Exemplary Anion-Coordinating Polymers

An additional exemplary anion-coordinating polymer can be synthesized according to the reaction scheme below.

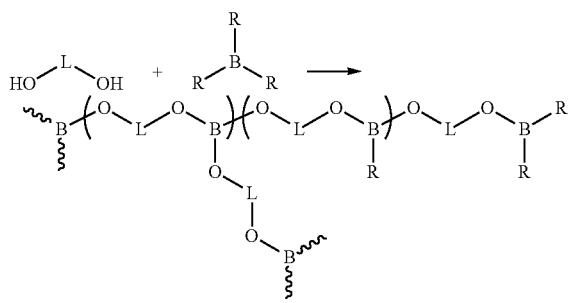

R = Alkyl

This category can be synthesized by reacting C10-32 alkyl diol (HO-L-OH) with trialkylborane. Stoichiometry of the diol and trialkylborane needs to be controlled to tune the amount of tri-, di-, and mono-boron esters in the polymer.

Example 17: Synthesis of Exemplary Anion-Coordinating Polymers

An additional exemplary anion-coordinating polymer can be synthesized according to the reaction scheme below.

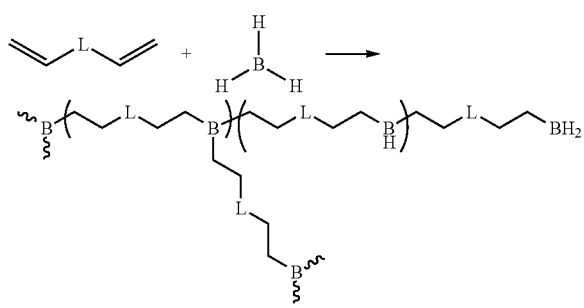

This category can be synthesized by reacting dialkene terminated L of C10-32 with borane. Stoichiometry of the dialkene and borane needs to be controlled to tune the amount of tri-, di-, and mono-alkylborane in the polymer.

The examples set forth above are provided to give those of ordinary skill in the art a complete disclosure and description of how to test and validate the embodiments of anion-coordinating polymer electrolytes and related compositions and methods of the disclosure, and are not intended to limit the scope of what the Applicants regard as their disclosure. Modifications of the above-described modes for carrying out the disclosure can be used by persons of skill in the art, and are intended to be within the scope of the following claims.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

The invention claimed is:

1. An anion-coordinating polymer comprising a plurality of one or more anion-coordinating units of Formula (I)

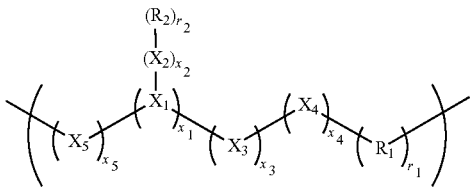

Formula (I)

wherein $X_1$, is B, Al or Ga, $X_2$, $X_3$, $X_4$ and $X_5$ are atoms other than H each optionally bound to one to three hydrogen atoms, $R_1$ and $R_2$ are independently a C1 to C5 linear alkyl group optionally substituted with one or more C1 to C4 alkyl groups, the one or more C1 to C4 groups being optionally substituted with a BF2 group, $x_1=1$, and $x_2$, $x_3$, $x_4$, and $x_5$ are independently 0 or 1, so that $x_1+x_2+x_3+x_4+x_5=1$ to 4, and $r_1$ and $r_2$ are independently 0 or 1, and wherein $X_1$, forms together with any optionally bound H atoms, a united atom having a positive partial charge with a magnitude $|\delta 1|=0.25$ to $1.15\pm 0.1$, and each of $X_2$, $X_3$ $X_4$ and $X_5$ is an atom independently forming, together with any optionally bound H atoms, a united atom having a negative partial charge, with negative partial charges of $X_2$, $X_3$ $X_4$ and $X_5$ united atoms having a magnitude $|\delta 2|$ equal to or less than $|\delta 1|$;

optionally in combination with one or more cation coordinating units of Formula (II)

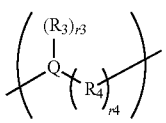

Formula (II)

wherein

Q is a group of one to 5 atoms other than H each optionally bound to one to three hydrogen atoms, in which at least one atom other than C forms together with any optionally bound H atoms, a united atom having has a negative partial charges with a magnitude $|\delta 5|$, and each of the remaining atoms form together with any optionally bound H atoms a united atom, with the remaining united atoms having a positive partial charges with a magnitude $|\delta 6|\le |\delta 5|$, $R_3$ and $R_4$ are independently a C1 to C5 linear alkyl group optionally substituted with one or more C1 to C4 alkyl groups, and $r_3$ and $r_4$ are independently 0 or 1 wherein the anion-coordinating units of Formula (I) are independently selected to provide in the anion-coordinating polymer a total number of anion-coordinating units u, and the cation-coordinating units of Formula (II) are independently selected to provide in the anion-coordinating polymer a total number of cation-coordinating units v, and wherein u≥v.

2. The anion-coordinating polymer of claim 1, wherein the anion-coordinating polymer comprises one or more anion coordinating units of Formula (Ia)

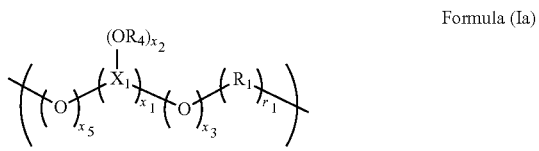

Formula (Ia)

wherein $X_1$ is B, Al, or Ga, $x_2$, $x_3$, and $x_5$ are independently 0 or 1, $R_1$ is a C1 to C5 linear alkyl group optionally substituted with one or more C1 to C4 alkyl groups, and R4 is H or a C1 to C4 alkyl group.

3. The anion-coordinating polymer of claim 1, wherein the anion-coordinating polymer comprises one or more anion coordinating unit of Formula (Ib)

Formula (Ib)

wherein X1 is B, Al, or Ga, $X_2$ is a C1 to C4 alkyl group, and $x_2$, is independently 0 or 1.

4. The anion-coordinating polymer of claim 1, wherein the anion-coordinating polymer comprises one or more anion coordinating unit of Formulas (Ic) to (If)

Formula (Ic)

Formula (Id)

-continued

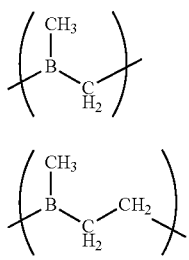
Formula (Ie)

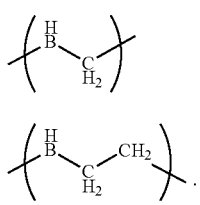
Formula (If)

5. The anion-coordinating polymer of claim 1, wherein the anion-coordinating polymer comprises one or more anion coordinating units of Formulas (Ic) or (Id)

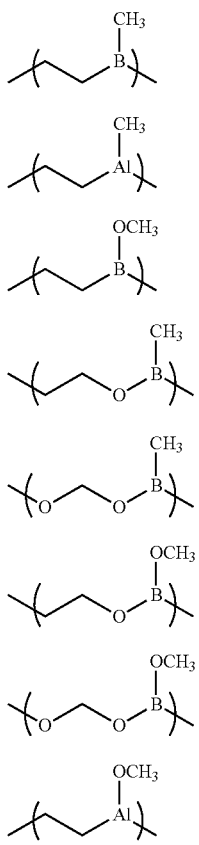

Formula (Ic)

Formula (Id)

6. The anion-coordinating polymer of claim 1, wherein the anion-coordinating polymer comprises one or more anion coordinating units of Formulas (Ig) to (Iv)

(Ig)
(Ih)
(Ii)
(Ij)
(Ik)
(Il)
(Im)
(In)

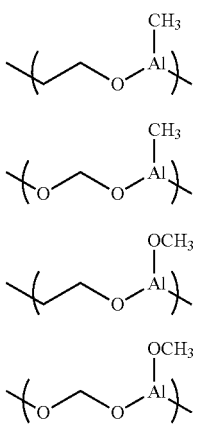

(Io)
(Ip)
(Iq)
(Ir)

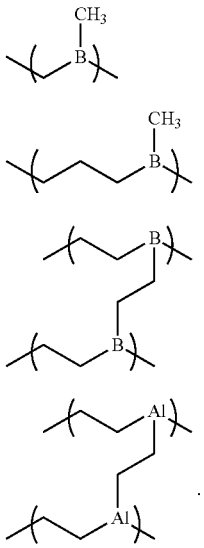

(Is)
(It)
(Iu)
(Iv)

7. The anion-coordinating polymer of claim 1, wherein the anion-coordinating polymer comprises one or more cation-coordinating units of Formula (IIa):

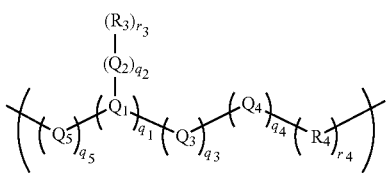

Formula (IIa)

wherein $Q_1$, $Q_2$, $Q_3$, $Q_4$ and $Q_5$ are atoms other than H, each optionally bound to one to three hydrogen atoms, $R_3$ and $R_4$ are independently selected from a C1 to C5 linear alkyl group optionally substituted with one or more C1 to C4 alkyl groups, $q_1=1$, and $q_2$, $q_3$, $q_4$, and $q_5$ are independently 0 or 1, so that $q_1+q_2+q_3+q_4+q_5=1$ to 4, and $r_3$ is 0 or 1 and wherein $Q_1$, is an atom forming, together with any optionally bound H atoms, a united atom having a negative partial charge with a magnitude $|\delta 5|=0.25$ to $1.15\pm0.1$, and each of $Q_2$, $Q_3$ $Q_4$ and $Q_5$ is an atom independently forming, together with any optionally bound H atoms, a united atom having a positive partial charge, with positive partial charges of $Q_2$, $Q_3$ $Q_4$ and $Q_5$ united atoms having a magnitude $|\delta_6|$ equal to or less than $|\delta_5|$.

8. The anion-coordinating polymer of claim 1, wherein the anion-coordinating polymer comprises one or more cation-coordinating units of Formula (IIb):

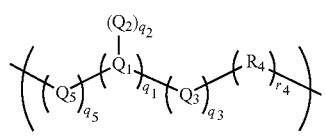

Formula (IIb)

wherein $Q_1$ is N, S or O,
$Q_2$, $Q_3$ and $Q_5$ are independently a C1 to C4 alkyl group
$q_2$, $q_3$, and $q_5$ are independently 0 or 1, and wherein when $Q_1$ is O $q_2$ is 0, and
R3 is a C1 to C5 linear alkyl group optionally substituted with one or more C1 to C4 alkyl groups, and
wherein when Q1 is N q2 is 1 and when Q1 is S or O, q2 is 0.

9. The anion-coordinating polymer of claim 1, wherein the anion-coordinating polymer comprises one or more linking units of formula (III),

III wherein L is a moiety of formula (IIIa) to (IIIh)

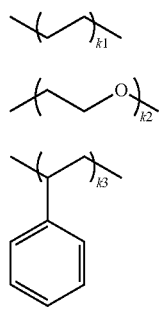

Formula (IIIa)

Formula (IIIb)

Formula (IIIc)

Formula (IIId)

Formula (IIIe)

Formula (IIIf)

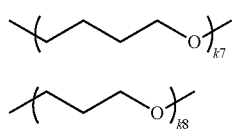

Formula (IIIg)

Formula (IIIh)

wherein $k_1$ to $k_8$ are independently selected from 1 to 100.

10. The anion-coordinating polymer of claim 1, wherein the anion-coordinating polymer comprises an unspecified, statistical random alternative block and/or graft copolymer.

11. The anion-coordinating polymer of claim 1, wherein the anion-coordinating polymer comprises a dendritic polymer of formula (XVI)

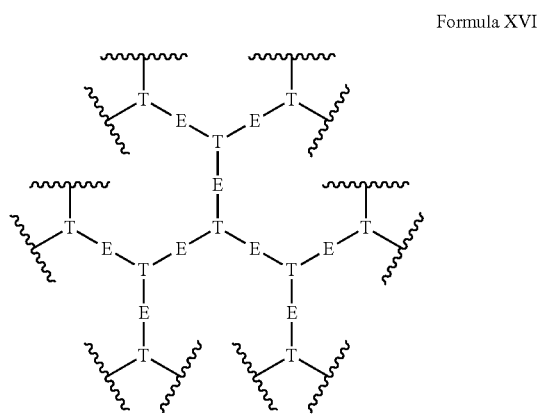

Formula XVI wherein T is independently B, Al or Ga, and wherein E is independently a moiety of Formula (IIIa) to (IIIh)

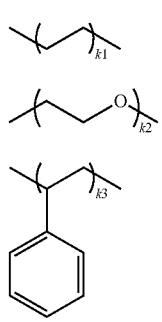

Formula (IIIa)

Formula (IIIb)

Formula (IIIc)

Formula (IIId)

Formula (IIIe)

Formula (IIIf)

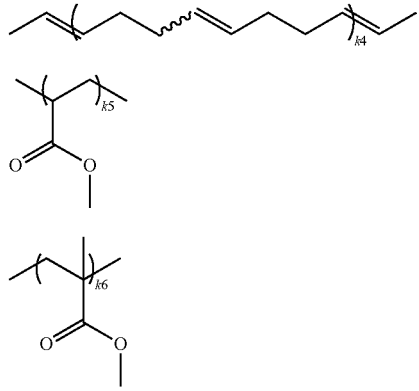

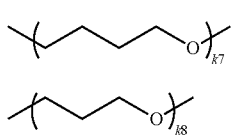

Formula (IIIg)

Formula (IIIh)

wherein $k_1$ to $k_8$ are independently 1-100.

12. The anion-coordinating polymer of claim 1, wherein the anion-coordinating polymer comprises a homopolymer of monomers formed by an anion coordinating unit of Formula (Ic), (Id), (Ie) or (If)

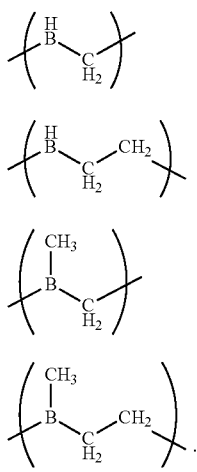

Formula (Ic)

Formula (Id)

Formula (Ie)

Formula (If)

13. The anion-coordinating polymer of claim 1, wherein the anion-coordinating polymer comprises a homopolymer of monomers formed by an anion coordinating unit of Formula (Ie), or (Id)

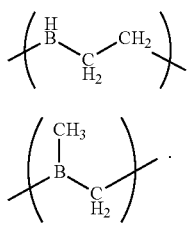

Formula (Id)

Formula (Ie)

14. An electrolyte, the electrolyte comprising one or more anion-coordinating polymers of claim 1 together with a salt soluble in the one or more anion-coordinating polymers.

15. A battery comprising an electrolyte comprising one or more anion-coordinating polymers of claim 1 together with one or more salt soluble in the one or more anion-coordinating polymer, the ionically electrically connected to an anode and a cathode of the battery.

16. A method to provide an anion-coordinating polymer of claim 1, the method comprising:
providing a plurality of monomers each monomer comprising one or more anion coordinating units of Formula (I), one or more cation-coordinating units of Formula (II), and/or one or more linking units of formula (III),

III wherein L is a moiety of formula (IIIa) to (IIIh)

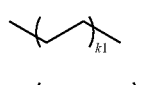

Formula (IIIa)

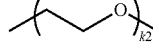

Formula (IIIb)

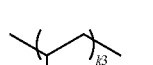

Formula (IIIc)

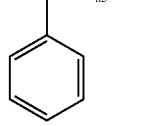

Formula (IIId)

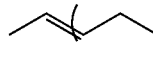

Formula (IIIe)

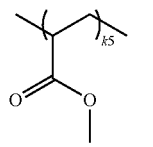

Formula (IIIf)

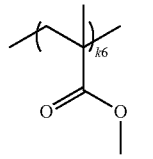

Formula (IIIg)

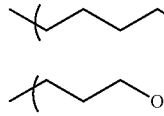

Formula (IIIh)

wherein $k_1$ to $k_5$ are independently selected from 1 to 100; and polymerizing the provided monomers for a time and under condition to obtain one or more anion-coordinating polymers having a total number of cation-coordinating units v and a total number of anion-coordinating units u, with u≥v.

17. A system to provide an anion-coordinating polymer of claim 1, the system comprising monomers comprising anion-coordinating units of Formula (I) and/or cation-coordinating units of Formula (II) and/or linking units of Formula (III).

18. A method to provide an electrolyte, the method comprising mixing at least one anion-coordinating polymer with at least one salt soluble in the at least one anion-coordinating polymer for a time and under conditions to provide the electrolyte of claim 14.

19. A system to provide an electrolyte, the system comprising at least one anion-coordinating polymer of 1 with at least one salt soluble in the at least one anion-coordinating polymer.

20. A composition comprising at least one anion-coordinating polymer of claim 1 together with an acceptable vehicle.

\* \* \* \* \*